United States Patent [19]
Hietala et al.

[11] Patent Number: 6,049,308
[45] Date of Patent: Apr. 11, 2000

[54] INTEGRATED RESONANT TUNNELING DIODE BASED ANTENNA

[75] Inventors: Vincent M. Hietala, Placitas; Chris P. Tiggers; Thomas A. Plut, both of Albuquerque, all of N.Mex.

[73] Assignee: Sandia Corporation, Albuquerque, N.Mex.

[21] Appl. No.: 08/828,156

[22] Filed: Mar. 27, 1997

[51] Int. Cl.[7] .................................................. H01Q 1/38
[52] U.S. Cl. .................................. 343/700 MS; 343/701; 343/721
[58] Field of Search ........................... 343/700 MS, 701, 343/721; 455/129, 326; 437/38; H01Q 1/38

[56] References Cited

U.S. PATENT DOCUMENTS

| | | | |
|---|---|---|---|
| 4,539,528 | 9/1985 | Bayraktaroglu et al. | 330/287 |
| 4,571,555 | 2/1986 | Sigmon et al. | 331/56 |
| 4,706,041 | 11/1987 | Bayraktaroglu | 331/52 |
| 4,751,513 | 6/1988 | Daryoush et al. | 343/700 MS |
| 4,908,615 | 3/1990 | Bayraktaroglu | 343/700 MS |
| 5,155,050 | 10/1992 | Bayraktaroglu | 437/2 |
| 5,386,215 | 1/1995 | Brown | 343/795 |
| 5,585,288 | 12/1996 | Davis et al. | 437/38 |
| 5,675,295 | 10/1997 | Brebels et al. | 331/105 |

OTHER PUBLICATIONS

Bayraktaroglu, B., "Monolothic IMPATT Technology." *Microwave Journal*, pp. 73–86 (Apr. 1989).

Brown, E.R., et al., "Oscillations up to 420 GHz in GaAs/AlAs Resonant Tunneling Diodes," *Appl. Phys. Lett.*, vol. 55, No. 17 pp. 1777–1779 (Oct. 1989).

Brown, E.R. et al., "Oscillations up to 712 GHz in InAs/AlSb Resonant–Tunneling Diodes," *Appl. Phys. Lett*, vol.58, No. 20 pp. 2291–2293 (May 1991).

DeLucia, F.C., et al., "Terahertz Soure Requirements for Molecular Spectroscopy," *SPIE*, vol. 2145 pp. 239–247 (Jan. 1994).

Frerking, M.A., "Submillimeter Source Needs for NASA Missions, *SPIE*, vol.2145, pp. 222–229 (Jan. 1994).

Liou, Wan–Rone, et al., "High Frequency Simulation of Resonant Tunneling Diodes," *IEEE Transactions on Electron Devices*, vol. 41, No. 7 pp. 1098–1111, (Jul. 1994).

McGee, R.A., "Tactical Systems Applications for THz Devices," *SPIE*, vol. 2145, pp. 248–250 (Jan. 1994).

Smith, R.P., "0.1 μm Schottky–Collector AlAs/GaAs Resonant Tunneling Diodes," *IEEE Electron Device Lett.*, vol. 15, No. 6, pp. 295–297 (Aug. 1994).

Munson, R.E., textbook *Antenna Engineering Handbook*, Chapter 7 "Microstrip Antennas" pp. 7–1 —7–28, edited by R.C. Johnson and H. Jasik.

Lin, J., "Active Integrated Antennas", *IEEE Transactions on Microwave Theory and Techniques*, vol. 42, No. 12, pp. 2186–2194 (Dec. 1994).

Plut, Thomas A., et al., "Processing of a Micro Strip Antenna Integrated With Resonant Tunneling Diodes," *3rd Ann. Symp NM Chap American Vacuum Soc.*, (Apr. 1996).

Hietala, V.M., et al., "A Novel High–Power Millimeter–Wave RTD Based Oscillator," *Advanced Heterostructure Workshop*, (Jun. 1996).

Kidner, C., et al., "Power and Stability Limitations of Resonant Tunneling Diodes," *IEEE Trans. on Microwave Theory and Tech.*, vol. 38, No. 7, pp. 864–872 (Jul. 1990).

*Primary Examiner*—Hoanganh Le
*Assistant Examiner*—Hoang Nguyen

[57] ABSTRACT

An antenna comprising a plurality of negative resistance devices and a method for making same comprising employing a removable standoff layer to form the gap between the microstrip antenna metal and the bottom contact layer.

28 Claims, 48 Drawing Sheets

Section 1 - 1

Section 2 - 2

INTEGRATED RESONANT TUNNELING DIODE BASED ANTENNA

GOVERNMENT RIGHTS

The Government has rights to this invention pursuant to Contract No. DE-AC04-94AL85000 awarded by the U.S. Department of Energy.

BACKGROUND OF THE INVENTION

1. Field of the Invention (Technical Field)

The present invention relates to resonant tunneling diode apparatuses and methods of manufacture and to millimeter-wave apparatuses and methods.

2. Background Art

Presently, there is no practical direct solid-state means for power generation at millimeter or submillimeter wave frequencies. IMPATT (Impact Avalanche Transit Time) and Gunn diodes can only produce significant power levels ($\geq 10$ mW) up to frequencies of about 100 GHz with a generation efficiency of less than 1%. The only solid-state approach for generating signals above 100 GHz is to use diode frequency multipliers which further reduces efficiency by more than a factor of five.

Resonant tunneling diodes (RTDs) have demonstrated instabilities at frequencies in excess of 800 GHz. This makes them very promising for millimeter-wave oscillators. Unfortunately, in spite of the high current densities available in these devices, the RF power available is quite small. With current materials, the theoretical best performance of an individual diode is about 10 mW at 100 GHz with a 20 dB/decade rolloff. Only meager power levels of several microwatts have been demonstrated at several hundred gigahertz. The power combiner of the present invention allows for the efficient power combination of many RTDs, greatly enhancing the output power. To date, no attempts have been made to power combine the signals from multiple RTDs.

SUMMARY OF THE INVENTION (DISCLOSURE OF THE INVENTION)

The present invention is of an antenna comprising a plurality of negative resistance devices. In the preferred embodiment, the antenna is a microstrip patch antenna and the negative resistance devices are resonant tunneling diodes (RTDs). The RTDs are preferably formed in an array and placed within a distance of the longitudinal center axis of the microstrip patch antenna, the distance chosen to optimize performance of the antenna. The antenna preferably has a radiation efficiency of approximately five percent or greater and an antenna-to-ground-plane separation of approximately 20 $\mu$m or greater. A plurality of microstrip patch antennas may be employed, each comprising a plurality of RTDs.

The invention is also of a method of manufacturing an antenna comprising: providing a substrate; placing a resonant tunneling diode top contact; etching to form a resonant tunneling diode post; adding a bottom contact layer; depositing a standoff layer; depositing an antenna layer on the standoff layer; and removing the standoff layer. In the preferred embodiment, the substrate comprises a double barrier heterostructure, etching is done by isotropic etching, and a passivation layer is additionally added, preferably a silicon nitride dielectric. The standoff layer is preferably one or more layers of photoresist, leaves exposed the resonant tunneling diode top contact, and is approximately 20 $\mu$m or greater in thickness. Depositing an antenna layer preferably comprises: depositing seed metal to form an electrical contact between a plurality of resonant tunneling diode top contacts; patterning a plurality of posts on the seed metal; depositing support metal; removing the posts; and milling through the seed metal via the post holes. Removing the standoff layer comprises oxygen plasma etching and forming access holes in the antenna layer. The method may be employed to form an electrically interconnected plurality of resonant tunneling diodes and to form a plurality of antennas which may then be formed into an array of antennas.

The invention is also of an antenna operating at above approximately 10 mW output power comprising one or more negative resistance devices and additionally at above approximately 100 GHz.

A primary object of the present invention is to provide a direct solid-state means for power generation at millimeter and submillimeter wave frequencies.

A primary advantage of the present invention is its relatively low cost and power efficiency compared to prior art apparatuses and methods.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings:

FIG. 22(a) is at low bias turn on; FIG. 22(b) is biased near maximum efficiency; FIG. 22(c) is near high bias turn off;

Figure 1A:
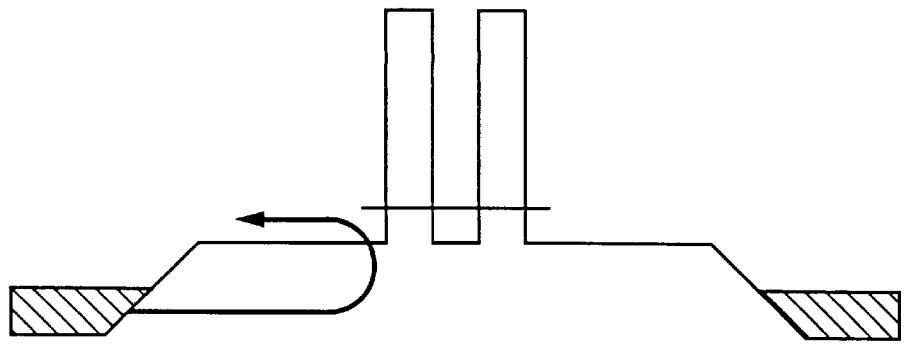
FIGS. 1(a)–(c) are stylized energy band diagrams of an exemplary RTD at different biases, the hypothetical allowed state shown in the well region; arrows represent injected carriers (upward u-turn schematically represents reflection only and no inference is implied to the reflected energy level; (a) is low bias; (b) is bias at peak current; and (c) is bias at valley current.

DESCRIPTION OF THE PREFERRED EMBODIMENTS (BEST MODES FOR CARRYING OUT THE INVENTION)

The present invention is of a quantum-transport device structure and fabrication process for millimeter-wave power generation and other applications. This structure realizes a power combination technique that couples a microstrip patch antenna to a resonant tunneling diode (RTD) array, forming a practical mm-wave power generator. The potential for remarkably high speed operation demonstrated by RTDs makes these devices suitable for coupling to small antennas with resonant frequencies at and beyond 100 GHz where efficient and inexpensive power generation has not yet been achieved.

A salient feature of these devices is a negative-differential-resistance (NDR) region which has been observed at room temperature in a number of material systems. The NDR region has been used as a basis for demonstrating high speed oscillations (712 GHz) and switching (~2 ps). These speeds have been among the fastest reported to date for any electronic device.

Several models were developed incorporating important characteristics of RTDs for circuit and discrete device simulation. In particular, a time domain nonlinear differential equation solver was employed that utilizes empirical or numerical data and numerical models, enabling efficient exploration of transient, steady state, and hysteric behavior with respect to changes in device parameters and numerical models. This numerical tool combined with measurements of first generation RTDs and the use of a 1D nonlinear-Poisson intraband tunneling simulator was employed to design a second generation RTD better suited to the requirements of the applications of the invention. The second generation of AlAs/GaAs/AlAs devices were made and characterized at DC and RF frequencies. The variation of the discrete device character observed for the first generation of RTDs was mitigated to a great extent in the second generation. An RTD DC equivalent circuit has been determined from the analysis of the DC characterization and initial detailed comparisons of the experimental and modeling results. In addition, a power combiner was developed based on resonant tunneling structures coupled to a microstrip patch antenna. A mask set was generated based on this design that includes the first generation of test structures and patch antenna power combiners. Several significant and difficult process problems have been solved and complete patch antenna power combiners were fabricated and tested.

The availability of an efficient moderate-powered ($\geq 10$ mW) solid-state millimeter (30<f<300 GHz) wave or sub-millimeter (f>300 GHz) wave source provides strategic advantages in future radar and communication systems using these frequencies. If history is repeated, future radar and communication systems will be at these frequencies. Indeed, several possible target frequencies for collision avoidance radars for automobiles are 77,90,144 GHz. Additionally, the availability of sources in the operating at a few 100 GHz will be invaluable in many areas of science.

The following items of nomenclature will be used throughout the specification and claims:

| | |
|---|---|
| UV | UltraViolet light |
| RIBE | Reactive Ion Beam Etch (non-isotropic etch) |
| HF | HydroFluoric acid |
| PR | Photo resist (types preferred are 5124; 4330, 4620 from Shipley) |
| RTA | Rapid Thermal Anneal |
| PECVD | Plasma Enhanced Chemical Vapor Deposition |
| RIE | Reactive Ion Etch (isotropic etch) |
| NDR | Negative Differential Resistance |
| $Si_3N_4$ | Silicon-Nitride dielectric material |
| flash | Very thin metal deposition by evaporation (5–10s deposition resulting in about 100Å thickness) |
| reflow | Heating PR beyond glass transition temperature |
| rpm | Revolutions per minute |
| seed metal | Evaporated surface providing electrical contact for plating |
| exposure | UV light dosing to expose PR for subsequent development |
| plating | Electroplating plating (see seed metal) |
| planarize | A method using a resist spinner to produce a flat coat of PR over |

-continued

| | |
|---|---|
| | topography |
| mask | A glass plate with a chrome pattern used for shadow UV exposure of PR |
| ion mill | Argon Ion mill used to remove metal |
| plasma etch | Usually an oxygen plasma to remove platform PR (isotropic) |
| sccm | Standard cubic centimeters per minute (standard STP) |
| STP | Standard Temperature (T = 25° C.) and Pressure (P = 101325 Pa) |
| $CF_4$ | Carbon Tetrafluoride |
| hardbaked | High temperature PR bake (typically 160° C. for 1 hour) |
| passivate | Protect from exposure to air or other chemicals during handling |
| IMPATT | IMPact Avalanch Transit Time device |
| SEM | Scanning Electron Microscope |
| I-V | Short for current (I) versus voltage (V) |
| DC | Direct Current (used commonly to indicate any signal, not just current, at zero frequency) |
| GHz | Giga Hertz = $10^9$ cycles per second |
| RF | Radio Frequency (used here for any high frequency signal) |
| 2D | Two-dimensional |
| RTD | Resonant Tunneling Diode |
| MSA | MicroStrip Antenna |
| RTD-MSA | A power combiner that couples a Resonant Tunneling Diode array with a MicroStrip Antenna |
| mW | MilliWatts |
| dB | DeciBells |
| I-V: | |
| $I_P$ | Maximum in current (Peak) corresponding to a change in the sign of differential resistance |
| $I_V$ | Minimum in current (Valley) corresponding to a change in the sign of differential resistance |
| $V_P$ | The peak voltage occurring with $I_P$ |
| $V_V$ | The valley occurring with $I_V$ |
| RTD: | |
| Rs | RTD series resistance |
| Cj | RTD junction capacitance |
| G-ve | RTD negative differential conductance |
| Leq | RTD inductance |
| Zd | RTD impedance |
| $\parallel$ | Binary operator "in parallel" defined as (A$\parallel$B = A.B/(A + B)) |
| MSA: | |
| L | Antenna length in oscillating direction |
| W | Antenna width perpendicular to oscillating direction |
| h | Antenna spacing from ground plane |
| lo | Resonant wave length (L = $\lambda o/2$) |
| $f_o$ | Resonant frequency |
| D | RTD feed point from antenna center line |
| $R_R$ | Radiation resistance caused by the discontinuity at the edge of the antenna |
| $Z_o$ | Intrinsic characteristic impedance of the antenna |
| $Z_{in}$ | Input impedance of antenna (as seen by RTD) |
| g | Propagation constant of antenna |
| R | Effective resistance per unit length within the antenna |
| c | Speed of light in a vacuum (approximately 2.998E8 m/s) |
| f | Operating frequency |
| TEM | Transverse ElectroMagnetic mode |
| $TEM_{xxx}$ | Transverse ElectroMagnetic mode = xxx |
| p | Is the integer $TEM_{xxx}$ mode number where xxx = 00p |
| K | frequency band 18–28 GHz |
| Q | frequency band 33–50 GHz |
| V | frequency band 50–75 GHz |
| W | frequency band 75–110 GHz |

Figure 55:
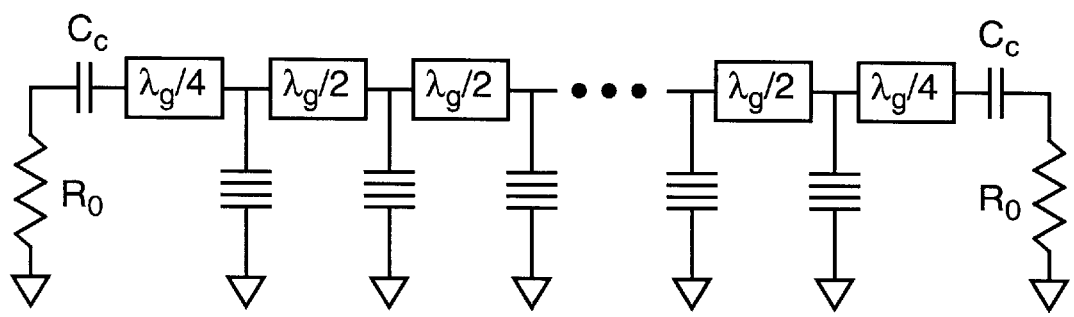
FIG. 55 is a schematic diagram of a prior art linear power combiner.
Figure 56A:
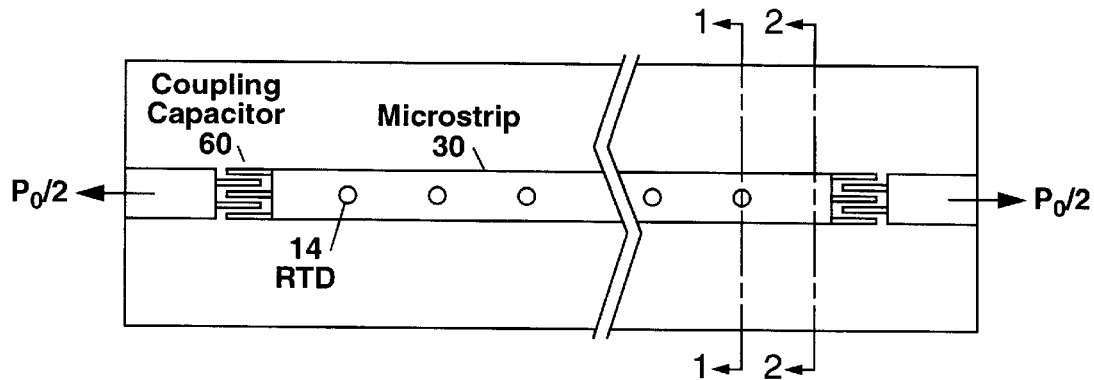
FIGS. 56(a)–(c) illustrate a monolithic RTD oscillator of the invention based on a linear power combiner.
Figure 56B:
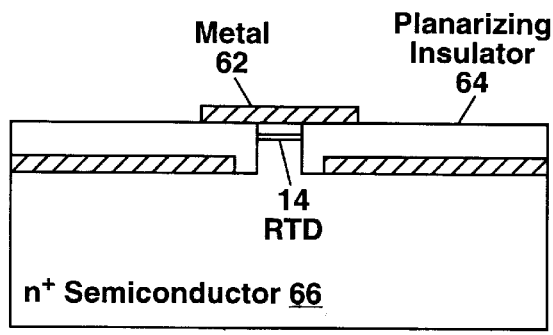
Figure 56C:
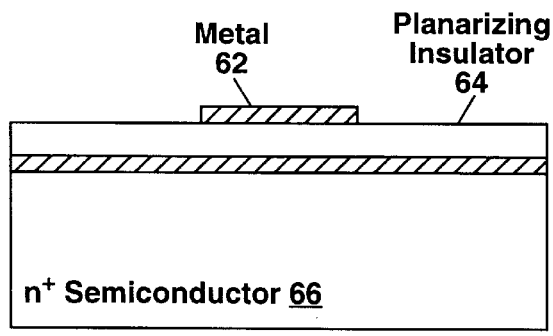

No attempts have been made to power combine the signals from multiple RTDs except for the work described in this report. Power combinations methods, other than the coupled RTD-MSA combiner of the invention, are conceivable. For example, another novel power combination technique considered uses a simple linear resonator circuit as shown in FIG. 55. This method provides efficient power coupling from multiple RTDs (i.e., a low load impedance). RTDs are placed along the resonators length at the voltage null points (n $\lambda$g/2) which allows for an efficient power coupling of the RTDs to the output loads. FIGS. 56(a)–(c) show an exemplary monolithic circuit using this technique, including RTDs 14, microstrip 30, coupling capacitors 60, metal layer 62, planarizing insulator layer 64, and n+ semiconductor 66.

However, the preferred power combination method and device couples a microstrip patch antenna with Resonant Tunneling Diodes (RTDs). This coupling device enables the use of RTDs to generate practical RF power levels at millimeter and submillimeter wave frequencies (100 GHz to several THz).

RTD based cavity oscillators have been demonstrated at frequencies up to 712 GHz though with very small power levels (~1 $\mu$W). Additionally, simple AlAs/GaAs RTDs have been shown theoretically to have maximum frequencies of oscillation in excess of 900 GHz. However, in typical use, generated power levels are severely limited due to the high current density and the small operating voltage range characteristic of the RTD. These characteristics result in a very low output impedance that is difficult to couple efficiently to a load. A solution to this problem using an integrated patch antenna is provided by the present invention.

A microstrip patch antenna is integrated with RTDs to form an active radiating cavity. The patch antenna, being a resonant system, forms a cavity with a geometry determined frequency of oscillation. Most importantly, this resonant cavity is designed in a manner to insure that it radiates with resistance matched to the RTD output impedance. In addition, the antenna can be appropriately "loaded" with numerous RTDs allowing for effective power combination. Resulting power levels should be several milliwatts at millimeter and submillimeter wave frequencies.

Figure 1B:
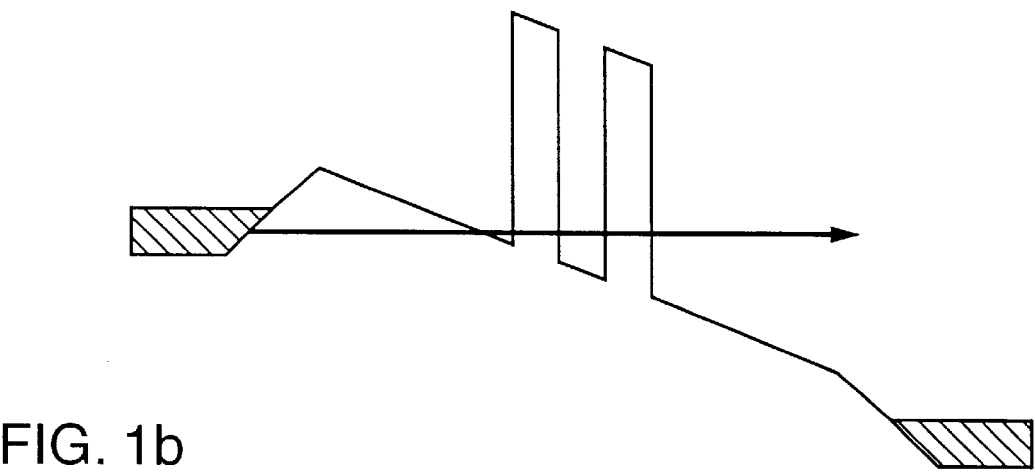
Figure 1C:
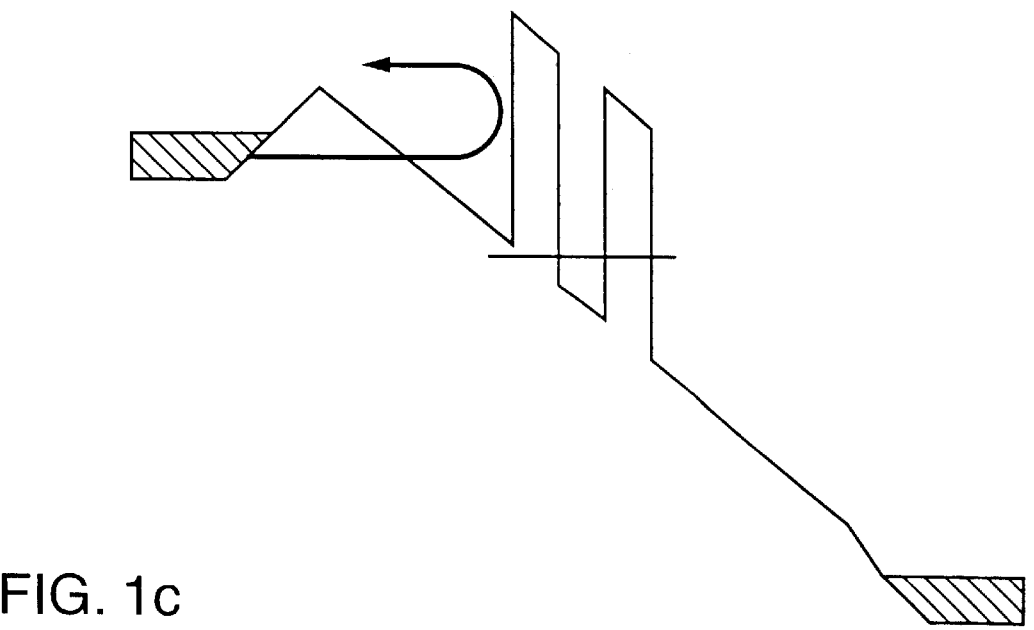
Figure 2:
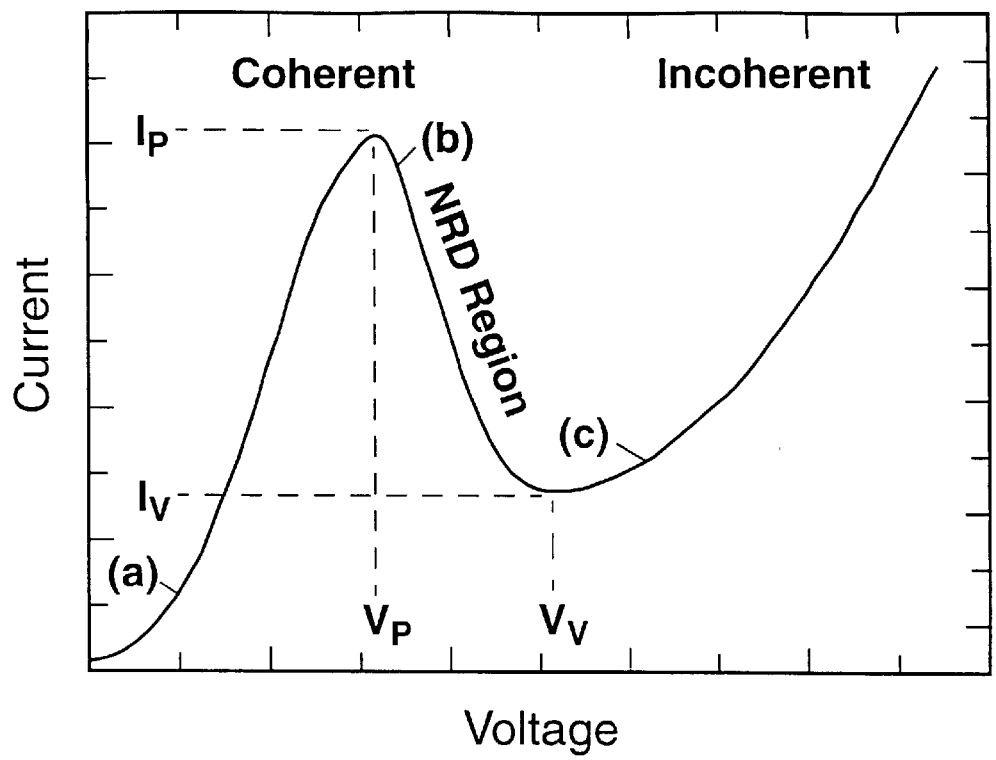
FIG. 2 is I–V curve of an exemplary RTD; bias conditions from FIG. 1 are shown at corresponding points (a), (b), and (c)

The Resonant Tunneling Diode (RTD) has been extensively studied and is the topic of hundreds of published papers. The most relevant work to the subject of this report is that by Elliot Brown, et al., "Oscillations up to 712 GHz in InAs/AlSb resonant-tunneling diodes", *Applied Physics Letters* 58:20, pp. 2291–93 (May 1991). Operation of an RTD relies on transport through the quasi-bound quantum state which exists in a conduction band energy "well". The bias voltage applied to the device effects the alignment of the energy level of the incident electrons with respect to the allowed state(s) of the quantum well and thus greatly affects the current through the device. FIG. 1 shows three hypothetical energy band diagrams of an RTD under bias conditions representing important extremes of operation. FIG. 1(*a*) shows a bias condition with the average incident electron energy less than the lowest allowed state within the quantum well (center) resulting in nearly total reflection of the electrons and a correspondingly low current through the device. FIG. 1(*b*) shows a bias condition with average incident electron energy matching the energy level of the quantum state. This condition is often referred to as resonant and results in a high transmission probability and hence a large current of electrons through the device. FIG. 1(*c*) shows a bias condition with average incident electron energy greater than the energy of the allowed state. In this condition, the transmission probability is reduced significantly and the current drops with respect to the resonant condition. This drop in current as the bias is increased, results in a region of Negative Differential Resistance (NDR region) allowing for active device operation (oscillation with an appropriate external circuit). FIG. 2 shows the resulting I–V curve for a typical RTD. The resulting I–V curve shows a large NDR region as desired. The large current increase at high bias is due to other transport mechanisms not directly related to the described resonant tunneling mechanism. Due to the typically small dimensions of the RTD, resulting in short transit times, and the use of undoped material for the barriers and well, reducing the device capacitance, the RTD is potentially an extremely fast device. In fact, they are considered the fastest electronic semiconductor device in existence today.

Figure 3:
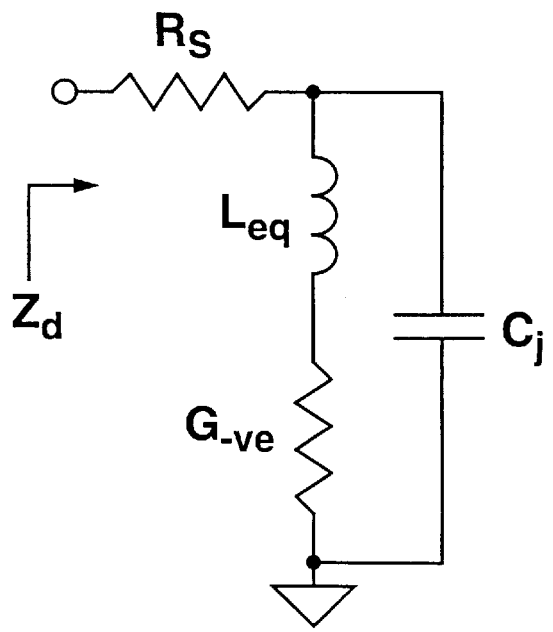
FIG. 3 is a diagram of a small-signal equivalent circuit of an RTD.

The RTD's small-signal electrical characteristics can be described by the equivalent circuit model shown in FIG. 3. The series resistance $R_s$ represents the resistance of the doped (n$^+$) layers and ohmic contacts required on both ends of the device. $R_s$ is determined by classical solutions. The capacitance $C_j$ represents the junction capacitance of the depletion layer in the device. To first order, this capacitance can be estimated by a simple parallel plate model. The conductance $G_{-ve}$ represents the negative conductance resulting from the quantum mechanical current described above. Finally, the inductance $L_{eq}$ represents the transit time of the electrons through the device. In general, $C_j$, $G_{-ve}$, and $L_{eq}$ are complex functions of bias and frequency.

The equivalent circuit of FIG. 3 can be easily solved for the diode's impedance, $Z_d$:

$$Z_d = R_s + \frac{1}{j\omega C_j} \| \left( j\omega L_{eq} + \frac{1}{G_{-ve}} \right). \tag{1}$$

The maximum frequency of oscillation is defined as the frequency at which the real part of the diode admittance (Re(1/$Z_d$)) is equal to zero. Also for stable oscillation, the "load" attached to the diode must have an admittance equal to the negative diode admittance. Therefore, the oscillation frequency corresponds to the imaginary part of the admittance being equal and opposite, and the amplitude of the oscillation corresponds to the effective real admittance being equal in magnitude. The effective real part of diode admittance decreases with increasing amplitude allowing for stable oscillation.

Figure 4:
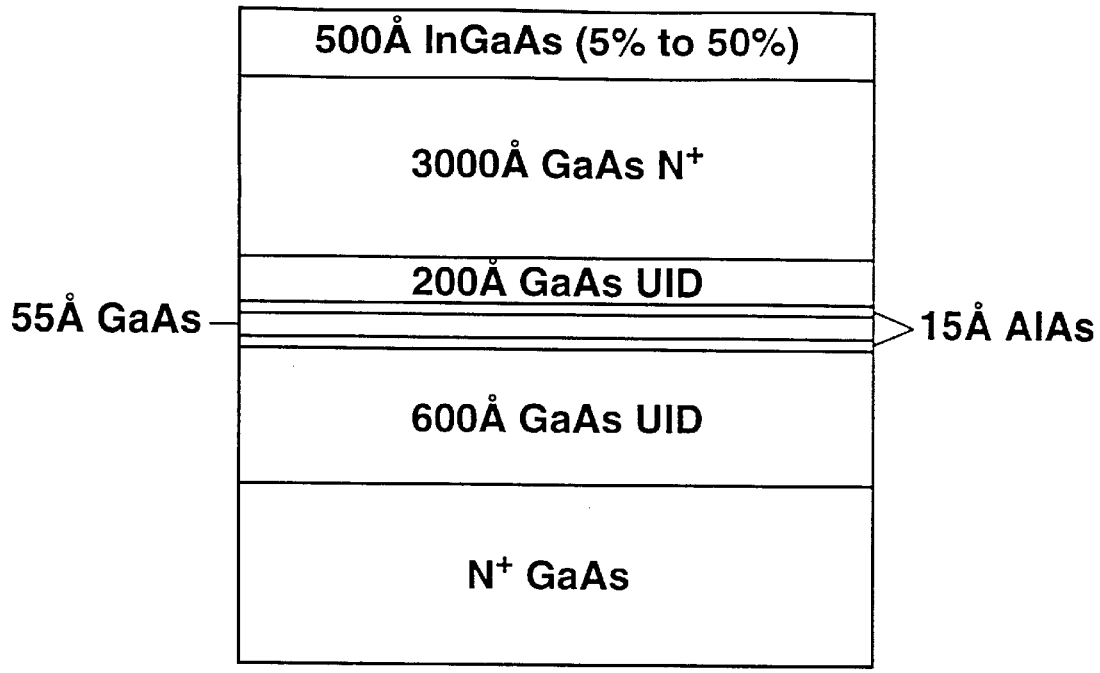
FIG. 4 is a schematic of a first RTD structure of the invention.

FIG. 4 shows the dimensions and composition of the first generation RTD design used in this report. This design is the result of extensive RTD simulation and represents an evolution of a device similar to that described by Smith et al., "0.1 μm Schottky-Collector AlAs/GaAs Resonant Tunneling Diodes", *IEEE Transactions on Electronic Devices* 41:7, pp. 1098–1111 (July 1994), or Brown et al., "Oscillations up to 420 GHz in GaAs/AlAs resonant tunneling diodes", pp. 1777–79 (October 1989). The material structure shown is for a top ohmic contact. The top ohmic contact may be eliminated and replaced with a Schottky contact. Simulations indicate that an ohmic contact design will offer high efficiency operation at low frequencies (<200 GHz) whereas the Schottky contact design will result in a lower series resistance and a much higher maximum oscillation frequency (~1 THz), but with a lower source efficiency. Briefly, for high-speed operation an RTD must be designed for minimum capacitance, low series resistance, and high current density. The capacitance can be minimized by maximizing the thickness of the undoped layers. The diode's series resistance can be minimized by reducing contact resistance and by maximizing the doping in the doped layers. High current densities can be achieved by maintaining ballistic transport through the undoped layers by keeping their total thickness less than the electron coherence length and by carefully selecting the barriers, well and spacer thickness.

Figure 5:
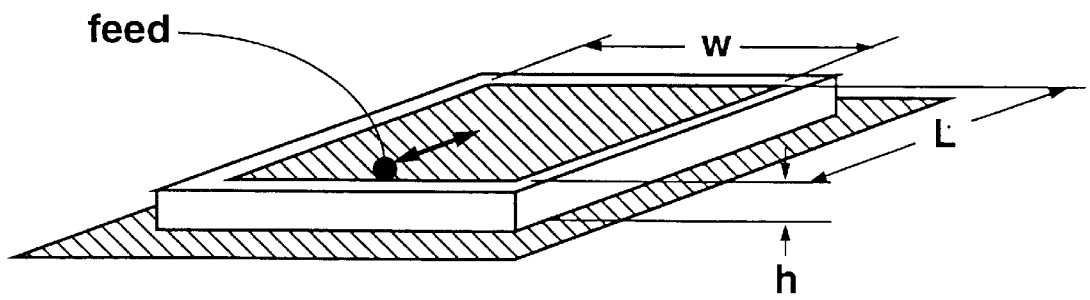
FIG. 5 is a diagram of an exemplary microstrip patch antenna.
Figure 6:
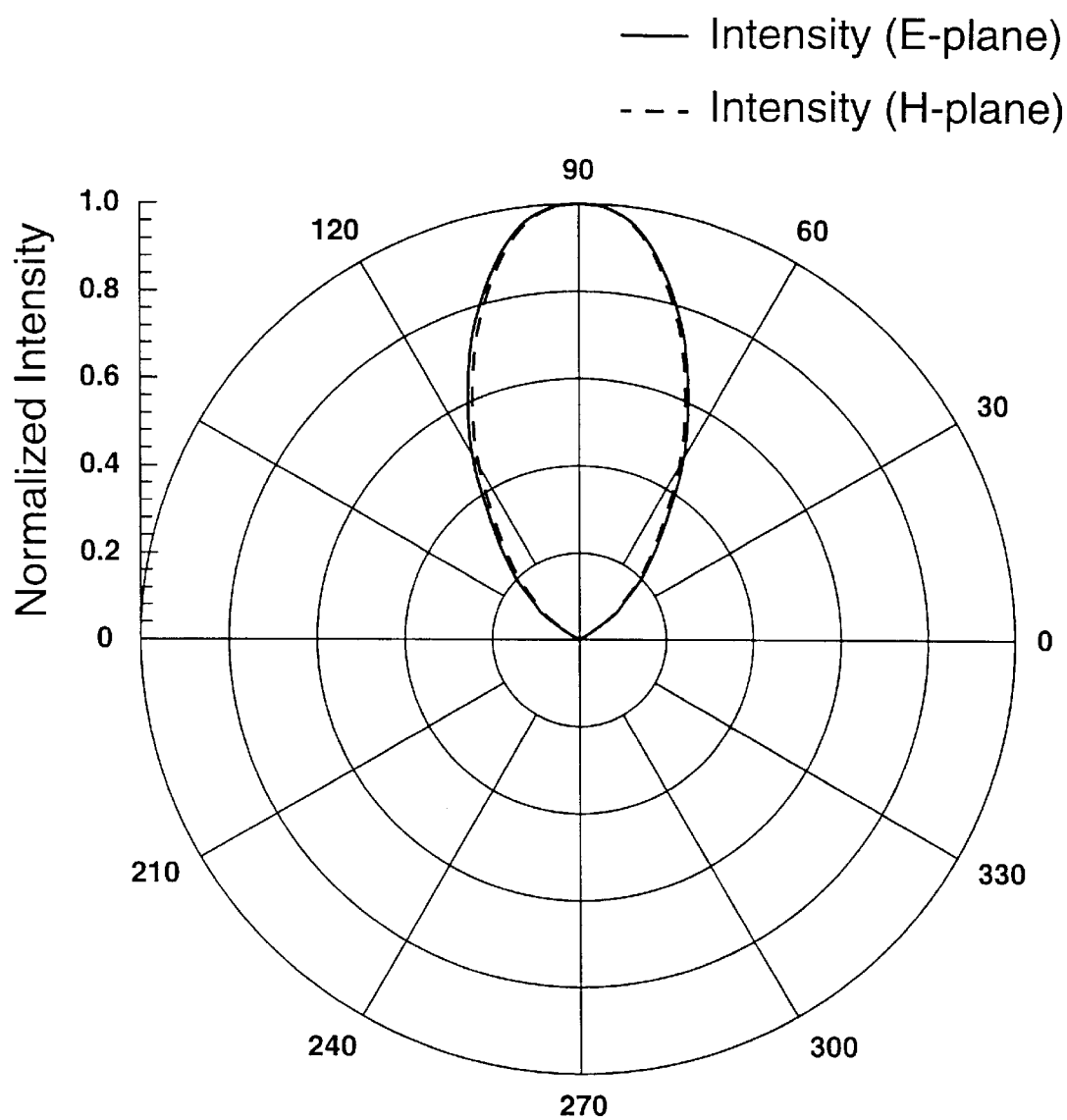
FIG. 6 illustrates the radiation pattern from an exemplary microstrip patch antenna; calculation is for L=$\lambda_0$/2, and W=11/15 $\lambda_0$.

The microstrip patch antenna is popular due to its simple construction and design. A microstrip antenna is simply a rectangular patch of metal appropriately configured over a metal ground plane (see FIG. 5). It is very compatible with the microstrip technology commonly used for microwave circuits, thus allowing for antennas to be "integrated" with electronic circuits. This integration normally occurs on the printed circuit board level, though patch antennas have been integrated monolithically with active components. FIG. 6 shows the radiation pattern of a simple patch antenna for both the E and H planes. The radiation pattern for the electric field E is given by:

$$E = E(\pi/2)\cos\left( \frac{\pi}{2\sqrt{\varepsilon r}} \cos(\phi) \right) \tag{2}$$

where $0 \leq \phi \leq \pi$ is the angle made with the ground plane, $\varepsilon_r$ is the relative permittivity. The half power beam width is about 50° in both planes. Such a radiation pattern is desirable due to its symmetry and reasonably narrow beam width.

Figure 7A:
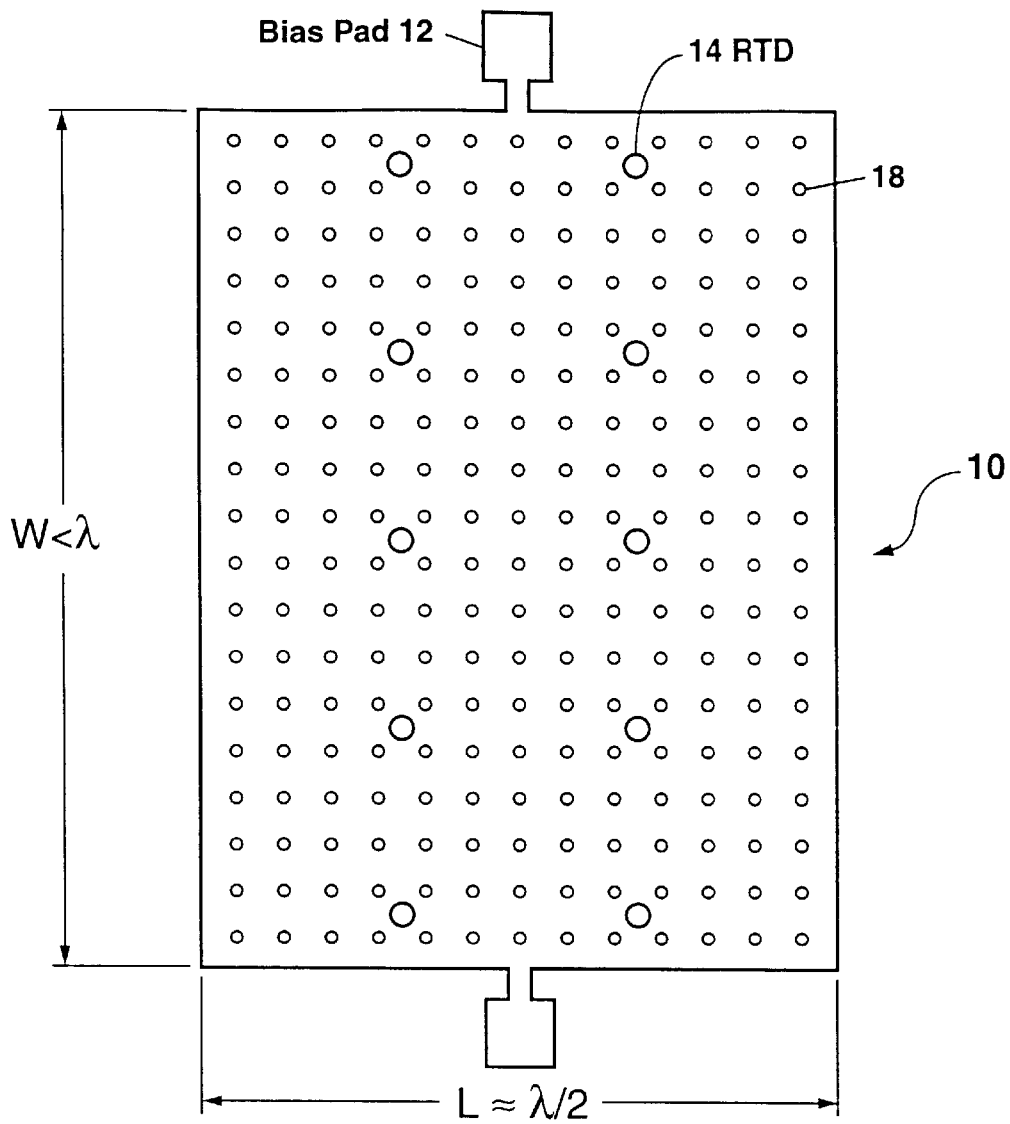
FIGS. 7(a) and (b) are top and side views of the integrated RTD and patch antenna of the invention.
Figure 7B:
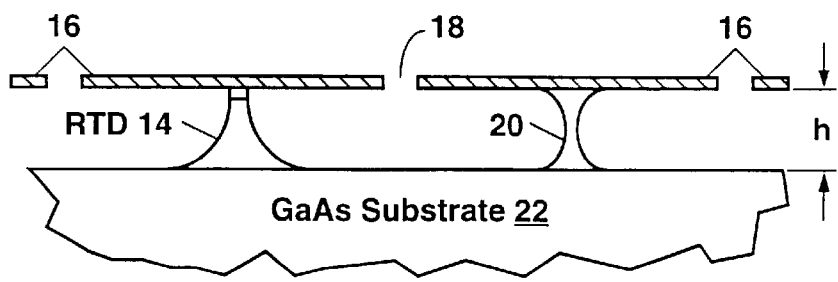

In the power combiner of the present invention, active components are merged with the patch antenna. FIG. 7 shows one method of integrating RTDs 14 with a patch antenna 10 with bias pads 12. To minimize antenna losses, an air dielectric is used where the top of the patch antenna is suspended by the RTDs and dielectric (for example, a polyimide such as PMGI, but preferably photoresist) support posts 20 between substrate 22 and metal antenna layer 16 as shown in FIG. 7(b) and discussed in the next section. Note that the posts are preferably formed by the removal of all but a small amount of dielectric through removal hole 18.

Figure 8:
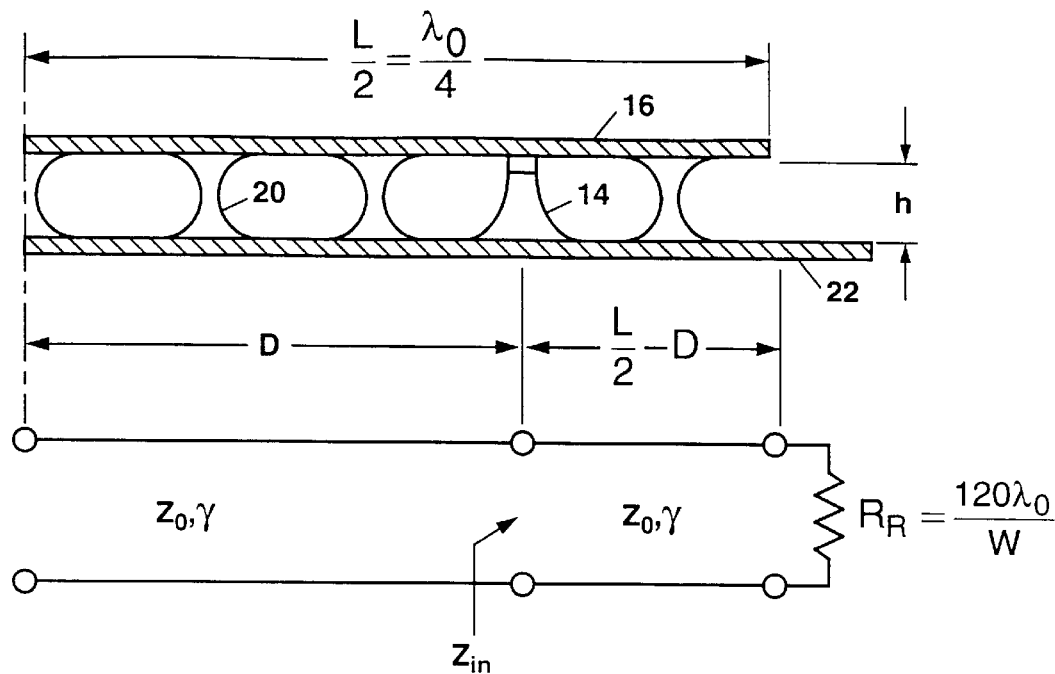
FIG. 8 provides the model used for impedance calculations concerning the invention.

To assure oscillation, the equivalent circuit of the antenna shown in FIG. 8 can be solved and the expression for the diode's impedance given by Eq. (1) can be used. Assuming symmetric operation (diodes on both sides of the antenna center line), the input impedance, $Z_{in}$, to the antenna is:

$$Z_{in} = Z_0 [\tanh \gamma D] \| Z_0 \left[ \frac{R_R \cosh \gamma (L/2 - D) + Z_0 \sinh \gamma (L/2 - D)}{Z_0 \cosh \gamma (L/2 - D) + R_R \sinh \gamma (L/2 - D)} \right] \quad (3)$$

where D is the feed point from the antenna's center, L is the antenna's length ($\sim \lambda/2$), $R_R$ is the radiation resistance caused by the discontinuity at the edge of the antenna, $Z_o$ is the effective characteristic impedance of the antenna, and the propagation constant, $\gamma$, is:

$$\gamma = \alpha + j\beta \approx \frac{1}{2} \frac{R}{Z_0} + j\frac{\omega}{c} \quad (4)$$

where R is the effective resistance per unit length within the antenna, and c is the speed of light. The antenna's characteristic impedance is estimated to be that of a parallel plate waveguide:

$$Z_0 \approx \frac{377h}{W} \Omega \quad (5)$$

where W is the antenna's width, and h is the antenna's height above the ground plane. For gold metalization at frequencies were the metal's thickness greatly exceeds the skin depth, the antenna's resistance per unit length is approximately:

$$R \approx \frac{0.1865}{W} \sqrt{\frac{f}{10^{11}}} \Omega/m \quad (6)$$

where f is the operating frequency. This expression is semi-empirical and is based on a match to a quasi-TEM analysis at $10^{11}$ Hz and assuming a standard square-root frequency dependence.

Eq. (3) gives the antenna's feed impedance as a function of diode placement, D. This can be combined with Eq. (1) to study oscillation behavior as a function of diode placement. As already discussed, the conditions for oscillation startup can be expressed as:

$$\text{Re}\left(\frac{1}{Z_{in}}\right) + \text{Re}\left(\frac{1}{Z_d}\right) > 0 \quad (7)$$

and $$\text{Im}\left(\frac{1}{Z_{in}}\right) + \text{Im}\left(\frac{1}{Z_d}\right) = 0. \quad (8)$$

Figure 9:
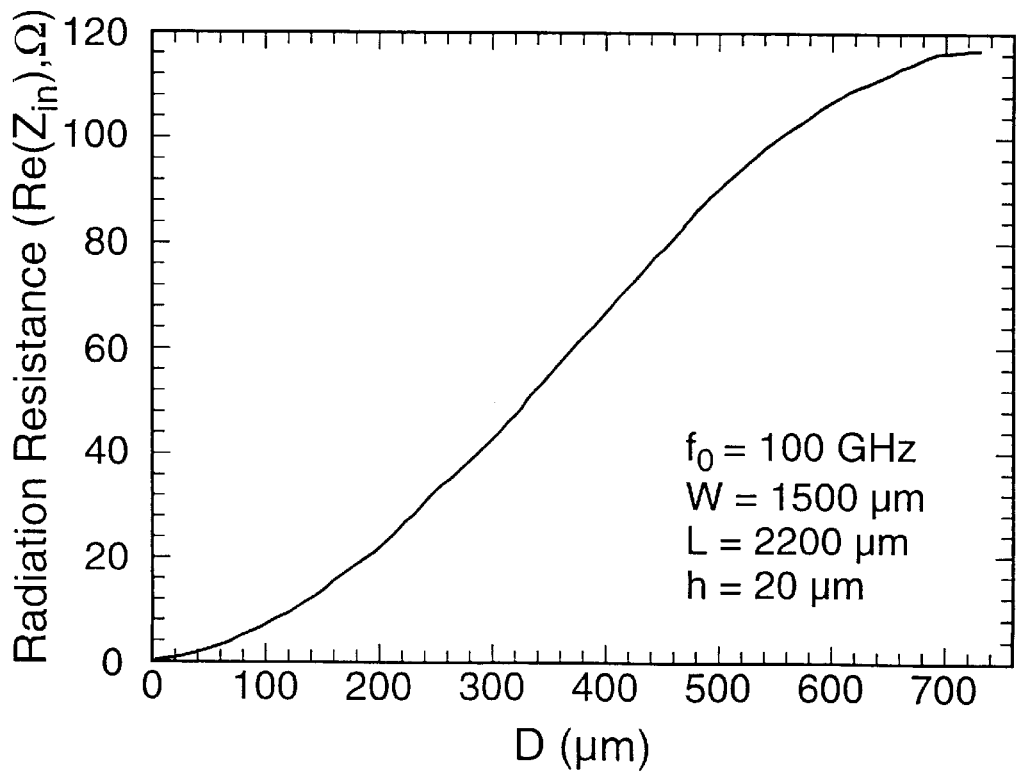
FIG. 9 is a graph of radiation resistance as a function of diode position, D.

Eq. (7) is of primary concern for startup as in general some frequency will exist that satisfies Eq. (8). Eq. (8) is very frequency dependent and essentially determines the frequency of oscillation. FIG. 9 shows a plot of the Re($Z_{in}$) of the antenna as a function of diode placement. For the calculation, the resonant frequency was assumed to be 100 GHz with W=1500 μm, L=2200 μm, and h=20 μm. At the center of the antenna, D=0, the impedance approaches zero, and at the edge of the antenna the impedance approaches the value $R_R$. As a result, diode placement offers a great deal of flexibility to maximize power transfer from the RTDs. An impedance and corresponding placement can be selected to match the maximum power coupling for a given RTD design.

Figure 10:
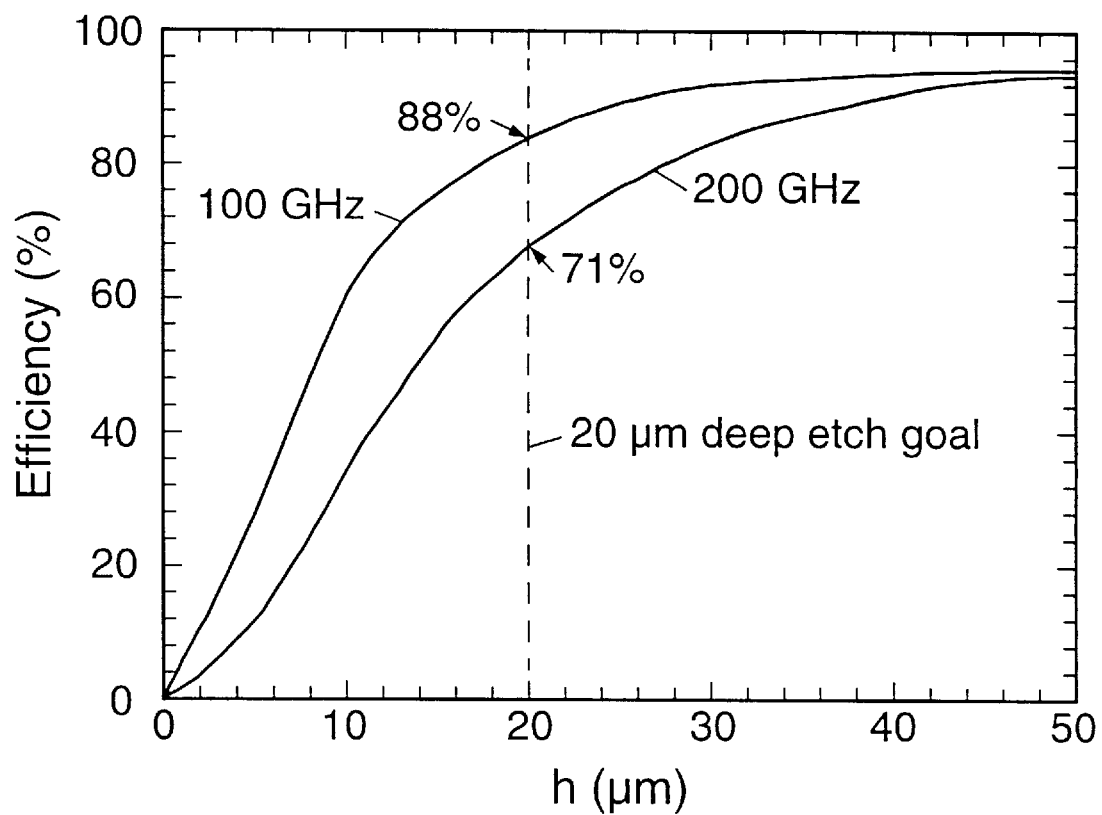
FIG. 10 is a graph of antenna efficiency as a function of antenna height above ground plane, h, at 100 and 200 GHz with values at the design point (h=20 µm)

Using the antenna model discussed above, performance has been explored theoretically for a 100 GHz and 200 GHz patch with dimensions of W=λ/2 and L=11/15 λ. A very important result of this analysis is the effect of antenna patch height above the ground plane on the antenna efficiency. This effect is shown in FIG. 10. The efficiency is defined here as the ratio of power radiated to input power and h is the patch height above the ground plane. It was found that efficiency is limited by increasing metal losses as h is decreased. From this result, antenna-to-ground-plane separation of 20 μm is possible.

Figure 11A:
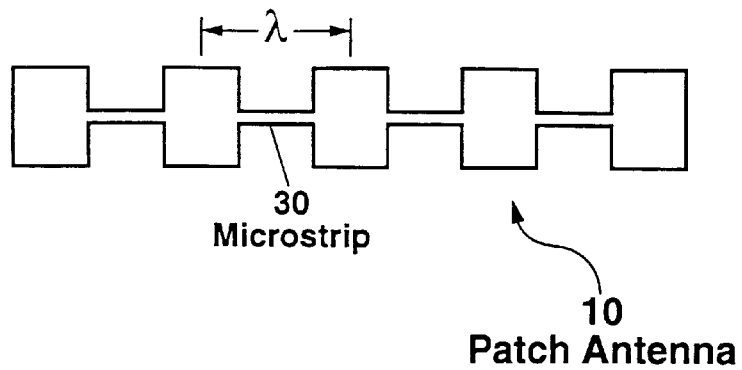
FIG. 11 illustrates two possible arrays of RTD patch antennas of the invention.
Figure 11B:
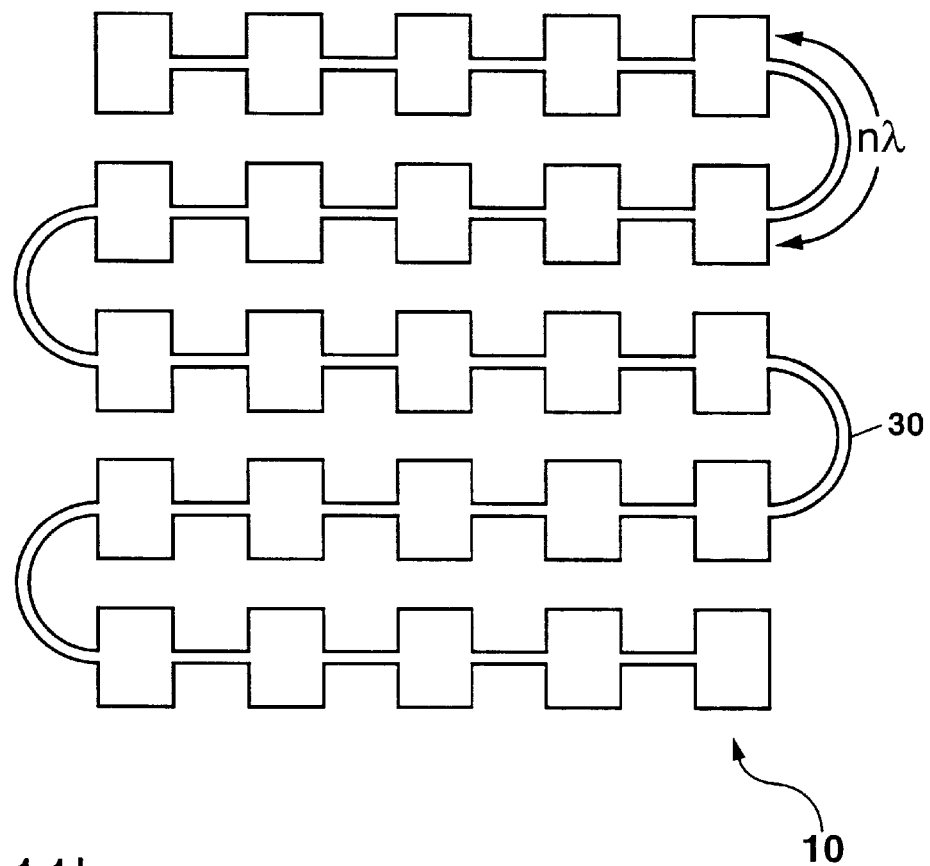
Figure 12A:
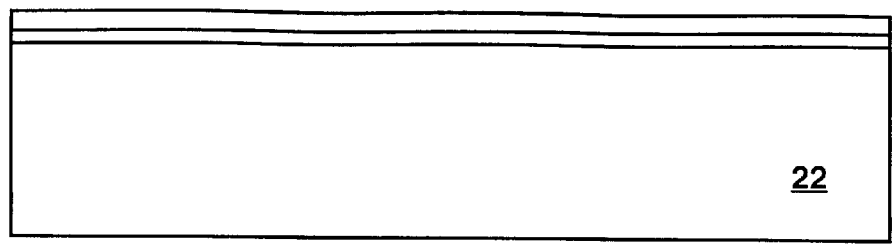
FIGS. 12(a) through (i) illustrate the preferred method of manufacture of the RTD of the present invention.
Figure 12B:
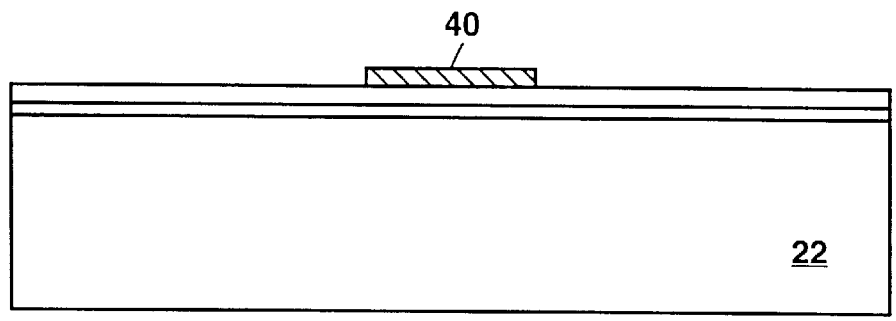
Figure 12C:
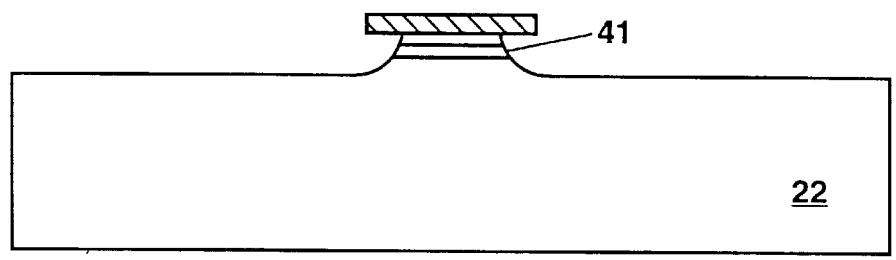
Figure 12D:
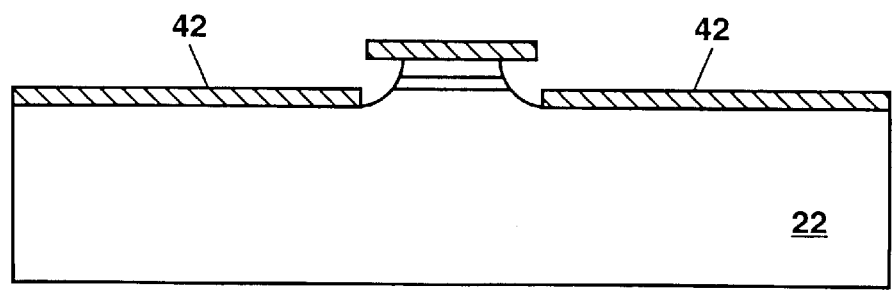
Figure 12E:
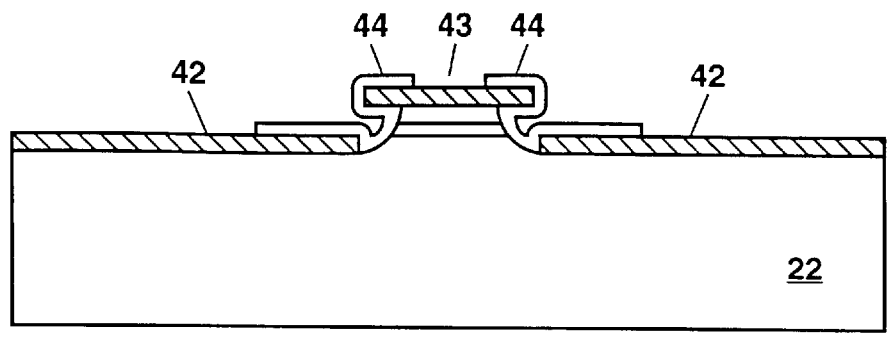
Figure 12F:
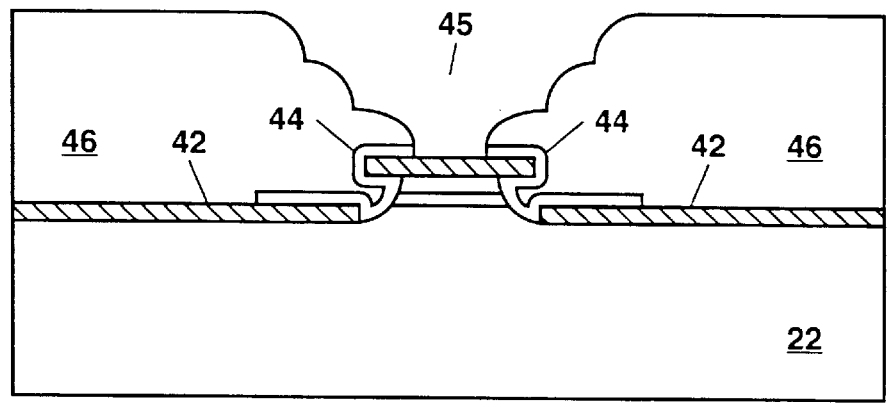
Figure 12G:
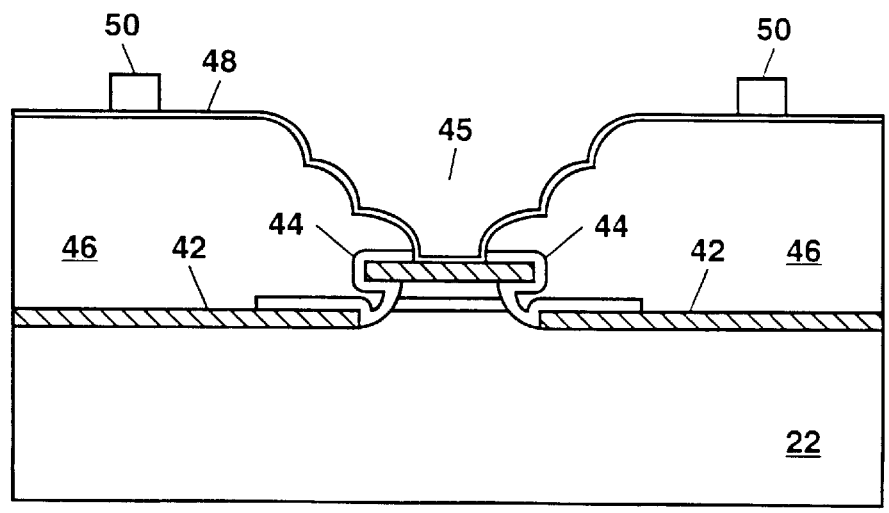
Figure 12H:
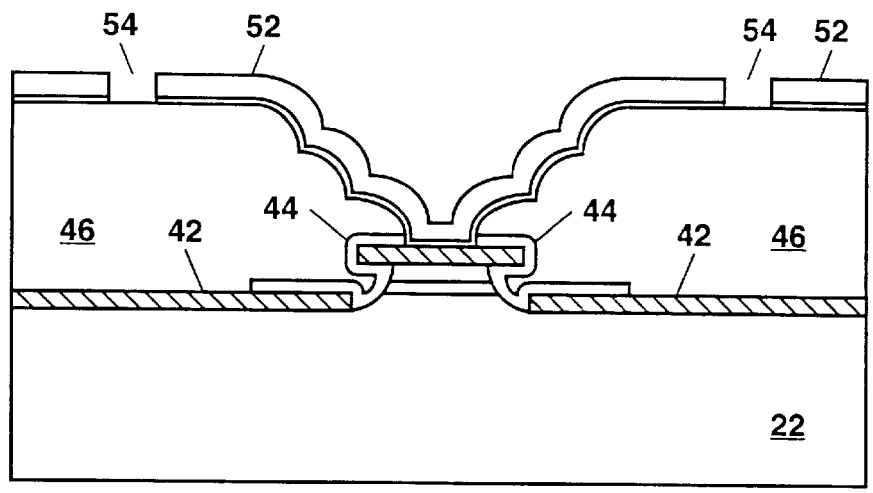
Figure 12I:
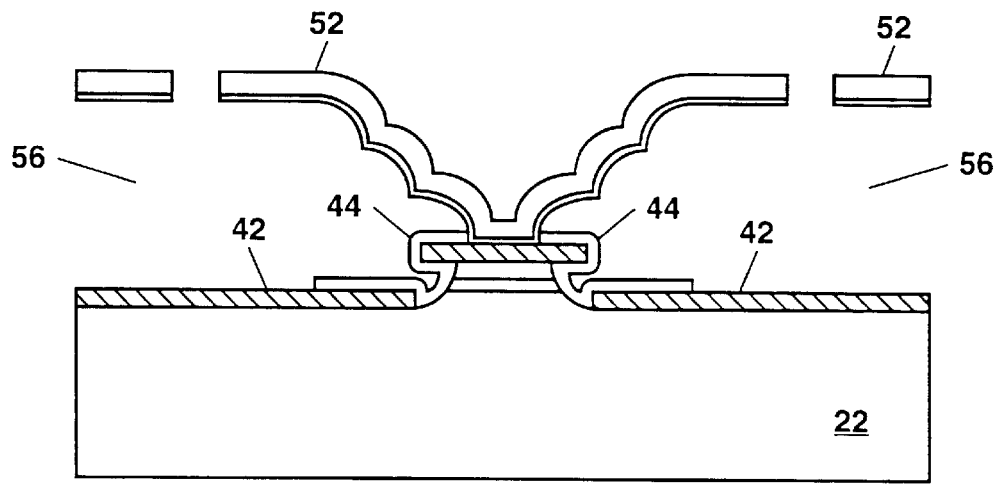

It is important to realize that the fabrication process for an individual patch is naturally extendible to arrays of patch antennas achieving even higher power levels. Specifically, the phase of the patches can be synchronized by interconnecting the patches with microstrip lines 30 as shown in FIG. 11. FIG. 11(a) shows a one-dimensional array of patch antennas 10 and FIG. 11(b) shows a hypothetical two-dimensional array. With proper element placement and phase control, the resulting power level will be n times the power of an individual patch (n patches) with a radiation pattern much narrower than that shown in FIG. 6.

FIG. 12 is a synopsis of the process sequence used to fabricate the RTD-MSA device. The process begins (FIG. 12(a)) with a wafer 22 that has been prepared as described in Tables 1–4 having a double barrier RTD structure grown at the surface of the wafer. A metal anode contact dot 40 is evaporated on to the wafer surface (FIG. 12(b)). After the contact is deposited, an isotropic etch is done using the dot as a self-aligned etch mask (FIG. 12(c)). The etch undercuts the dot and defines the RTD post 41 isolating the RTD double barrier junction. After the etch, the cathode metal 42 is evaporated and annealed (RTA) (FIG. 12(d)). The anode dot and the etch undercut prevent the cathode deposition from shorting the RTD. Following the cathode deposition, the RTD sidewalls are passivated with a silicon-nitride dielectric 44 (FIG. 12(e)). This dielectric is also deposited in areas over the cathode (not shown) where the anode contact pads are located to isolate the pads from the cathode. The dielectric extends over a portion of the cathode, the RTD sidewalls and the perimeter of the anode dot contact. However, a hole 43 at the center of the anode contact dot remains. The RTD is now electrically isolated from the cathode and protected from subsequent processing. After passivation, a 3-layer process is used to make a thick PR standoff platform 46 over which the antenna will eventually be plated (FIG. 12(f). Great care must be taken to provide access for electrical contacting to the center of the anode dot resulting in a structure called the anode dimple 45. Once the platform is constructed, a metal seed layer 48 is deposited, which electrically connects together all the RTDs in an antenna and PR is patterned 50 to define the antenna and etchant access holes 54 (FIG. 12(g)). The antenna is then plated 52 and the defining PR removed. However, seed metal in the access holes and in between antenna structures still remains. This metal is milled away with argon ions to complete this process step (FIG. 12(h)). All that remains to complete the devices is to remove the PR standoff platform. This removal is accomplished with an oxygen plasma etch resulting in the completed structure shown in FIG. 12(i), including vacant area 56. Note that not quite all PR is removed, because enough must be left to form support posts as shown in FIGS. 7 and 8. This is accomplished by proper timing of the oxygen plasma etch.

Two software tools were used to evaluate RTD specifications for the RTD-MSA application. The first tool is a 1D self-consistent nonlinear Poisson-quantum simulator. The second tool is a Large signal nonlinear time domain simulator allowing either measured or theoretical RTD characteristics to be coupled with a model of the microstrip antenna.

Figure 13:
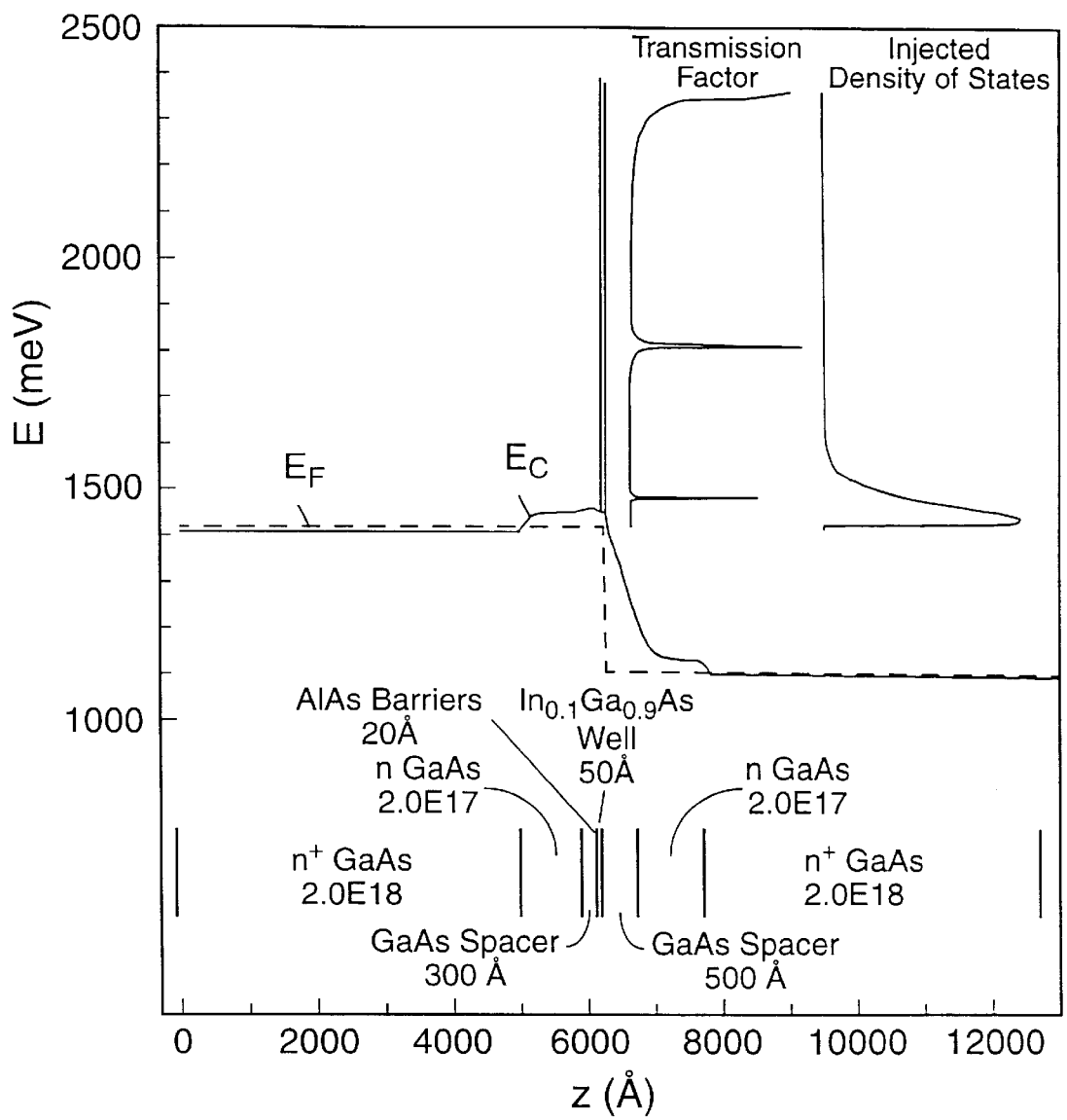
FIG. 13 graphs the result of a typical quasi-self-consistent quantum transport simulation in one dimension at a 0.3V bias.

The 1D simulator was modified to include quantum mechanical current transport effects. A semiclassical current transport model coupled with a intra-band tunneling transport model were used to provide quasi-selfconsistent simulations of the RTD I–V characteristics. A typical simulation using this tool is shown in FIG. 13. A conduction band edge $E_C$ and fermi level $E_F$ are shown as a function of depth within the RTD device. Also shown are the transmission factor and injected density of states. The product of these two components corresponds to the current density at the given voltage bias (in this case 0.3V). A complete I–V determination requires the calculation of the band edge and corresponding transmission factor and density of states for each voltage bias. The transmission factor for this device (see Table 2) clearly shows two quasi bound states within the quantum well. Also evident in the transmission factor is an abrupt increase near the top of the barriers beyond which classical transport occurs. The injected density of states reflects the probability that a given transport energy will be occupied by an electron. This component is essentially zero for energy levels much above the lowest resonance spike in the transmission factor and therefore, only the lowest resonance state (the quasi-bound ground state) contributes significantly to the current.

The injected density of states is determined primarily by the buffer and spacer regions to the left as these are relatively large compared to the quantum barrier and well structure at the center of the plot. Since electrons are being transported the right hand band structure has no effect on the injected states for this sense of bias. The shape of the injected density of states depends on the density of states of the material more than 1000 Å to the left of the well due to the finite transport mean free path and also on the temperature. Since room temperature operation is desired, the temperature of this simulation is 300° K. or approximately $k_B T = 25$ meV and is too low for current to flow through the second state or for thermal activation above the barriers which are about 1V high.

Figure 14:
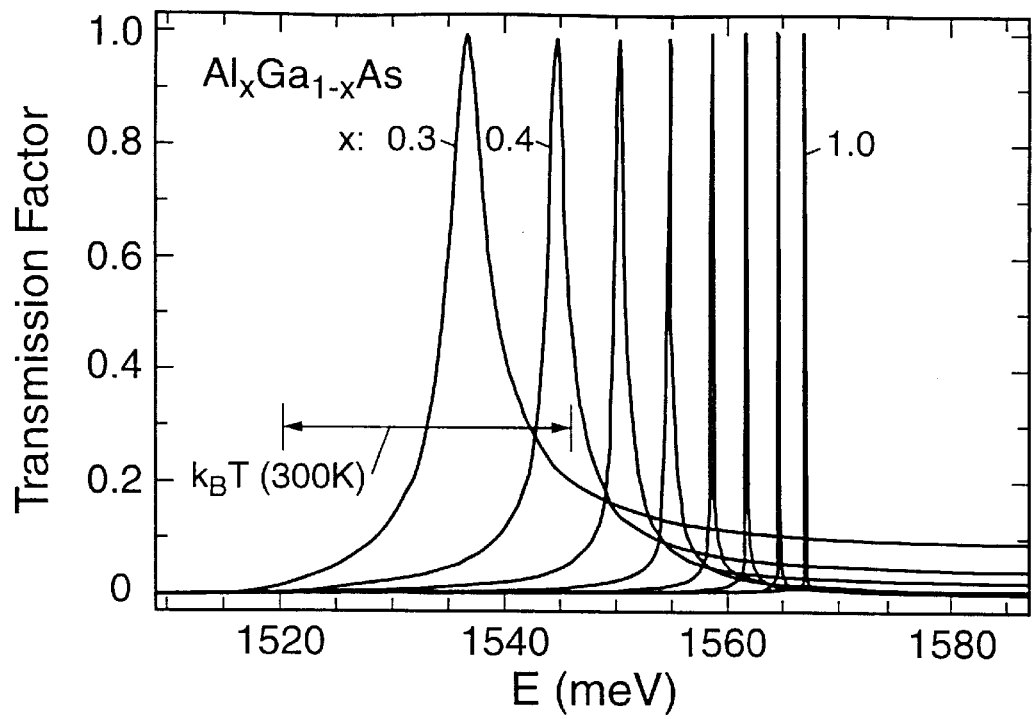
FIG. 14 graphs transmission factors resulting from a barrier height study using AlGaAs alloy barriers and an InGaAs well; as barrier height increases (x->1.0), the resonance width dramatically decreases.
Figure 15:
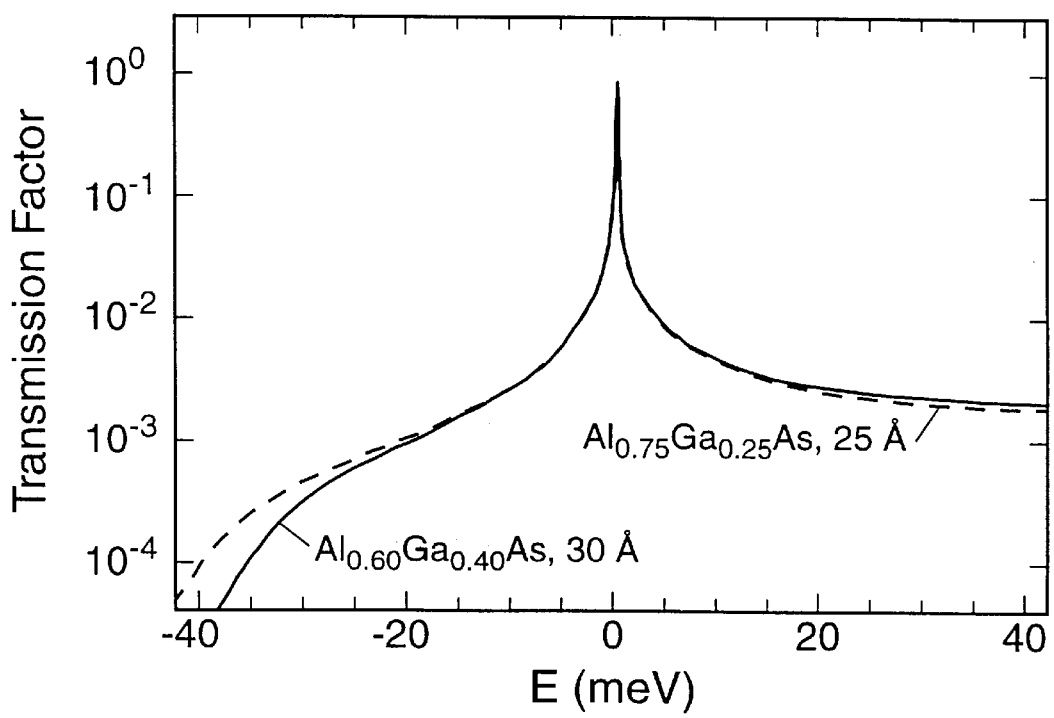
FIG. 15 graphically compares the transmission factors from combinations of barrier heights (composition) and widths.

In contrast with the injected states, the transmission factor is determined almost entirely by the well and barrier structure. The energy separation of the first and second resonance states depends strongly on the quantum well width and the resonance width depends on the barrier width and height. The quasi-bound state separation increases with decreasing well width while the resonance width increases with decreasing barrier width or height. The effect of barrier height can be seen, for example, in the results of a study presented in FIG. 14. The transmission factor is shown as function of the quantum well barrier height corresponding to the AlAs composition the alloy. As the barrier height increases with the alloy approaching pure AlAs, the resonance width dramatically decreases. Because the resonance is effected by both the barrier height and widths a family of similar resonances can exist with specific combinations of barrier height (composition) and width (see for example FIG. 15).

Figure 16:
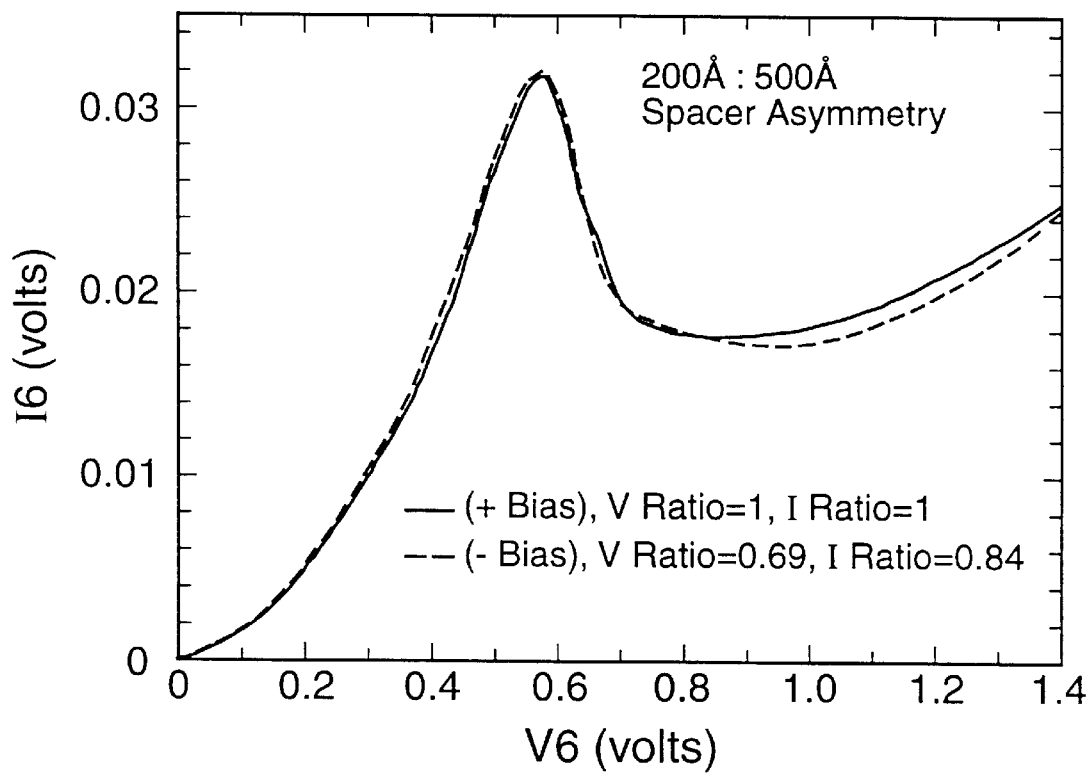
FIG. 16 graphs the normalized I–Vs, demonstrating the effect of spacer widths on voltage and current; the voltage ratio is about 0.69 and the current ratio is about 0.84 in this instance.

In the structures grown, only pure AlAs barriers and a pure GaAs well are preferably used. As a result in this case, only the layer widths remain as a design variable. Since the transmission factor is 1 at resonance the resonance width strongly effects the current density value especially for relatively narrow resonances. The Emitter-collector standoff distance (spacer) ratios can be used to scale the voltage axis (voltage lever arms). In the low peak current density limit, $$V_1/(x_0+x_1) \approx V_2/(x_0+x_2) \tag{9}$$

where $x_0$ is the half width of the quantum well and barrier structure ($\sim(20+50/2)$Å=45 Å) and $x_1$ and $x_2$ are the spacers and $V_1$ and $V_2$ are corresponding voltage artifacts. With a spacer asymmetry $x_1:x_2=200:500$ Å the voltage ratio, from Eq. 9, $V_1/V_2=0.45$ which can be compared with the observed value of 0.69 as shown in FIG. 16). As can also be seen, the emitter spacer width has a moderate effect on the current density. Finally, the well width and composition can be used to tailor the position of the peak voltage.

Figure 17:
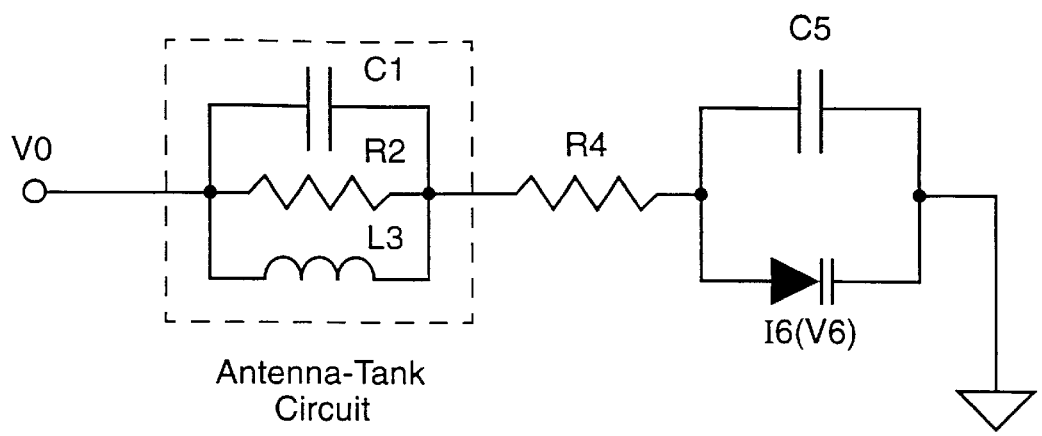
FIG. 17 is a diagram of an equivalent circuit for the RTD-MSA device of the invention.
Figure 18:
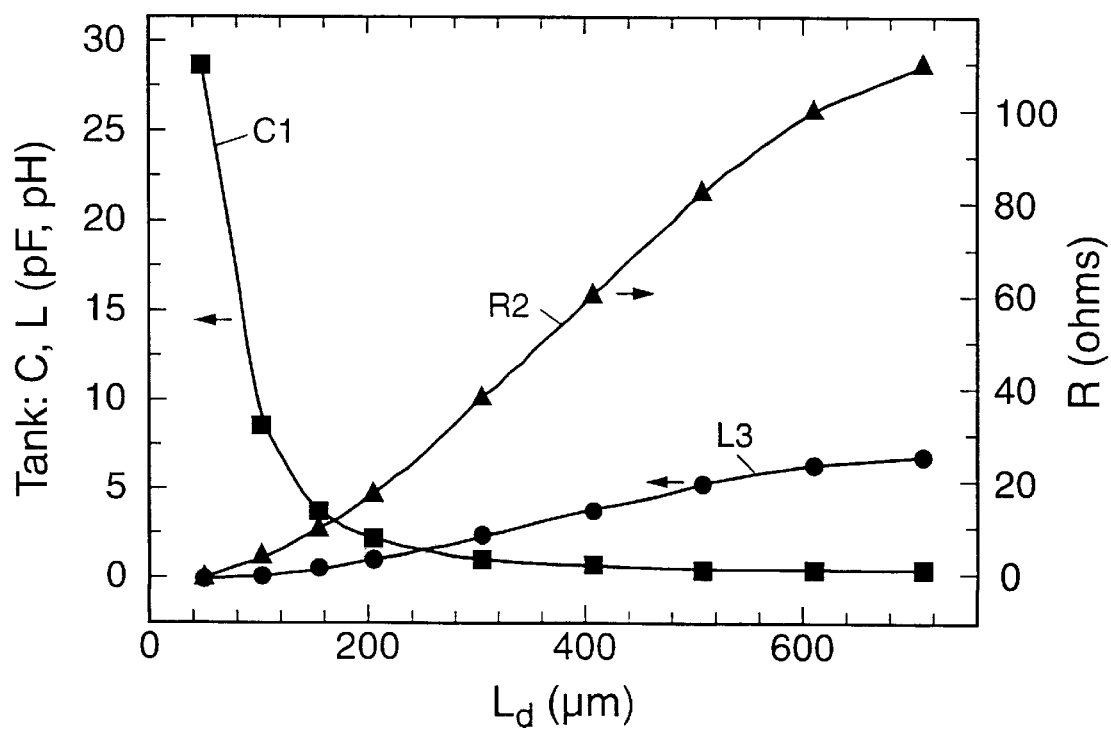
FIG. 18 graphs the dependence on diode position of the antenna-tank component values.

In order to explore further the details of the operation of an RTD-MSA device a large signal time domain simulator has been developed. With this simulator, we are able to efficiently explore the transient, steady state, and hysteric behavior of the RTD-MSA system with respect to changes in device parameters and numerical models. This simulation is based on an equivalent circuit model to describe the coupled antenna and diode system. The equivalent circuit can be decomposed into two parts corresponding to the antenna and the RTD array as shown in FIG. 17. The antenna-tank circuit is a parallel combination of a capacitor (C1), resistor (R2), and inductor (L3). These antenna-tank component values depend on the RTD position relative to the antenna centerline as shown in FIG. 18. The diode array equivalent circuit also has 3 components a feed resistance (R4), a internal capacitance (C5), and an effective RTD array I–V component giving the nondisplacement current 16 through the RTD as a function of voltage dropped across (V6) dropped across the component.

This equivalent circuit model is quite flexible and the 16(V6) relationship can be specified in several very useful ways. In particular, the I–V relationship can be determined from experiment or from theoretical considerations and even hypothetical relationships can be studied. We have, for instance, studied transformations of composites of measured I–Vs in order to determine which I–V characteristics are worth modifying during the RTD design phase. In addition to this flexibility, the simulator was also designed in such a way that the bias supply voltage V0, the values of any circuit components, or the parameters of parametric formulations of 16(V6) could be varied in real time during the simulation. It should also be noted that the model is also quite amenable to modifications of the equivalent circuit.

Figure 19A:
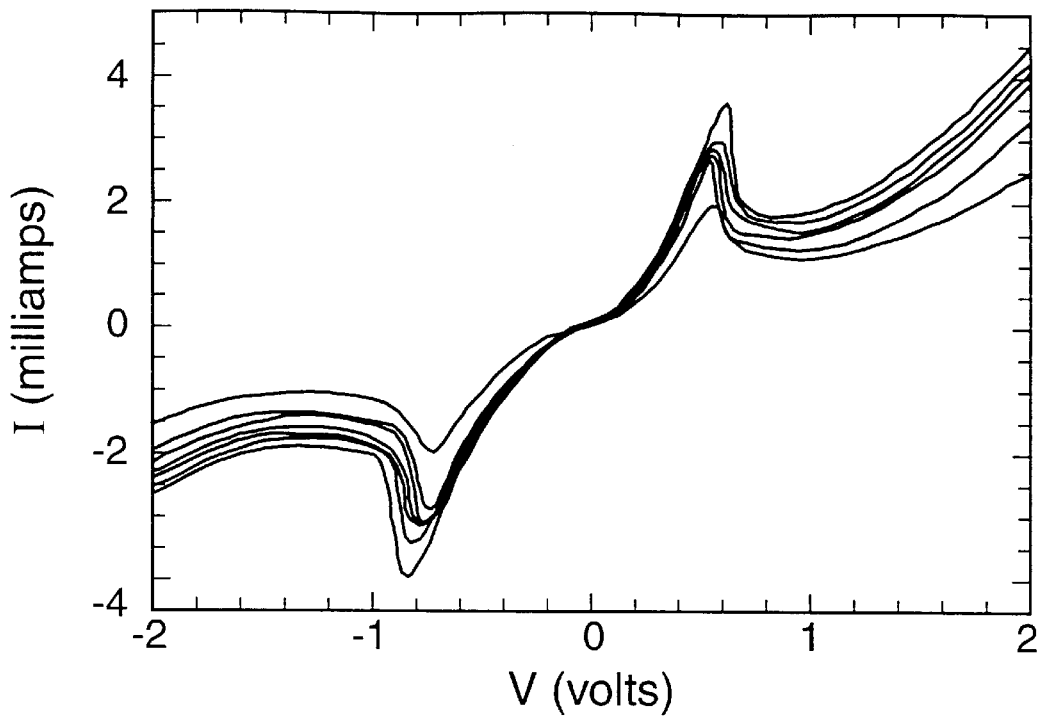
FIG. 19 graphs the result of interpolating the unstable RTD NDR region using a cubic spline; the upper curves are for individual RTS I–Vs for all the RTDs with a single antenna structure; the lower plot is the resulting composite I–V.
Figure 19B:
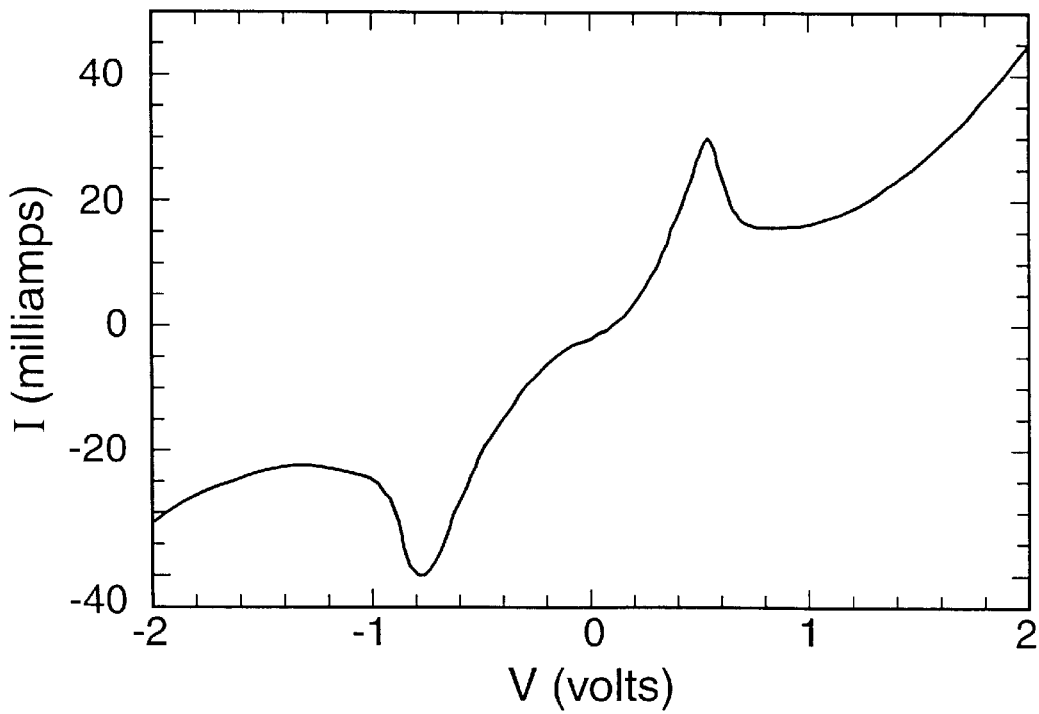

In practice, the RTD I–V relationship for a single RTD is derived from experiment by removing the inaccurate data in the NDR region and interpolating the NDR between accurate data in the positive differential resistance regions using a cubic spline as shown in FIG. 19(a). The internal capacitance (C5) is determined from separate measurements. In principle, the RTD series resistance should be removed form the RTD DC I–V and added to the R4 component since 16(V6) is in parallel with C5 but this detail was not usually consider significant enough to justify the effort. A composite I–V is then determined by the parallel combination of the individual RTD I–Vs with in the antenna as shown in FIG. 19(b). This composite curve constitutes the 16(V6) relationship.

Figure 20:
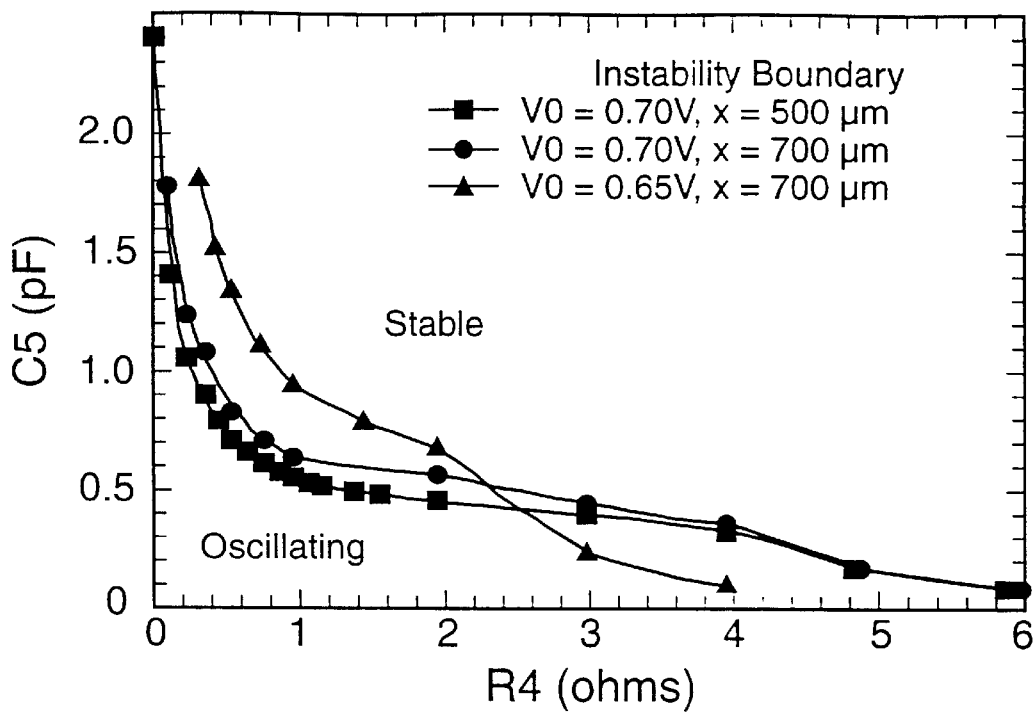
FIG. 20 graphs instability boundaries determined from large signal simulation; oscillation occurs for conditions to the left of the indicated instability line.

The stability of the RTD-MSA combination depends on the RTD speed index ($I_P/C_j$: the peak current divided by the internal capacitance) and the series resistance as well as diode position (D). FIG. 20 shows, for example, the stability indicated by simulations for different diode positions and bias conditions in the two-dimensional domain of C5 and R4 values for the composite I–V of FIG. 19(b). A limited domain for oscillation is found in the lower left C5-R4 corner.

Figure 21:
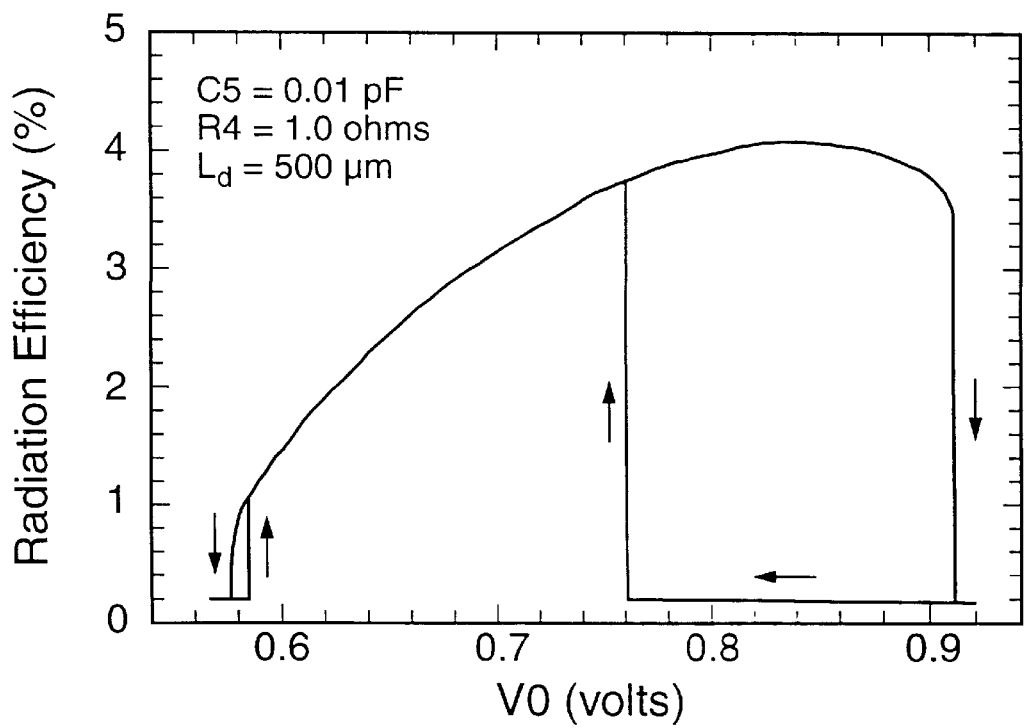
FIG. 21 graphs the radiation efficiency as a function the DC bias voltage V0; arrows indicate the hysteretic behavior observed in simulations with changes in the bias supply voltage.

There also exists only a limited power supply voltage (V0) domain conducive to oscillation. FIG. 21 shows the simulated radiation efficiency as a function of the power supply bias voltage V0. Zero efficiency and no oscillation occurs as the bias is increased from zero volts until a catastrophic threshold is reached—in this case just below 0.6V (first upward pointing arrow from the left). At this point the device goes discontinuously in bias (not time) from zero oscillation amplitude to a finite amplitude which in this case corresponds to about 1% radiation efficiency. As the supply voltage is increased above this threshold the radiation efficiency increases to maximum (4% at about 0.84V). For bias beyond the maximum the efficiency decreases some what until another catastrophic threshold is reached (first downward pointing arrow from the right just above 0.9V). No oscillation occurs beyond this threshold and the radiation efficiency is zero. As V0 is decreased from beyond this threshold (left pointing arrow) no oscillation is observed over the entire domain corresponding to the highest values of radiation efficiency in the previous hysteretic bias branch. At a bias near the center of the previous thresholds (0.76V in this case) another oscillation catastrophe (first upward pointing arrow from the right) is observed resulting in finite efficiency (~3.8%) some what less than the maximum. As V0 is decreased further the radiation efficiency also decreases and the oscillation state is the same, as observed before, for a given radiation efficiency. However, finite oscillations are observed as the supply is decreased to less than the first threshold and a possibly continuous decrease to zero radiation efficiency is observed at a bias voltage marginally less than the first threshold voltage.

Figure 22A:
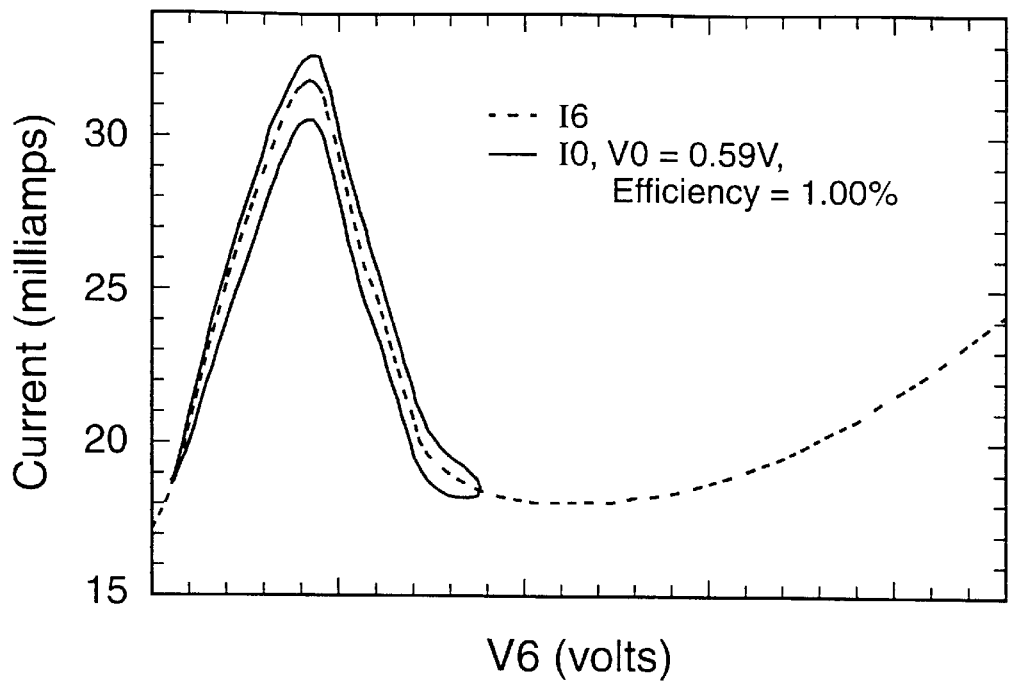
FIGS. 22(a)–22(c) are simulated phase plots showing extremes of oscillation behavior.
Figure 22B:
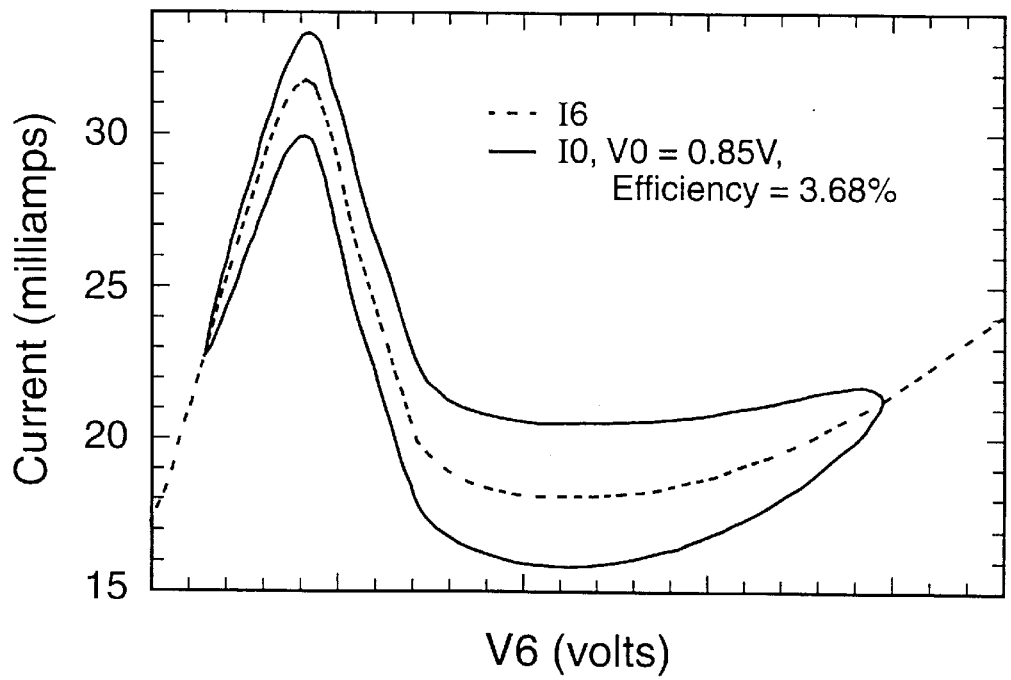
Figure 22C:
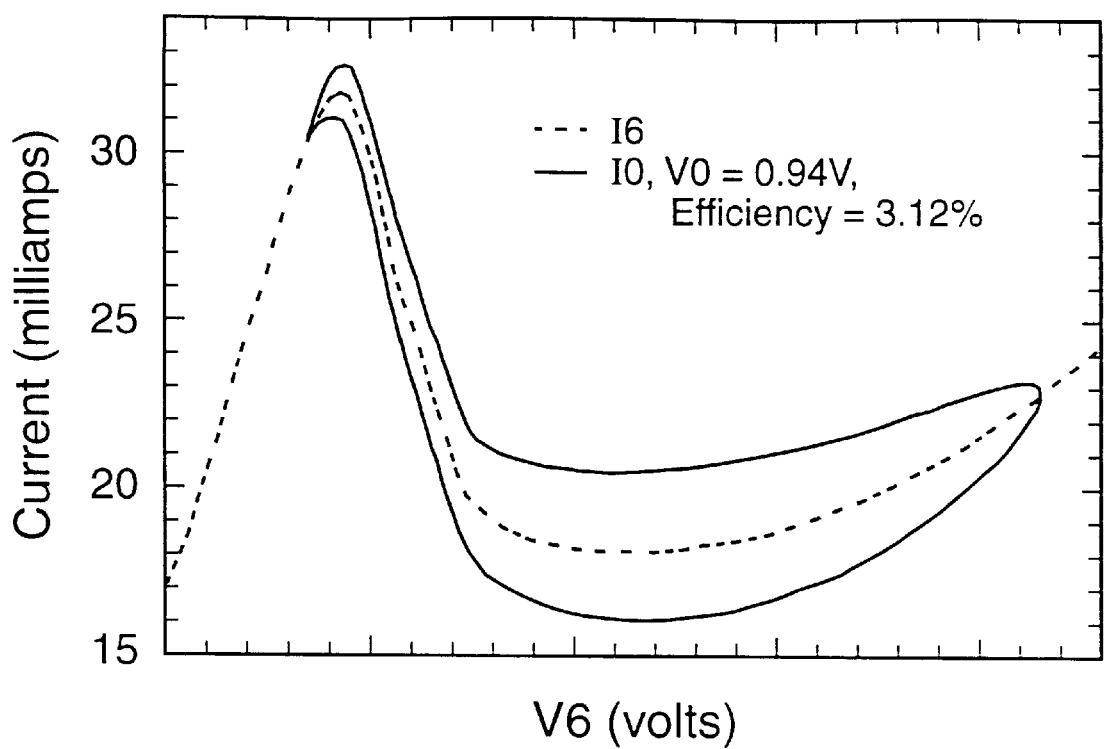

Another way to visualize the simulated oscillation is to plot the instantaneous RTD-MSA against the voltage drop across the RTD (V6) resulting in a loose interpretation of a phase plot. It is instructive to also plot the DC I–V along with the instantaneous I–V. This phase plot is often used during the actual large signal time domain simulation to observe the behavior of the simulation. FIG. 22 shows this type of plot for some of the interesting operating points introduced in FIG. 21. FIG. 22(a) shows the oscillation state just above the low threshold bias that turns on oscillations (first catastrophe). As noted previously, this oscillation has a finite radiation efficiency (1% in this case). The dashed curve in the plot is the composite I–V (16(V6)). If the bias is decreased after turning on the oscillation the phase loop collapses more or less centered on the RTD peak current (the local 16(V6) maximum). It is not clear if this collapse is continuous to zero but often appears to be. If the bias is increased from the turn on point the middle plot results and corresponds to a maximum in the radiation efficiency. FIG. 22(c) shows the oscillation state for a bias level just below the high bias turn off catastrophe. This catastrophe corresponds to the left hand extreme excursion of the phase loop equal to the peak current voltage (in this case 0.55V). When the conditions are conducive to oscillation the power supply current traces a path around the DC I–V in a clockwise direction.

Figure 23:
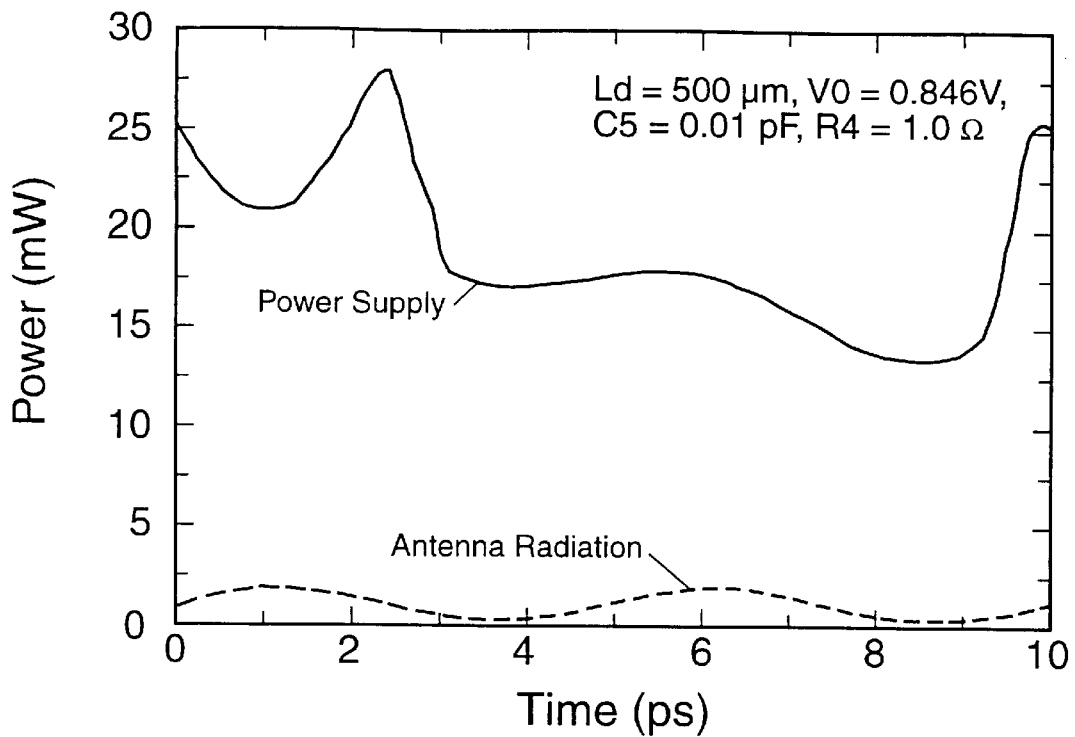
FIG. 23 graphs instantaneous powers in the RTD-MSA; power supply (solid) and antenna radiation (dashed) are shown over about 1.5 periods of oscillation.
Figure 24:
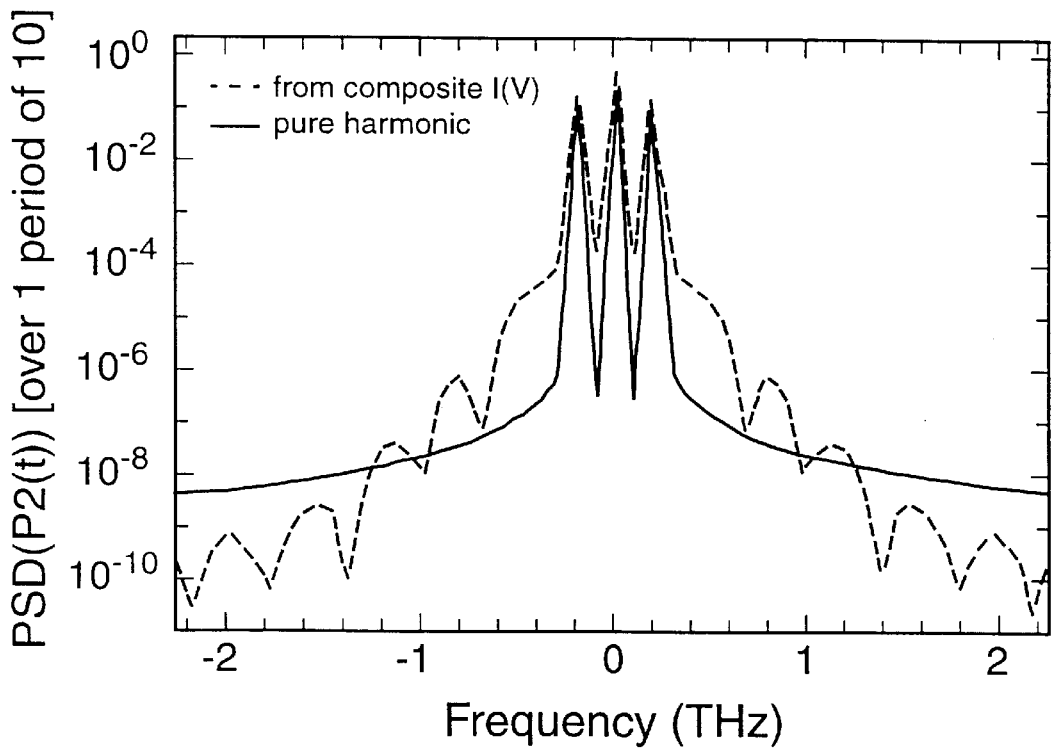
FIG. 24 graphically compares the simulated Power Spectral Density (PSD) with that of a pure harmonic signal; harmonic efficiency is about 99.975%.

The instantaneous supply input power is quite anharmonic as is evident in FIG. 23. The radiated power is, however, quite harmonic as can be seen in FIG. 24 which compares the power spectral density of the observed radiation with a pure harmonic signal.

Figure 25:
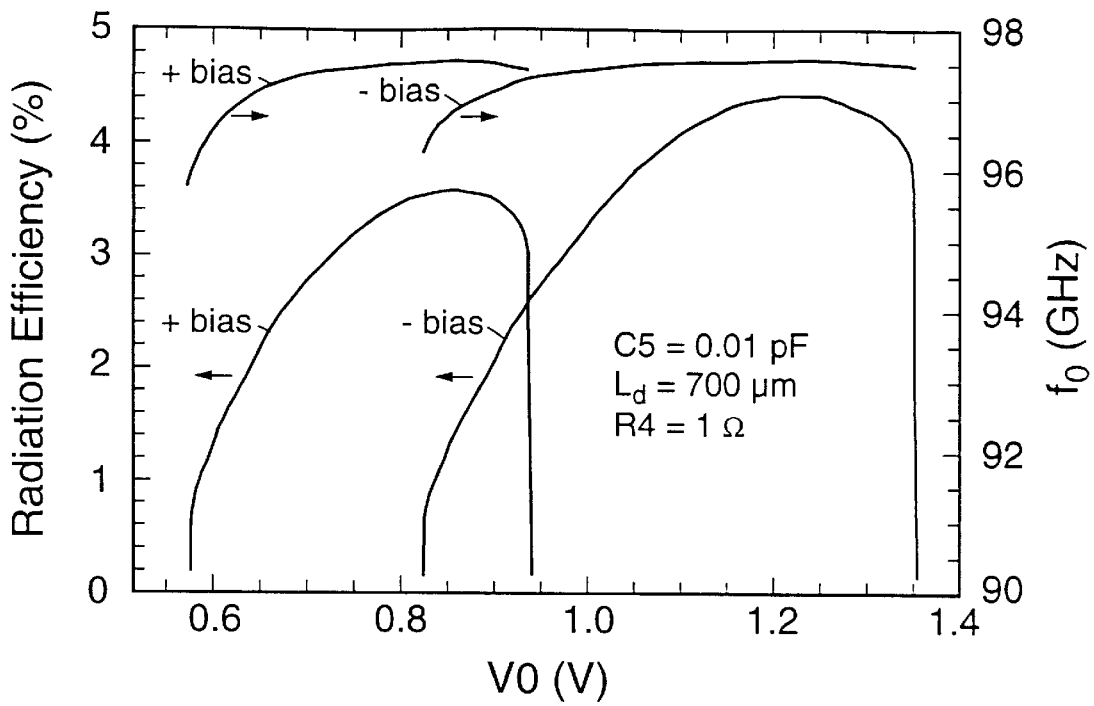
FIG. 25 graphically compares negative and positive bias sense radiation efficiency and oscillation frequency; negatively biased oscillations have a greater maximum radiation efficiency.

Both negative and positive bias voltages can have oscillation regimes; however, the RTD is usually designed asymmetrically about the double barrier quantum well which usually causes differences in the conditions required for oscillation, the maximum radiation efficiency achieved, and to a lesser extent the oscillation frequency. Surprisingly, the maximum negative bias efficiency simulated using the composite curve developed from measurements of the first generation RTDs is greater than for the positive bias case in spite of the greater absolute voltages involved (see FIG. 25). Apparently the expanded voltage range of the negative bias NDR more than compensates for the additional bias power. Also shown in FIG. 25 is the oscillation frequency which is bias dependent over a finite range (about 2% for the case shown). This frequency dependence is important for applications where frequency modulation is desired.

Figure 26:
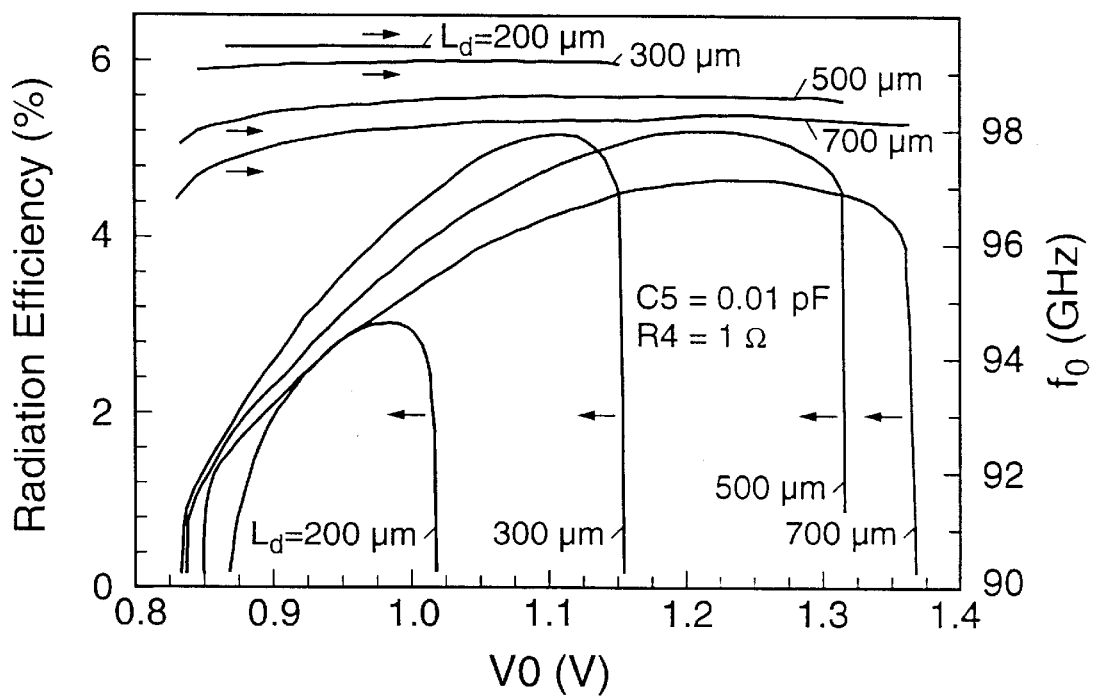
FIG. 26 graphs the radiation efficiency ($\eta$) and operating frequency ($f_0$) as a function of RTD placement; maximum efficiency can best be achieved over a limited range of RTD placement relative to the antenna centerline.

The radiation efficiency is also dramatically effected by the RTD placement with respect to the antenna centerline. FIG. 26 shows the results of simulations for RTD placements of 200, 300, 500, and 700 $\mu$m. The observed maximum in radiation efficiency is dramatically reduced at the extreme placements but is about the same for placements in the range between 300 and 500 $\mu$m. It is also interesting to note that the variation in operating frequency with the voltage bias is also effected by the RTD placement. In particular, placements of the RTDs near the antenna centerline do not vary as much with bias and approach the antenna design frequency. On the other hand, RTD placements away form the antenna centerline vary considerably more with supply bias and also are much lower than the design frequency. These observations have obvious ramifications on the design configuration that might would be used in certain applications.

Over the course of this investigation 5 separate material growths were completed. Table 1 provides the growth designations, dates and specifications for these growths. Of these 5 growths only three different growth specifications were used (see Tables 2–4). The first specification detailed in Table 2 was studied carefully resulting in another design phase giving the other specifications detailed in Tables 3 and 4.

Figure 27:
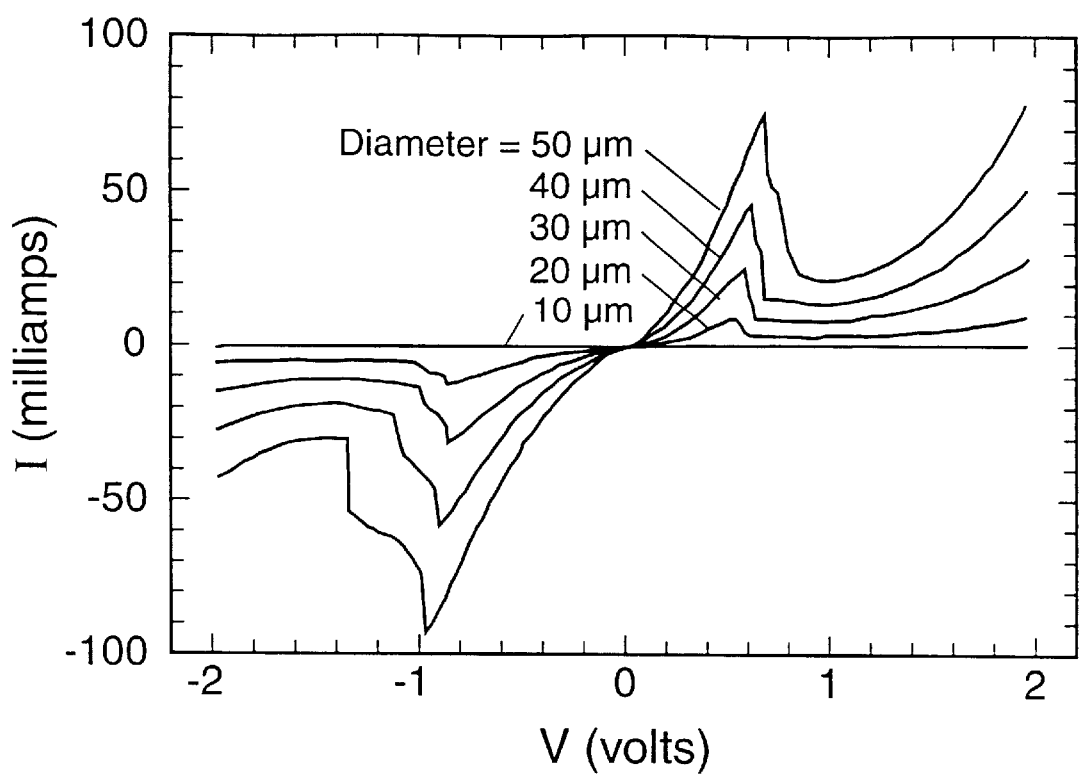
FIG. 27 is an I–V of the first generation of RTDs as a function diode diameter; evident is the NDR region in the voltage intervals 0.67–0.95V and negative 0.95–1.50V; though increasing as expected, the peak current does not scale with the apparent diode area.
Figure 28:
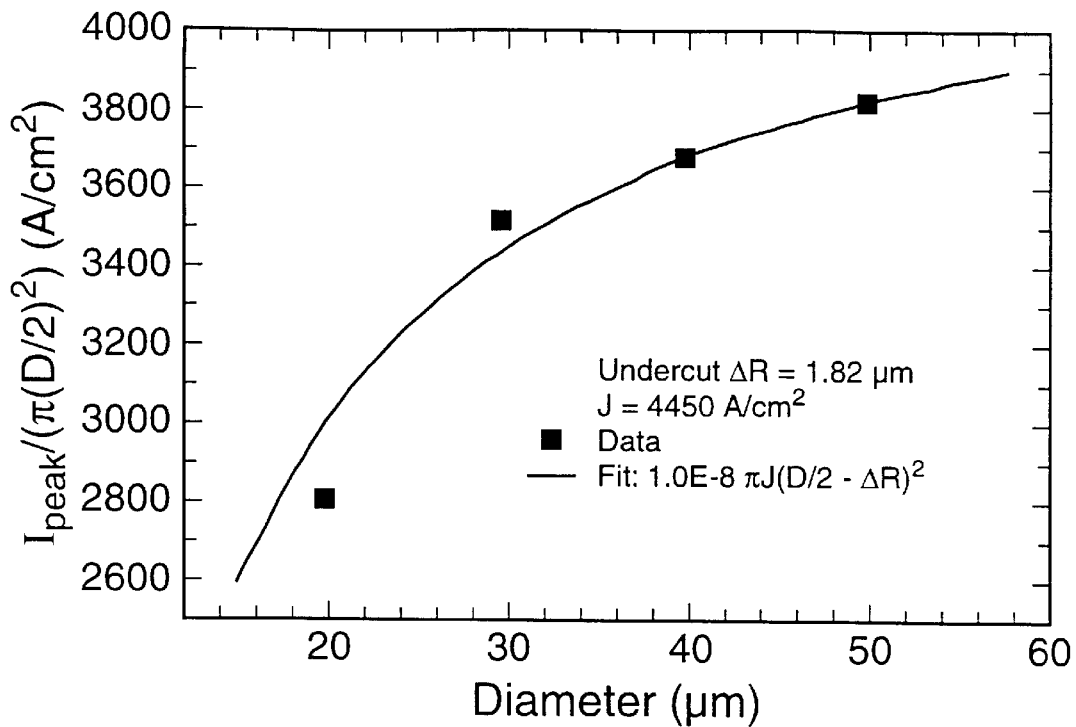
FIG. 28 graphs the non-ideal scaling with diode area of the peak current; observed current compares well with an etch barrier under cut model with an under cut $\Delta R=1.82$ µm; intrinsic current density is about 4450 A/cm$^2$.
Figure 29:
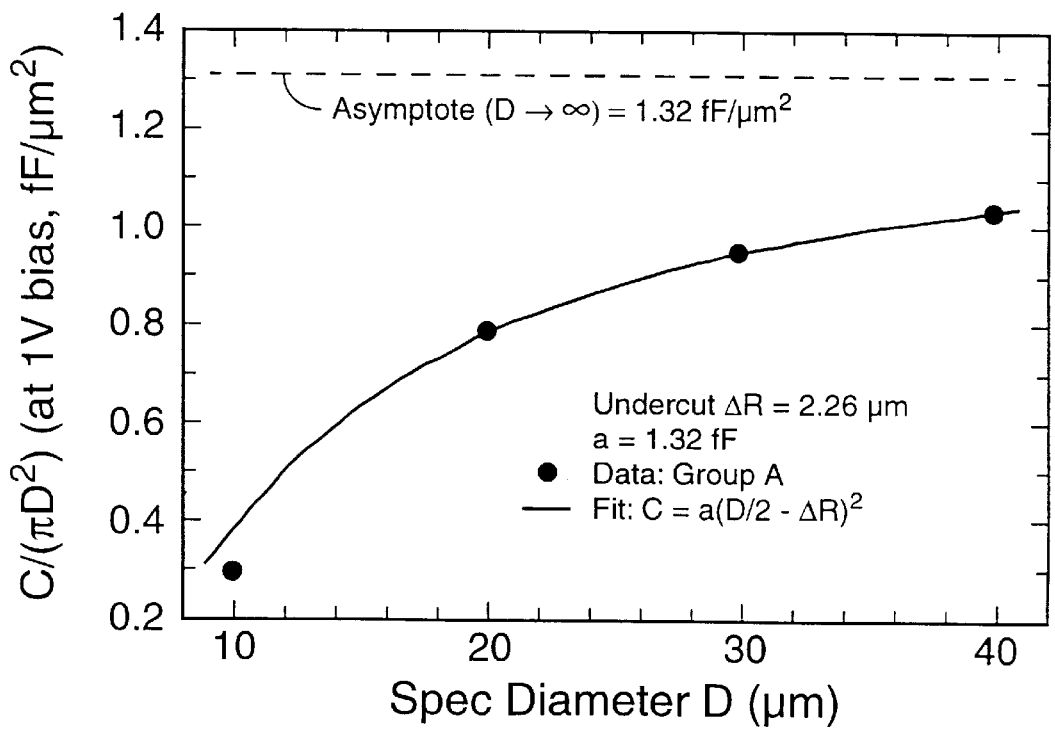
FIG. 29 graphs the non-ideal scaling with diode area of the internal capacitance; again, observed capacitance corresponds to a radial under cut of about 2 µm; intrinsic capacitance is about 0.132 µF/cm$^2$.

After the specification, growth (see Tables 1 and 2), and fabrication of the first generation of RTDs, extensive I–V characterization was done of these diodes over a large range in diode diameter (see FIG. 27). The NDR regions are clearly evident; however, due to measurement instability the data in these regions is not accurate. The RTD current does not scale with the apparent diode area as expected but with an effective area corresponding to a decrease in the observed diode radius of approximately 2 $\mu$m. The fabrication process for this generation of diodes called for a deep etch (20 $\mu$m) and the RTD post side walls were not protected in any way. It was concluded that the deep etch probably under cut the AlAs quantum well barriers increasing the barrier energy and preventing significant tunneling current in the under cut area of the diode. FIGS. 28 and 29 compare the observed current and capacitance with what would be expected for a radial under cutting of the barriers.

TABLE 1

Growth designations, dates, specifications, and types.

| Growth Designator | Specification Table No. | RTD Type |
|---|---|---|
| G1250 | 3 | First Generation |
| G1512 | 4 | Schottky contact |
| G1513 | 5 | Alloyed contact |
| G1739 | 4 | Schottky contact |
| G1740 | 5 | Alloyed contact |
| G1770 | 5 | Alloyed contact |

TABLE 2

Growth specifications for the first generation RTD structure.

| Layer | Material | Thickness | Si(n) Doping (cm-3) |
|---|---|---|---|
| Contact1 | GaAs | 5000 Å | $2.0 \times 10^{18}$ |
| Contact2 | GaAs | 1000 Å | $2.0 \times 10^{17}$ |
| Upper Spacer | GaAs | 200 Å | undoped |
| Upper Barrier | AlAs | 20 Å | undoped |
| Well | InGaAs 10% InAs | 50 Å | undoped |
| Lower Barrier | AlAs | 20 Å | undoped |
| Lower Spacer | GaAs | 500 Å | undoped |
| Buffer1 | GaAs | 1000 Å | $2.0 \times 10^{17}$ |
| Buffer2 | GaAs | 5000 Å | $2.0 \times 10^{18}$ |
| Substrate | GaAs | 425 µm | $5.0 \times 10^{18}$ |

TABLE 3

Growth specifications for a second generation high-performance Schottky contact RTD.

| Layer | Material | Thickness | Si(n) Doping (cm-3) |
|---|---|---|---|
| Upper Spacer | GaAs | 600 A | undoped |
| Upper Barrier | AlAs | 15 Å | undoped |
| Well | GaAs | 55 Å | undoped |
| Lower Barrier | AlAs | 15 Å | undoped |
| Lower Spacer | GaAs | 200 Å | undoped |
| Buffer1 | GaAs | 1000 Å | $2.0 \times 10^{18}$ |
| Buffer2 | GaAs | 5000 Å | $4.0 \times 10^{18}$ |
| Substrate | GaAs | 450 µm, 625 µm | $5.0 \times 10^{18}$ |

TABLE 4

Growth specifications for a second generation high-performance ohmic contact RTD. Layer Contact1 has a graded doping profile and forms a non-alloyed contact.

| Layer | Material | Thickness | Si(n) Doping (cm-3) |
|---|---|---|---|
| Contact1 | InGaAs 5–50% InAs | 500 Å | $0.5 \times 10^{19} - 3 \times 10^{19}$ |
| Contact2 | GaAs | 0.3 µm | $5.0 \times 10^{18}$ |
| Upper Spacer | GaAs | 200 Å | undoped |
| Upper Barrier | AlAs | 15 Å | undoped |
| Well | GaAs | 55 Å | undoped |
| Lower Barrier | AlAs | 15 Å | undoped |
| Lower Spacer | GaAs | 600 Å | undoped |
| Buffer | GaAs | 0.5 µm | $4.0 \times 10^{18}$ |
| Substrate | GaAs | 450 µm | $5.0 \times 10^{18}$ |

Figure 30:
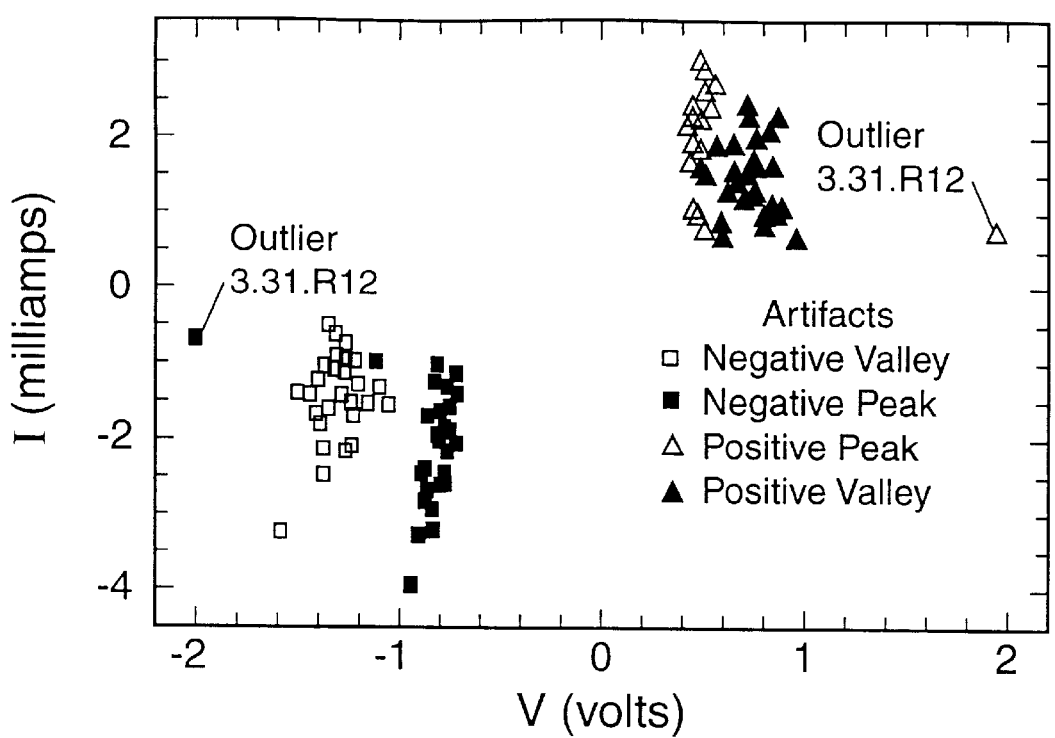
FIG. 30 plots the I–V artifacts of a complete series of diodes; with the exception of a single outlier diode at 3.31.R 12, the voltage artifacts are relatively homogenous as compared to the current artifacts.
Figure 31:
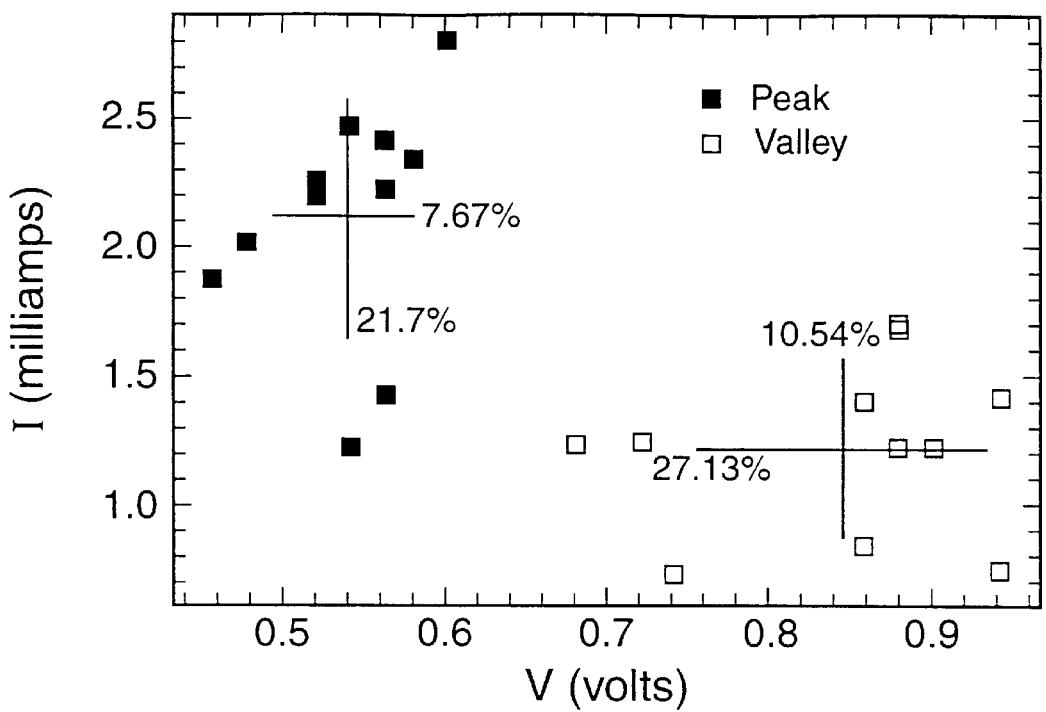
FIG. 31 plots standard deviations of diode artifacts within a single antenna structure.

In addition to the nonideal current scaling, the homogeneity of the diode characteristics was also studied (see FIG. 30). A 30% variation of the current density artifacts (peak and valley) was observed and found to be about 3 times greater than that found for the voltage artifacts (see FIGS. 30 and 31) Large signal numerical simulations using actual composites of the inhomogeneous I–Vs coupled to an antenna model show that these inhomogeneities do not prevent operation. In fact, some broadening of the effective NDR is observed resulting in improved performance. However, these diodes have a large internal capacitance (~0.1 µF/cm2) relative to the low peak current density (~5000 A/cm2) resulting in a low speed index and it was concluded that these RTDs would probably not perform adequately for this application.

As a result of these observations, a second generation of diodes was designed. Initially, it was considered necessary to replace the pure AlAs quantum well barriers with an AlGaAs alloy barrier to help prevent the under cutting of the barrier during the deep etch; however, the process was changed considerably and the deep etch was eliminated. In addition, a method for protecting the RTD post side walls was developed so that the pure AlAs barriers were ultimately retained. The emitter and collector standoff geometries were reevaluated with respect to obtaining better NDR characteristics and practical tradeoffs in higher peak current densities and lower peak voltages and greater valley voltage and greater peak-to-valley ratios were explored. Two types of RTDs differing in contact geometry composed the second generation. These two contact configurations correspond to a Schottky contact (see Table 3) and an non-alloyed or ohmic contact (see Table 4).

Figure 32:
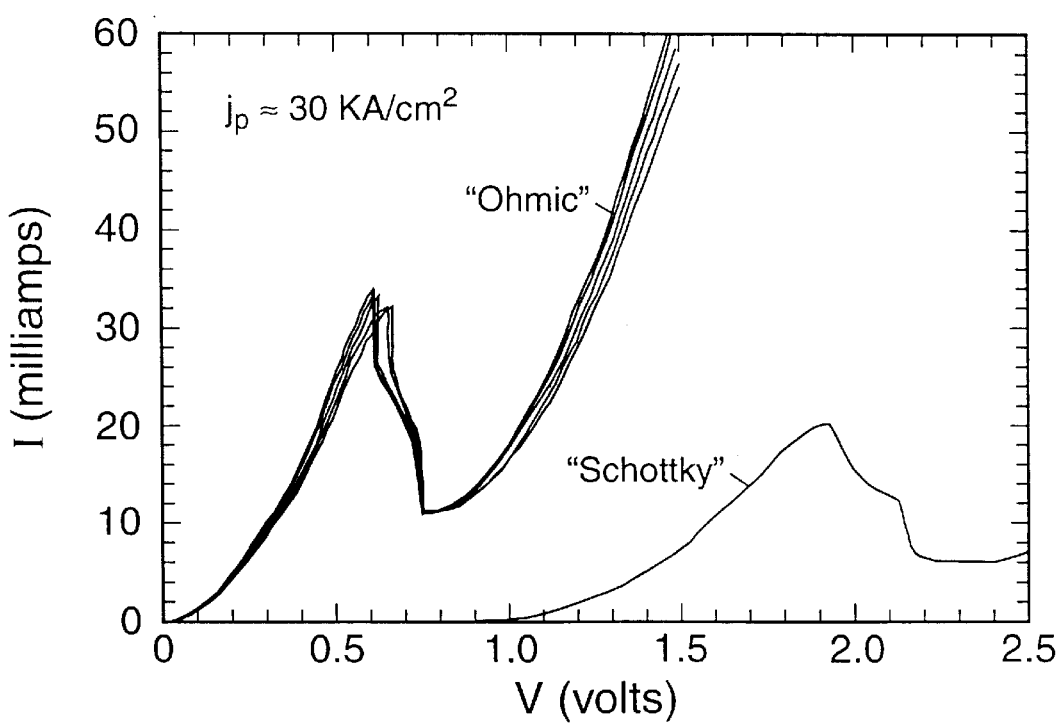
FIG. 32 is I–Vs for two preferred RTD designs; note the significant increase in the peak current density.

The results of the first generation studies highlight the critical importance of the RTD capacitance and inductance in this application. In addition, a ten-fold increase in RTD peak current, a broader negative differential resistance region, and lower contact resistance was indicated by these studies and achieved by the redesign of the RTDs. FIG. 32 shows measured I–V characteristics of the modified RTDs. The family of curves on the left side are for the ohmic contact design in an antenna configuration and show the high peak current density and high level of homogeneity achieved for these devices. The isolated curve on the right is from a Schottky contact design RTD. In this case, the voltage offset is due primarily to the series bias required to activate the Schottky barrier and a high current density is also achieved.

An early attempt at RTD post formation utilized an RIBE etch with a slightly reentrant profile 5 microns deep. This process was subsequently abandoned after modeling indicated an antenna efficiency of only 10% while the desired minimum efficiency of 70% requires a 20 micron electrode spacing. An inherently isotropic HF based wet etch was tried with the RTD post side walls metal coated to help disperse high current densities. This process failed because the profile turned slightly reentrant after only 15 microns of etching. A special $SiNO_x$ etch mask was tried but failed to solve this problem. Instead, the deep etch was abandoned in favor of a process to build-up in stages the required 20 micron of stand-off depth. The first attempt at this used a 20 micron thick PR layer with a single patterned hole reflowed to accommodate a subsequent metal coating. Unfortunately, the reflow failed with the side wall profile slightly obstructing the hole preventing the next metal deposition step. The next attempt used a two level process. The first layer was made thin enough to insure that the reflow would not obstruct the hole. The second layer incorporated a much larger hole allowing the top resist to be reflowed without creep into the lower hole. This process failed because the second layer thickness required to obtain the required electrode spacing resulted in bubble formation during subsequent processing. This issue was resolved by introducing a third PR layer.

The preferred process is composed of 8 stages. Stage 1 forms the RTD posts. Stage 2 passivates the post side walls and insulates pads from top metal using SiN. Stage 3 encapsulates the posts using the 3 layer PR method. Stage 4 deposits Ti/Au metal connecting the diodes and acting as the seed for Ni plating. Stage 5 patterns a plating mask defining the antenna and access holes in the top metal for subsequent PR removal. Stage 6 plates Ni. Ni is used for strength to stabilize large area bridges after PR removal. Stage 7 removes, by ion milling, the exposed seed metal defining the antenna and exposing the access holes. Stage 8 uses a plasma etch to remove PR from under the top metal layer.

Figure 33:
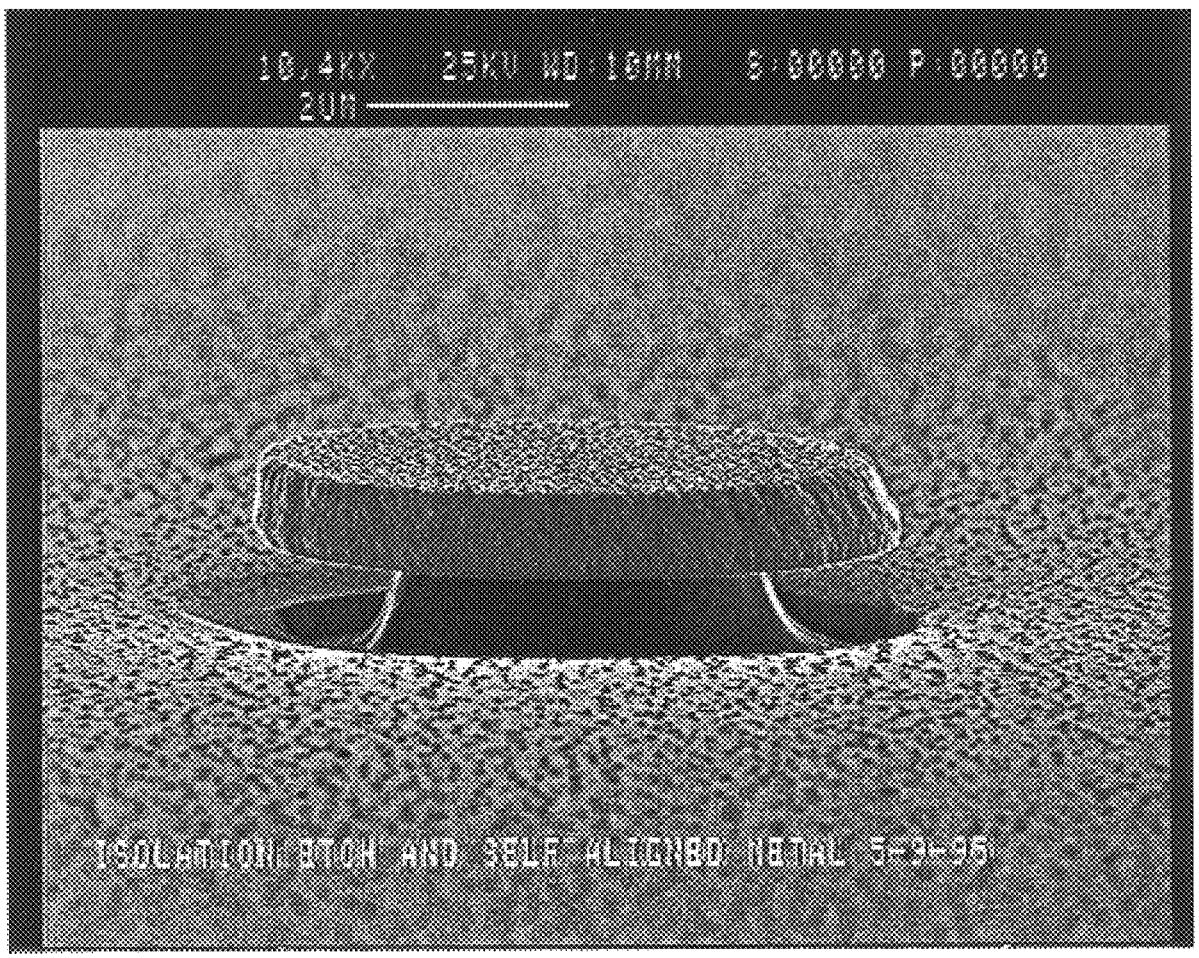
FIG. 33 is a scanning electron microscope (SEM) perspective view of the result of the first stage of processing the preferred RTD; the RTD post is covered on top by a 6 µm diameter circular anode contact and surrounded by cathode metal; note now the top contact metal masked both the wet etch creating the RTD post and provides a self aligned shadow for the cathode metal deposition.

A circular anode contact for the top of the RTD is patterned with standard liftoff metalization on the surface of a wafer having a double barrier heterostructure. This contact is used to mask the subsequent RTD post wet etch. This isotropic etch is 1 micron deep and also undercuts the contact by a distance equal to the etch depth. The contact also provides a shadow for masking the cathode metal evaporation that takes place after the wet etch. Following the evaporation, the post is surrounded by cathode metal but the contact shadow prevents any metal deposition on the post side walls. The result of the stage 1 processing can be seen in FIG. 33.

Because of the high current densities achieved within the RTDs during operation, heat dissipation is a concern. The diode posts have been formed in the manner described so that the current is dispersed within the cathode metal contact within the near vicinity of the RTD post with the added benefit that the thermal path in the post is kept to a minimum. The amount of undercutting of the anode contact and therefore the overhang for the cathode deposition shadow is controlled by the depth of the etch. The deposition shadow provides self alignment of the cathode contact reducing the required spatial tolerance of the deposition. As a result, the cathode contact metal surrounds the diode post within only 0.5 microns of the junction.

The following is a detailed process step sequence for stage 1:
(a) PR—5214 liftoff profile (sparse circles mask),
(b) metal evaporation of p-type contact (Ti (500 Å)/Au 3000 Å)),
(c) liftoff—acetone soak and spray to remove field metal,
(d) mesa etch (p-type contact masks etch)=, 1 micron deep wet etch, undercut supplying shadow for n-type contact pattern,
(e) metal evaporation N Contact—Ge(260 Å)Au(540 Å)Ni (150 Å)Au(4000 Å) Thick Au layer for reduced transmission loss,
(f) RTA—Anneal N contact, OA360 (program file name for a 360° C. 15s RTA)
(g) electrical test—probe individual test diodes for NDR and current levels.

A Silicon Nitride ($Si_3N_4$) dielectric is used to passivate the side wall of the RTD post and to insulate the anode top metal contact pad areas from the cathode. This dielectric coats the RTD post side walls protecting the exposed RTD junction from subsequent processing. An annulus of $Si_3N_4$ is formed concentric with the anode contact with a hole opened up through the dielectric on top of the anode contact. This hole allows for electrical contact between the eventual MSA metal deposition and the RTD. In addition, some dielectric also coats the cathode metal near the base of the RTD post preventing any of the later metal depositions from shorting the RTD due to any misalignment or mask runout.

The top layer of both the cathode contact field and the anode contact are gold metal. Because of this and since these fields are extremely well aligned they cannot be distinguished in a view from directly above the surface. Moreover, the $Si_3N_4$ dielectric coating does not provide much contrast between the two contact fields. To provide adequate contrast for locating the RTDs, a Ti flash is used. This flash is done before the removal of the $Si_3N_4$ dielectric patterning PR establishing an easy self aligned method for achieving an accurately registered contrast layer.

Figure 34:
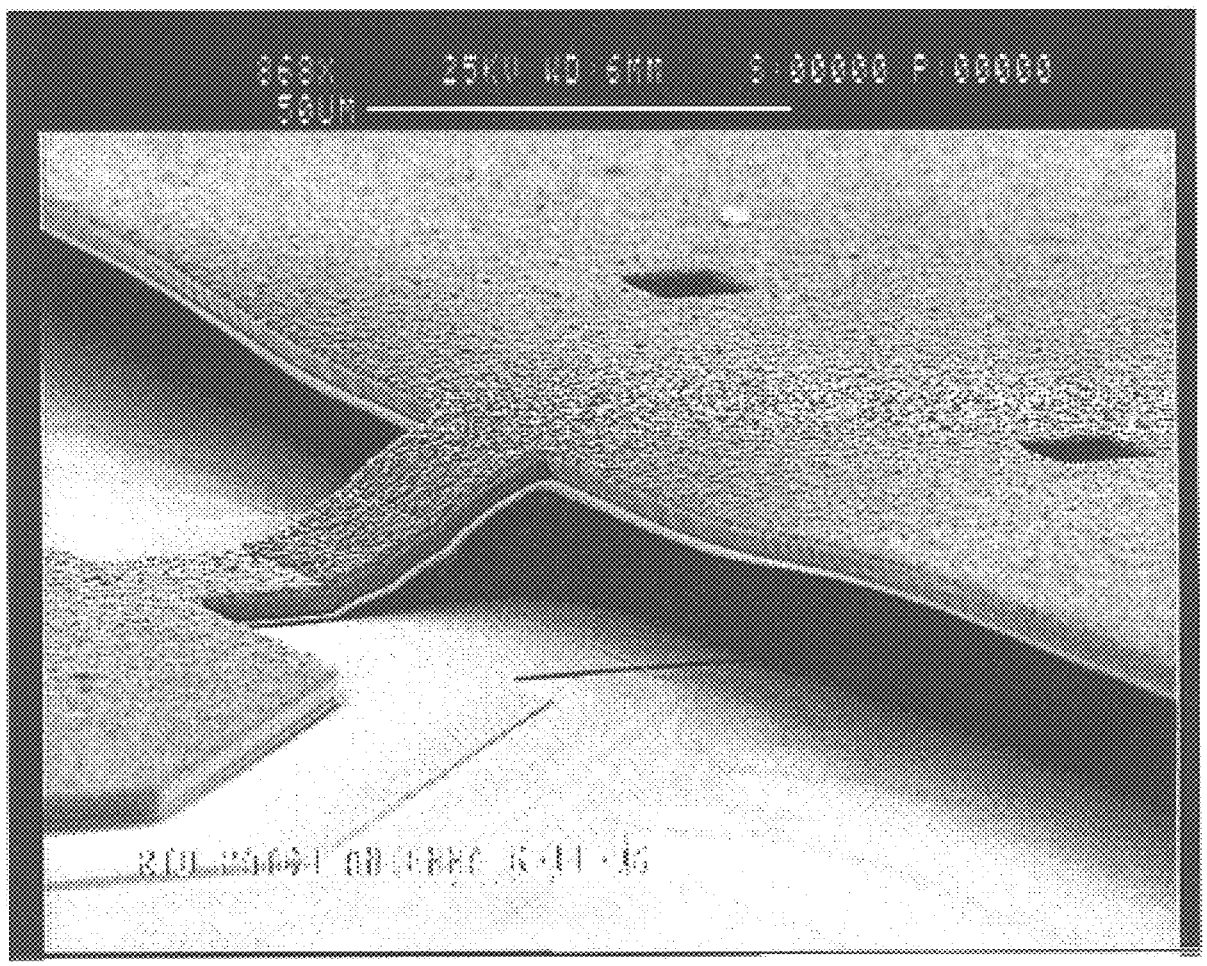
FIG. 34 is an SEM perspective view showing the $Si_3N_4$ dielectric insulation layer extending from underneath and beyond the anode probe pad at mid to lower right; this layer can also be seen to extend underneath the cantilevered MSA (upper left) in the vicinity of the contact bridge from the probe pad (at right of center)

Probe pads from the top anode contact layer must be placed on the substrate to allow for probe tips to make electrical contact with the anode. Separate $Si_3N_4$ dielectric pads are deposited at this stage in order to provide the required electrical insulation between these anode contact pads and the surrounding cathode field metal. FIG. 34 gives an excellent edge view of a completed device showing a bridge between an anode probe pad (at mid to lower left) and the cantilevered MSA (on the upper right). The $Si_3N_4$ dielectric insulation layer can be seen in this view as a thin lightly contrasted layer directly below and extending considerably beyond the anode probe pad. The dielectric can also be seen to extend and also underneath the MSA in the vicinity of the contact bridge. Also visible in this view are two square etchant access holes from a patterned array within the MSA interior. The presence of these holes will be discussed in later descriptions of later processing steps.

The following is a detailed process step sequence for stage 2:
(a) $Si_3N_4$ deposition—PECVD, 5000 Å
(b) Nitride mask pattern—Standard PR process masking the pad areas and an annulus over the diodes.
(c) Etch nitride—RIE field nitride
(d) Flash Ti evaporation—Ti(300 Å), contrast is needed to facilitate alignment
(e) PR removal/liftoff—Ace soak to remove the nitride patterning PR and liftoff flash Ti. Ti will remain in all the areas that do not have nitride. Pads and diode annulus are readily visible due to the contrast between Ti and Au.

At this stage a considerably thick ($20 \mu m$) layering of PR must be done. This thick PR platform is required to standoff the MSA metal from the cathode metal layer in order to prevent excessive antenna losses during operation (see FIG. 10). However, this depth of PR is far to great to be achieved in a single step.

Figure 35:
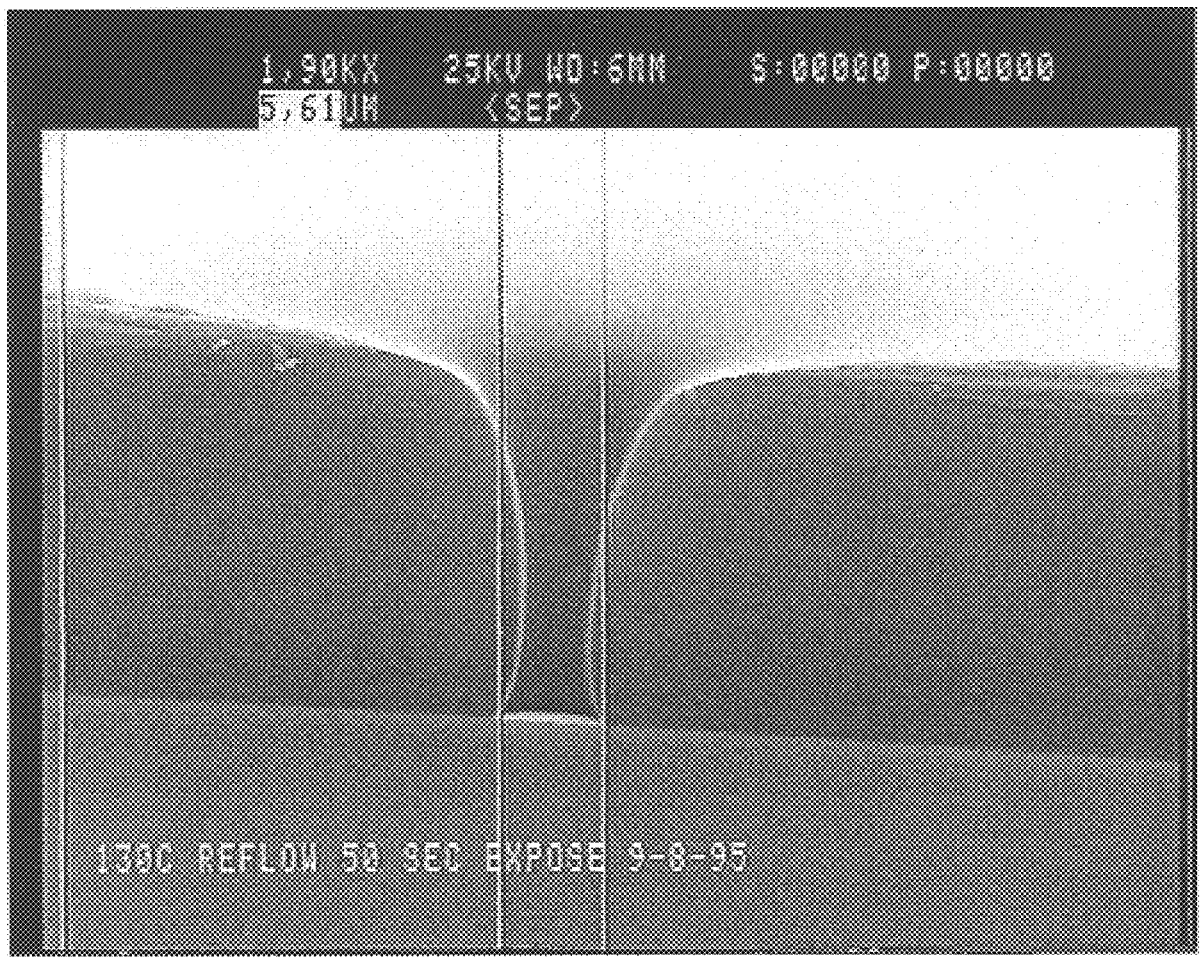
FIG. 35 is a SEM cross section of a hole with a thickness:diameter ratio of about 3:1 after reflow; the resulting bulge prevents a continuous metal deposition within the hole.
Figure 36:
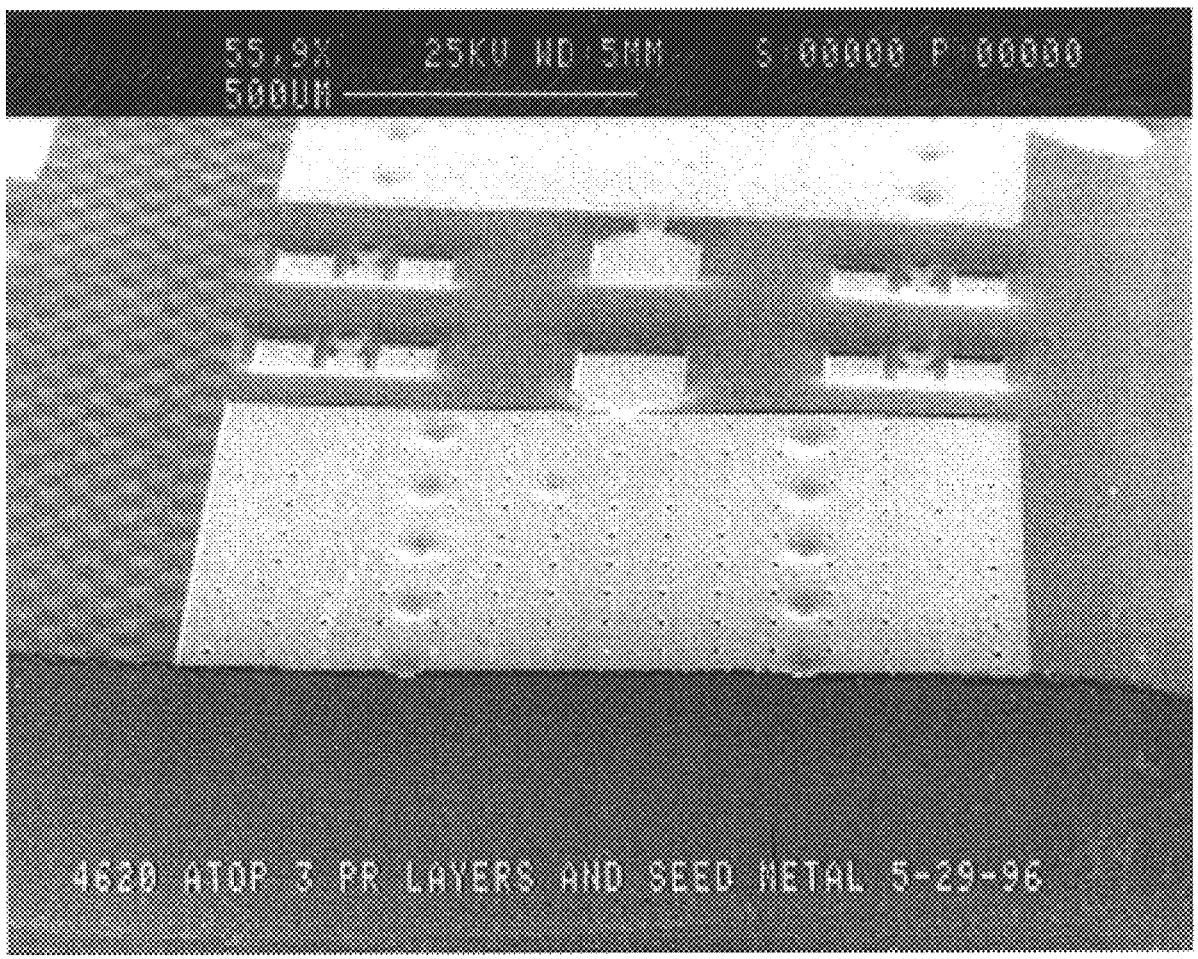
FIG. 36 is an SEM of a bisected PR platform showing the anode contact holes and with seed metal and plating resist deposited prior to the plating of the MSA.
Figure 37:
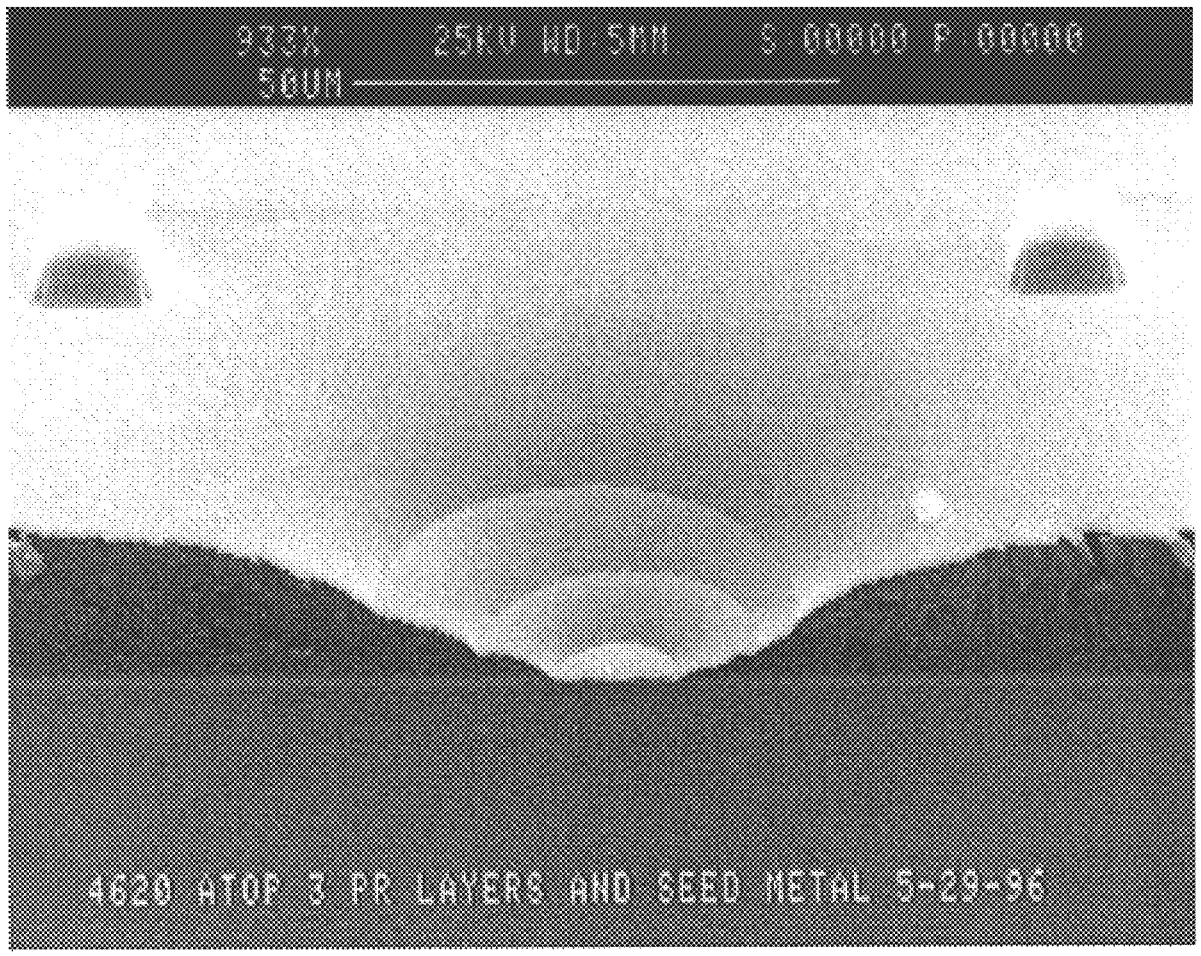
FIG. 37 is an SEM cross section detailing the anode contacting structure (anode dimple) in an actual MSA structure; 3 PR layers and the benign reflow profile are evident.
Figure 38:
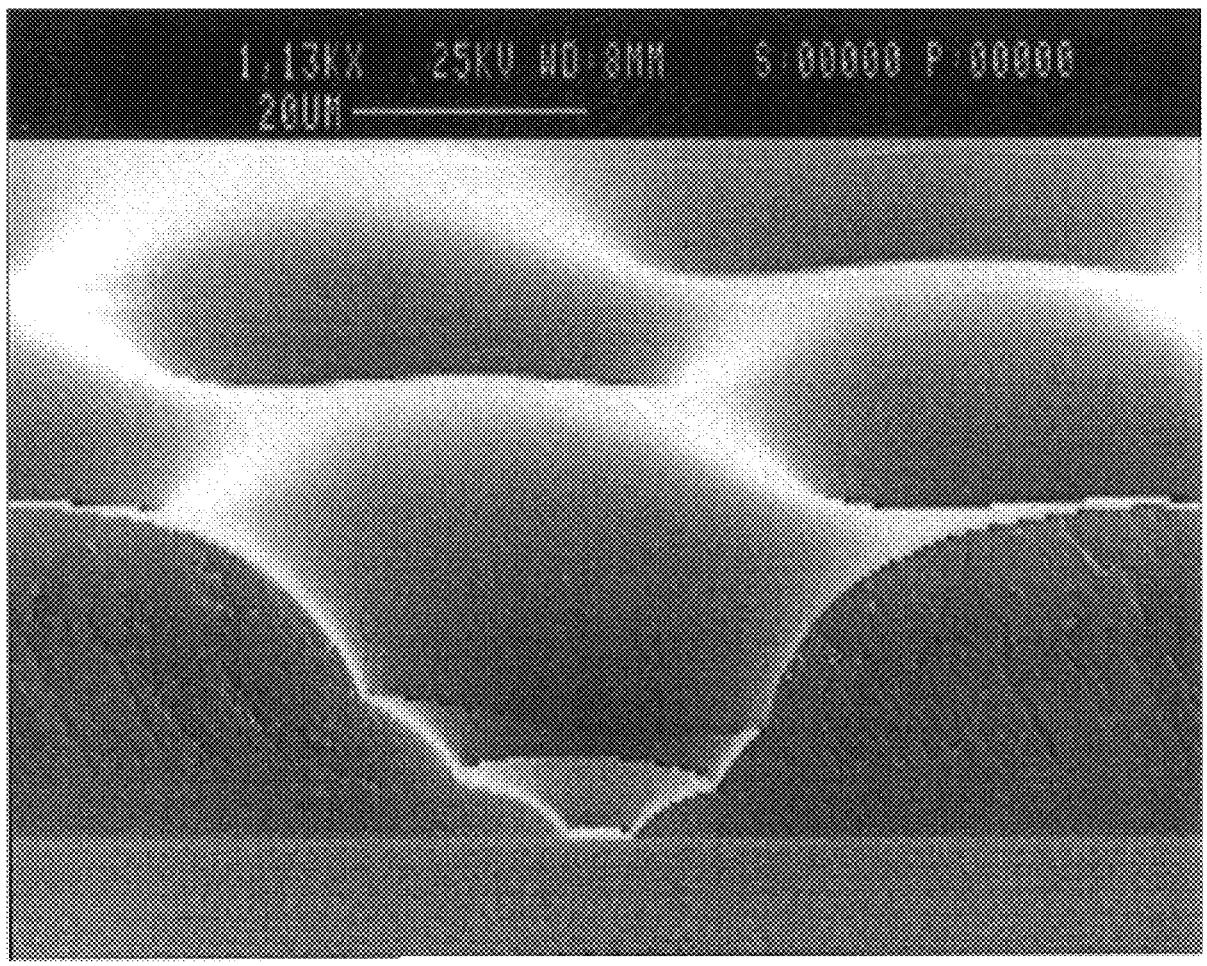
FIG. 38 is an SEM view of an anode dimple farm (not an MSA) with a clearer view of the benign dimple profile.

Instead, the total PR deposition is divided into 3 separate layers. The first (bottom) layer is 6 microns thick and patterned with a 6 micron hole to match the small top RTD anode contact. This layer is then reflowed before the next layer is deposited and patterned. Since the ratio of layer thickness to the hole diameter is not greater than 1 the side walls pull away from the hole center during reflow preventing a reentrant profile from forming. After the first layer reflow, an additional 8 $\mu m$ of PR is deposited (14 $\mu m$ thick at the center of the existing hole). This second (middle) layer is patterned with an 18 $\mu m$ diameter hole that is approximately centered over the existing hole. The generous diameter provides the required alignment tolerance. After a second reflow, a two tier cross section is formed and an additional 8 $\mu m$ of PR is deposited (22 $\mu m$ thick at the center of the existing hole). This third (top) layer is patterned with a 30 $\mu m$ hole and the third reflow results in a 3 tier cross section. Using the separate layers to reduce the hole diameter to layer thickness ratio at each reflow to not more than 1 results in a nonreenterant profile that makes it a simple matter to deposit a continuous metal contact at a later stage. FIG. 35 shows the result of a reflow where the thickness-diameter ratio is considerably greater than 1. The observed bulge (reentrance) prevents the continuous deposition of metal in the hole. FIG. 36 shows a view of a completed and bisected MSA PR standoff platform with plating seed metal deposited. The anode contact structures (dimples) are clearly visible in this view. FIG. 37 shows a detail of an anode dimple and the benign profile that is achieved with a reasonable thickness:diameter ratio. FIG. 38 shows an even clearer view of the dimple profile.

The alignment of the first layer is the most critical and difficult. The previous $Si_3N_4$ dielectric patterning prevents shorting due to any slight misalignment but the hole in the first layer must make maximum contact to the top anode dot to minimize contact losses from the high current densities experienced during RTD operation. In contrast, the alignment of the subsequent layers is made considerably less critical due to the additional tolerance achieved by increasing the patterned hole diameters in these layers. The relaxed alignment tolerance of the last two layers is also quite evident FIGS. 37 and 38.

This three layer process was developed to facilitate PR patterning on top of the thick standoff platform for subsequent plating of the MSA (see FIG. 36). A 160° C. temperature is the minimum temperature PR can be baked to assure that successful patterning can be done above the layer. PR layers thicker than 8 µm bubble when baked at or above temperatures 160° C. As a result any individual layer thickness must not be greater than 8 µm.

The following is a detailed process step sequence for stage 3:
a) Bottom layer patterning—4330 at 2500RPM/5 microns thick. Open holes over diodes and pads. Expose 10 seconds.
b) Reflow—First 120° C. for 2 minutes, gentle reflow and degas. Second 170° C. for 30 minutes. Very soft profile and hard degas allowing for subsequent PR patterning on top of this layer.
c) Middle layer patterning—4620 at 3500RPM/12.7 microns total PR thickness. Open larger hole, 18 microns, over diode and bottom layer. Expose 1 minute.
d) Reflow—First 120° C. for 2 minutes. Second 165° C. for 1 hour. Slightly lower temperature than the bottom layer to avoid solvent bubbles being trapped.
e) Top layer patterning—4620 at 3000 RPM/21.5 microns total. Open an even larger hole(30 microns) above the diodes and the lower two PR layers. Expose 2 minutes.
f) Reflow—First 120° C. for 2 minutes. Second 160° C. for 1 hour. Note slightly lower temperature than the bottom two layers.

Stage 4 consists of a single step of evaporatively depositing Ti/Au metal completely coating the entire 3 layer PR standoff platform. This Ti/Au metal layer connects all of the diodes together and act as the seed metal (anode) for subsequent Ni plating of the MSA. See FIG. 36.

The following is a detailed process step sequence for stage 4:
a) Full surface Ti(500 Å)/Au(3000 Å)—This layer serves as the top antenna conductor. 3000 Å of Au was chosen for low loss. It is also the seed metal for Ni plating. All diode anodes on the entire wafer are connected together at this point. Integration.

Figure 39:
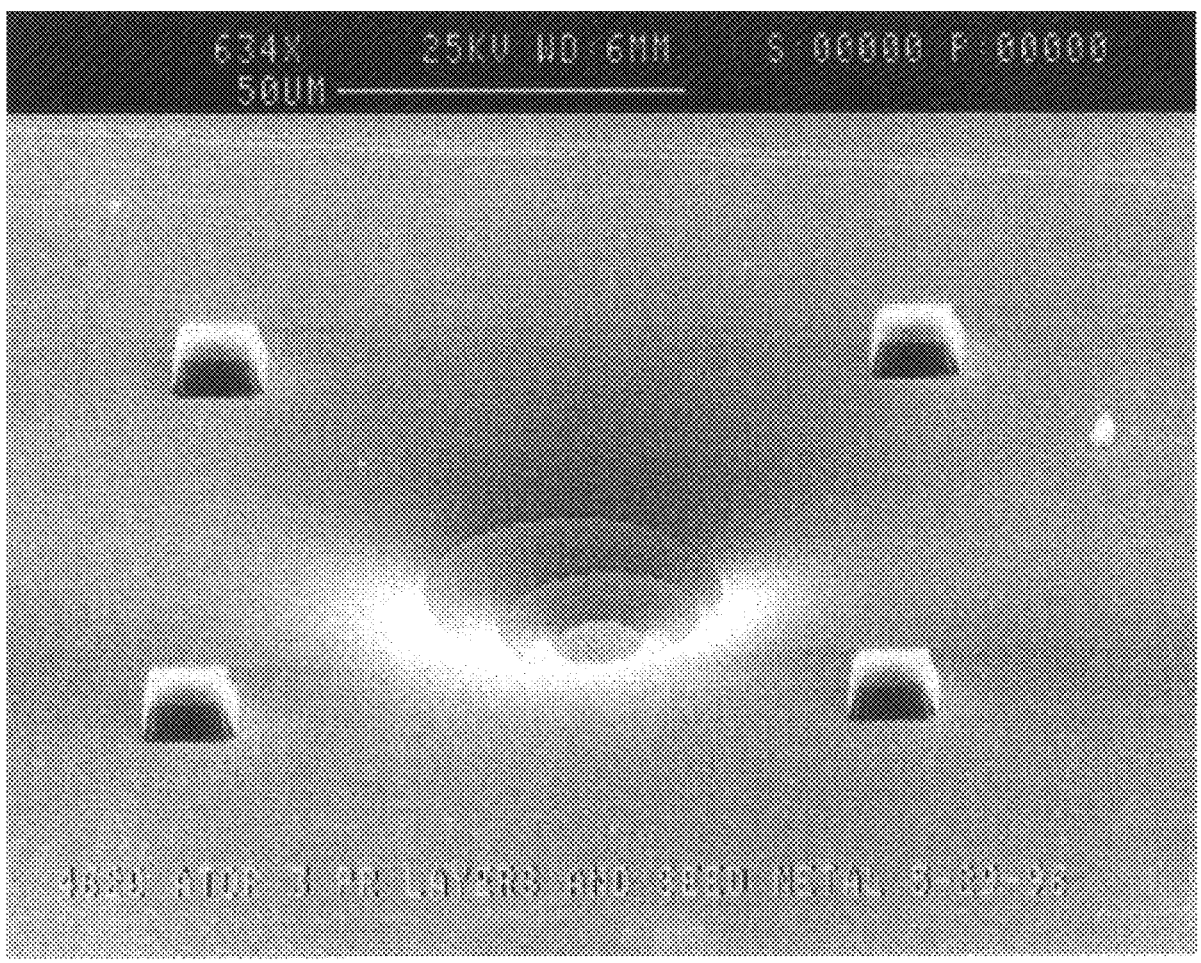
FIG. 39 is an SEM view in the vicinity of an anode dimple clearly showing the plating PR with 4 patterned posts used to create etchant access holes.
Figure 40:
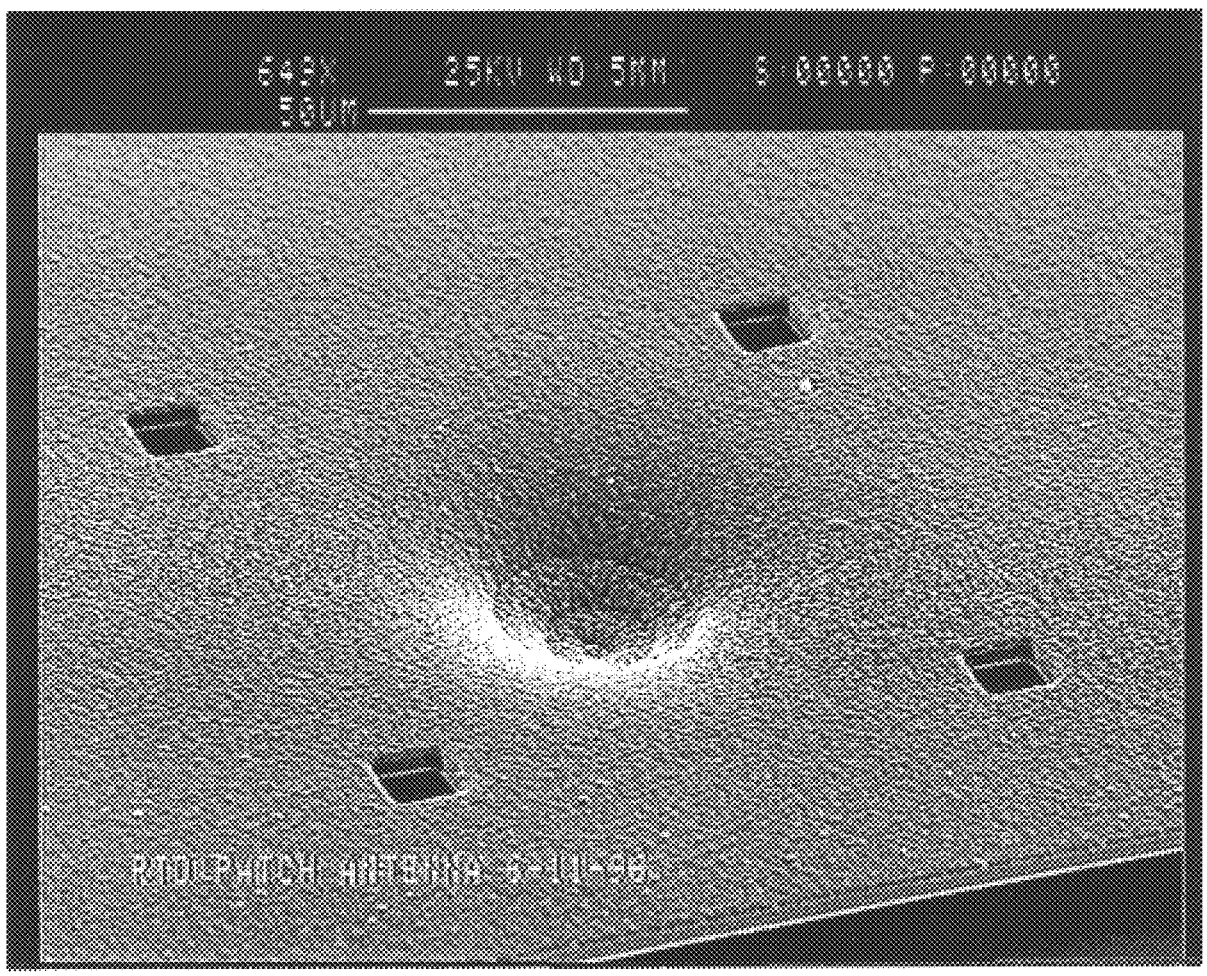
FIG. 40 is a similar SEM detail around an anode dimple after further processing as viewed from above; the PR posts and seed metal have been removed leaving a clear view of the etchant access holes.
Figure 41:
FIG. 41 is a similar SEM detail around an anode dimple on the backside of a removed antenna.
Figure 42:
FIG. 42 is a close up SEM view of the anode dimple in FIG. 41.

Stage 5 consists of patterning and developing the delineation of the MSA plating. The plating mask leaves PR that prohibits plating in areas between antennas and in small etchant access holes on each antenna. The access holes in the top anode metal layer are created to facilitate the removal of the standoff platform PR from underneath the antenna after the plating is completed. Because of the significant thickness variation of the plating PR, this layer requires a double exposure. FIG. 39 shows the result of processing the plating PR. Clearly visible in this view are 4 of the patterned PR posts centered about an anode dimple that are used to create etchant access holes. FIG. 40 is a similar view of a completed MSA showing the resulting etchant access holes. FIG. 41 is a backside view of the antenna of the same region as in FIG. 40. FIG. 42 is a close up of the backside of an anode dimple.

The following is a detailed process step sequence for stage 5:
a) 4620 at 5000 rpm—Standard thickness in plane regions, 6 microns. Over the diodes the thickness is near 25 microns. Photo resist will generally planerize over topography. No bubbles appear during the prebake due to the bake schedule of the three platform layers.
b) First exposure—120 seconds. The first exposure will clear the hole down to the diode surface, 25 microns of resist. The 30 micron hole mask is used. No development yet.
c) Second exposure—15 seconds. This second exposure will define the antenna extents and pattern access holes. Top Metal mask is used.
d) Development—2 minutes in 1:4,400° K. The posts for hole formation look good and the PR has been removed down to the diode surface.

After the seed metal has been deposited and the plating pattern developed the electroplating of the MSA can proceed. Only a limited amount of bearing surface remains for the MSA in completed devices. The bearing points include the RTDs, any remnant PR posts after the standoff platform is etched and the contact bridges to the anode pads. The vast majority of the MSA film is suspended from these points. Nickel is used as the plating metal taking advantage of its durability and strength. A 3 µm plating thickness limits mechanical distortions caused by inherent stresses, gravity, or handling and operational forces.

Figure 43:
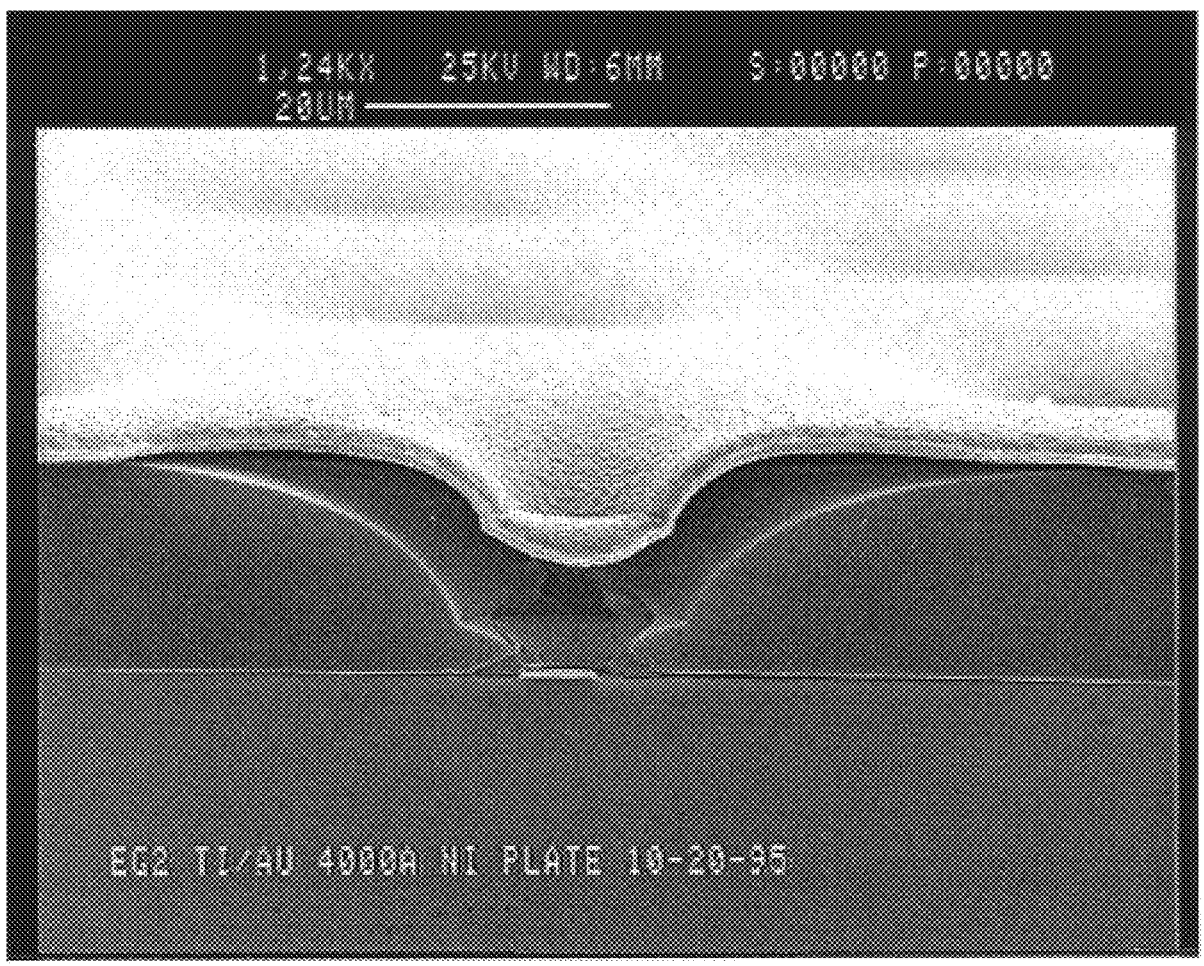
FIG. 43 is an SEM cross section detail of an early and unsuccessful 2-layer anode dimple structure; though unsuccessful, this view with the Ni plating separated from the dimple gives a clear view of the Ni plating thickness.

FIG. 43 shows a cross section of an anode dimple after the Ni plating step. This particular anode dimple is an example of the unsuccessful 2-layer version. However, the separation of the plating from the standoff platform PR illustrates the relationship between the plating layer and the standoff and hints of the resulting suspension after the standoff PR is etched. Although it is evident that the platted Ni film is inherently stressed and that not all of the stress is relived after the standoff etch, the anode dimples seem to remain in good electrical contact with the RTDs.

The following is a detailed process step sequence for stage 6:
(a) Ni Plate—3 microns thick.
(b) Remove PR, Acetone, prepare for seed layer removal.

Figure 44:
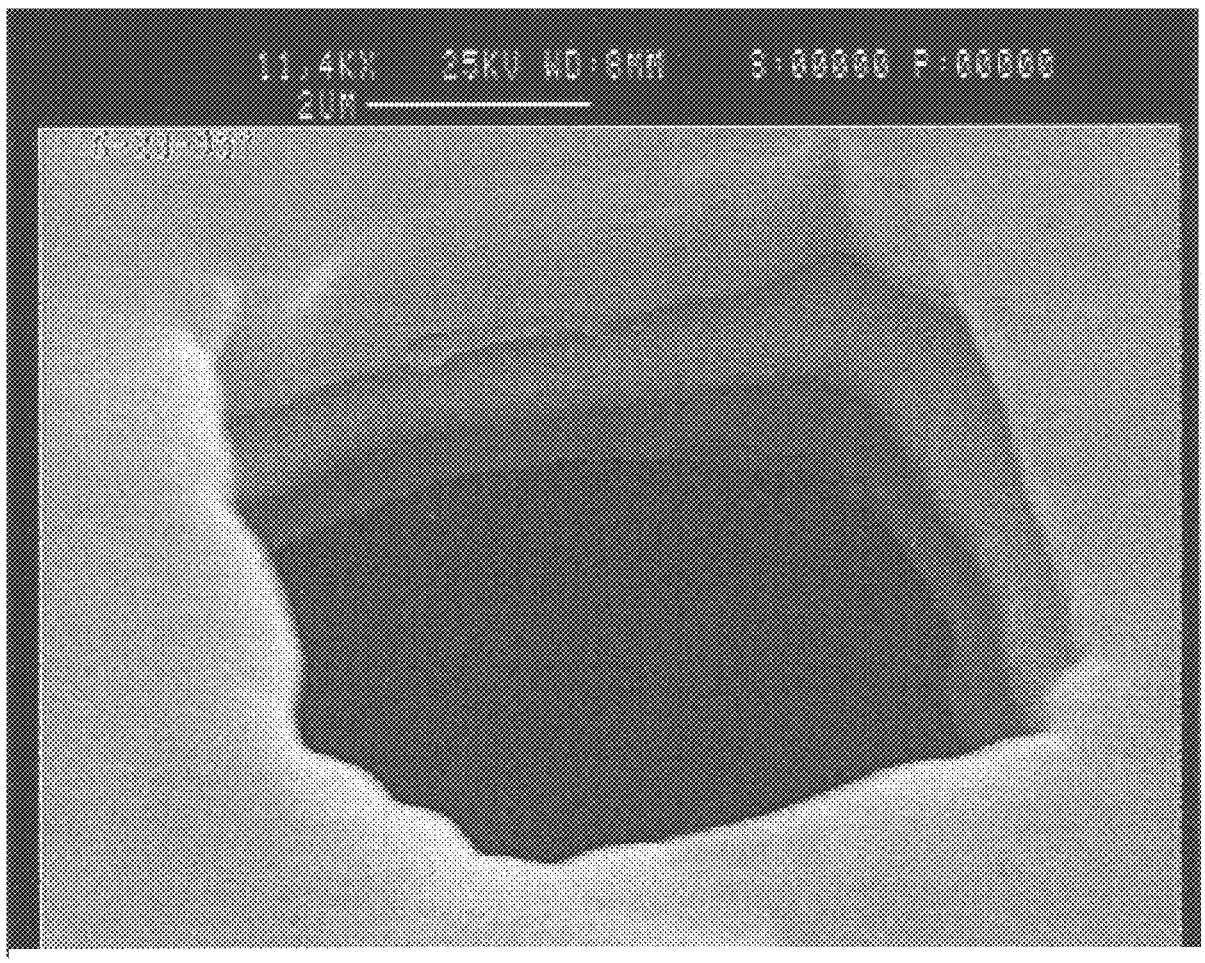
FIG. 44 is a close up SEM view of a single etchant access hole showing the edges of the plated Ni (top) metallic layer, and the seed metal Au (middle), and Ti (bottom) layer; the access hole has been cleared of the seed metal by ion milling.
Figure 45:
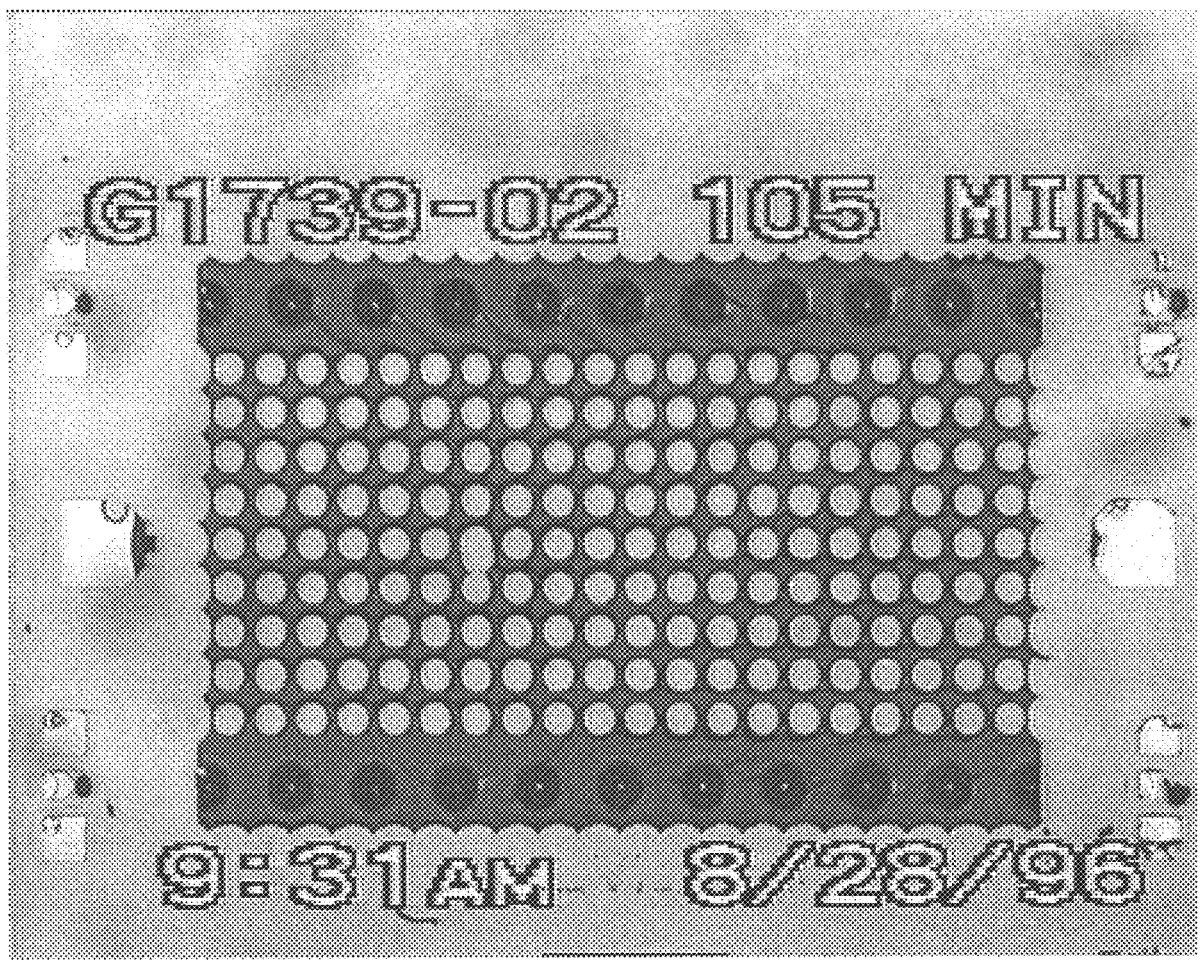
FIG. 45 is an SEM top view of an MSA structure with the metal antenna removed to expose the remaining PR standoff platform after 105 minutes of oxygen plasma etch; The PR in the vicinity of the etchant access holes has been removed but PR remains between the holes.
Figure 46:
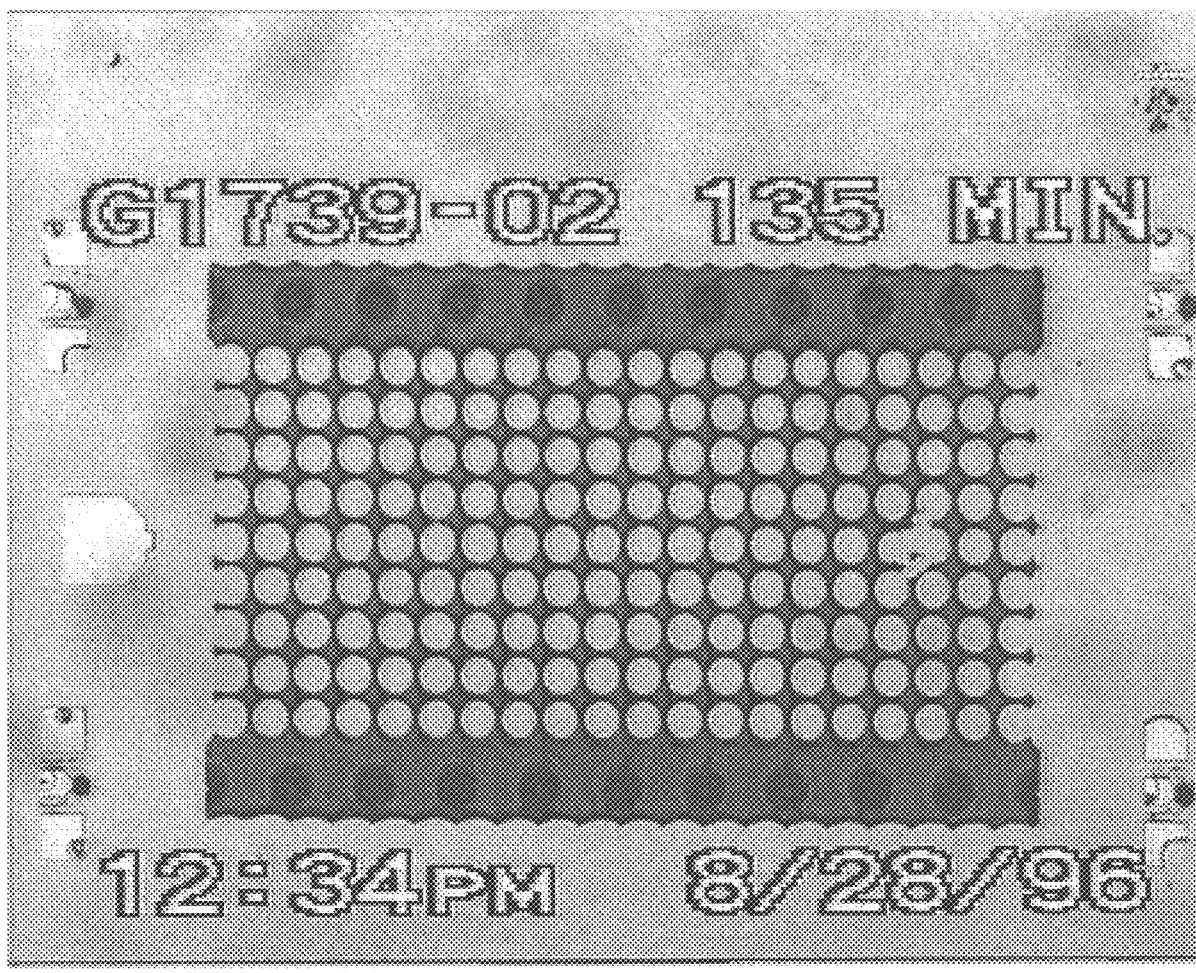
FIG. 46 is an SEM top view of an MSA structure with the metal antenna removed to expose the remaining PR standoff platform after 135 minutes of oxygen plasma etch; the etched holes are about to coalesce.
Figure 47:
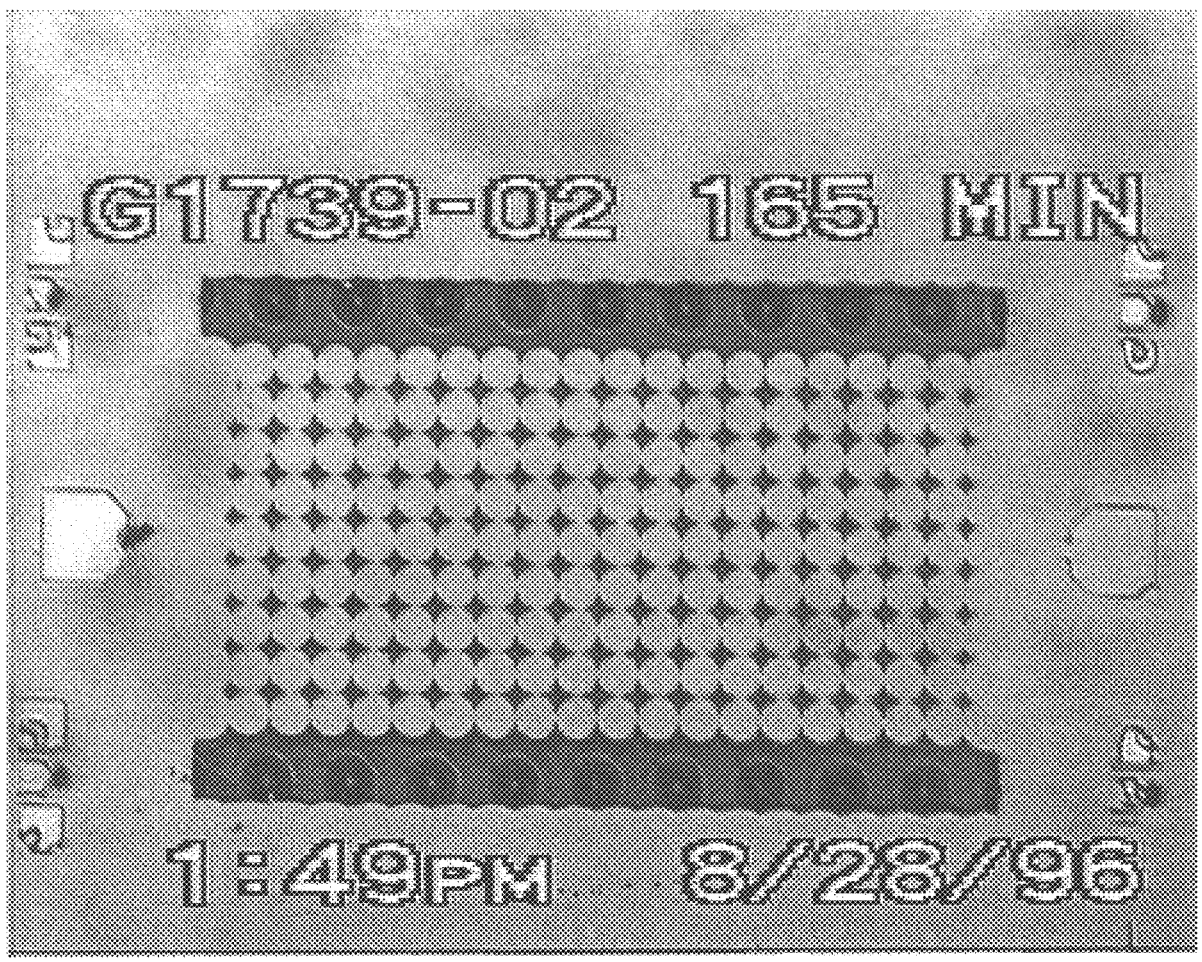
FIG. 47 is an SEM top view of an MSA structure with the metal antenna removed to expose the remaining PR standoff platform after 165 minutes of oxygen plasma etch; the etched hoes have coalesced but relatively large PR pillars remain.
Figure 48:
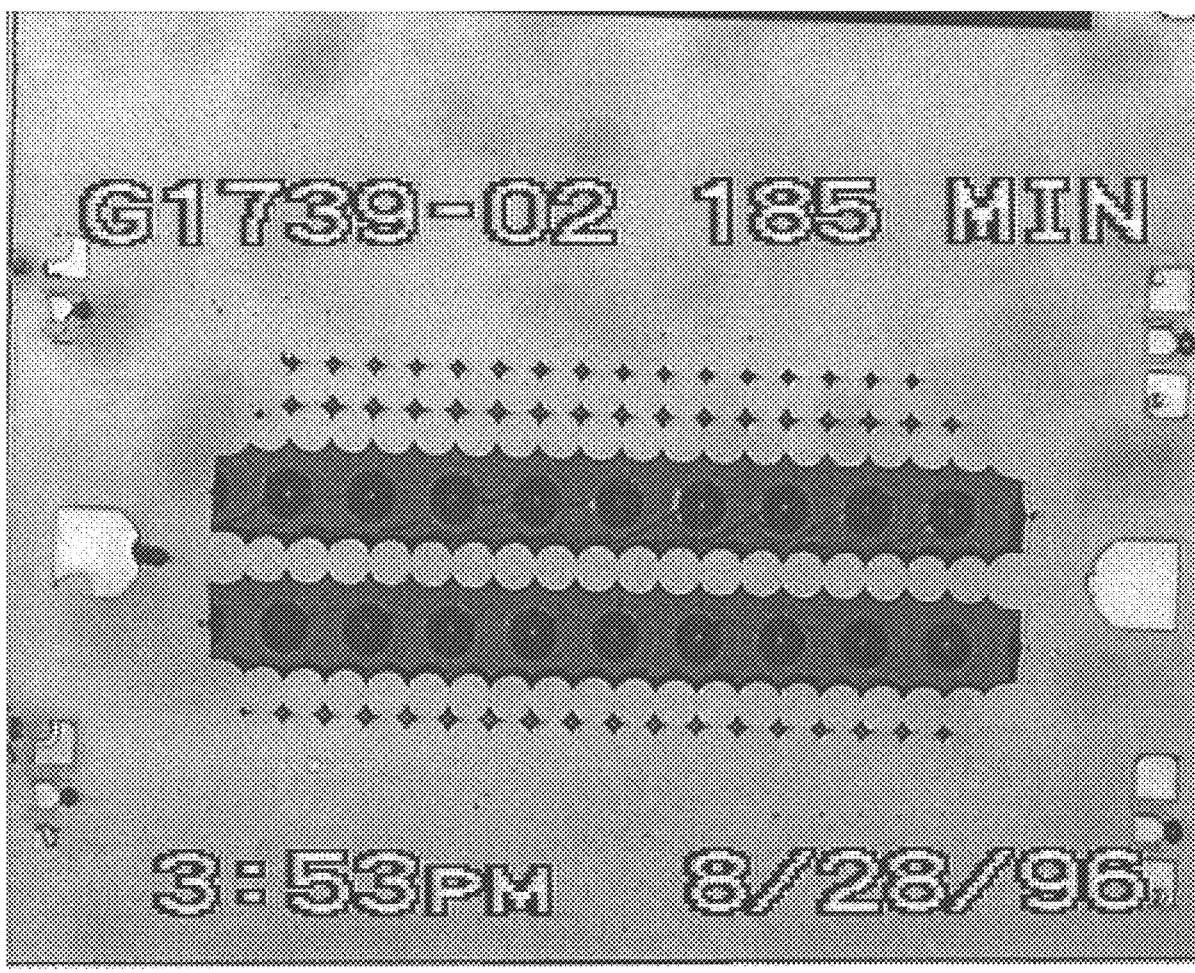
FIG. 48 is an SEM top view of an MSA structure with the metal antenna removed to expose the remaining PR standoff platform after 185 minutes of oxygen plasma etch; the etched holes have coalesced leaving small PR pillars.
Figure 49:
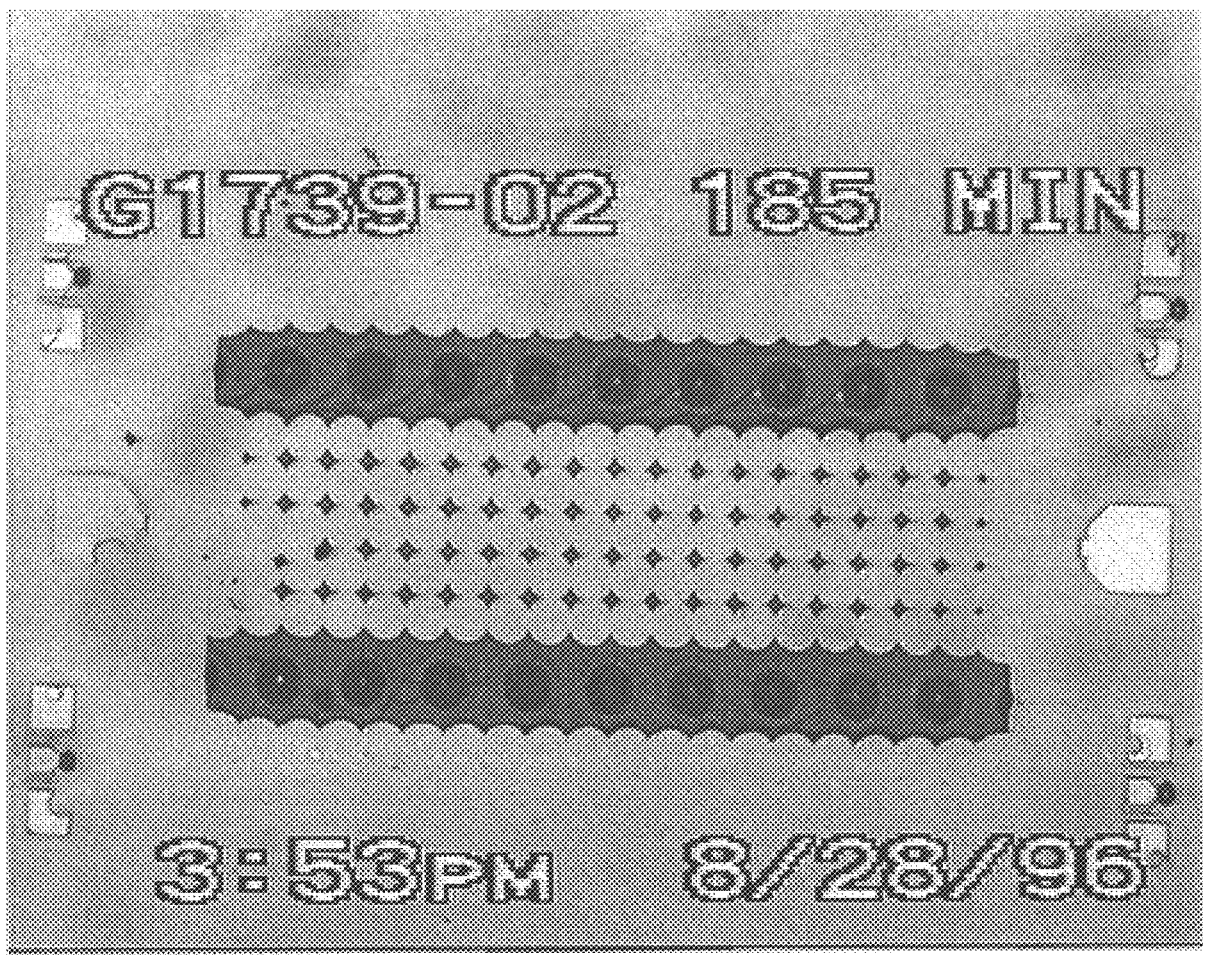
FIG. 49 is an SEM top view of an MSA structure with the metal antenna removed to expose the remaining PR standoff platform after 185 minutes of oxygen plasma etch; the PR pillars have been reduced in size and, if etching is stopped, remain to help support the suspended antenna.

After the MSA top metal has been platted the exposed seed metal in areas not platted must be removed. This removal is achieved using a full coverage ion milling. The milling proceeds until the areas with exposed seed metal have been entirely removed. Some of the Ni plate is also sacrificially removed. FIG. 44 is an SEM of a single etchant access hole showing the edges of the plated Ni (top) metallic layer, and the seed metal Au (middle), and Ti (bottom) layer. The access hole has been cleared of the seed metal by ion milling.

Stage 8 consists of a oxygen plasma etch to remove the standoff platform PR from under the Ni plated MSA. The three layer PR platform is exposed to the plasma at the antenna edges and through the access holes milled in stage 7. The process uses a downstream plasma etcher. The flow species and rates used are oxygen at 200 sccm, nitrous oxide at 20 sccm, and $CF_4$ at 2 sccm. This recipe is different than other hardbake PR removal processes in two ways. First, because the PR is hardbaked at 160° C. and because 75 μm of undercut is desired, an increase in removal rate is required. The small amount of $CF_4$ added in the recipe is enough to dramatically increase the removal rate. Second, adding $CF_4$ to the etch can cause significant damage to metals. To avoid this damage, the substrate temperature is lowered from 150° C. to 100° C. At this lowered temperature, the $CF_4$ action on metals is reduced considerably even though the action on PR is barely effected.

A scrap sample is always processed along with each real antenna. This allows for monitoring the progress of PR removal by peeling off the top metal of individual antennas and observing how much of the PR has been removed. Sacrificial samples are essential for proper platform removal since the progress of the etch cannot be seen directly through the top metal layer. FIGS. 45–49 show the progress of a plasma etch at various etch times when viewed in this way. At 105 minutes (FIG. 45) the PR in the vicinity of the access holes has been removed; however, considerable PR remains between the holes. At 135 minutes (FIG. 46) the etched holes are about to coalesce. At 165 minutes (FIG. 47) only remnant PR pillars remain. The etch is continued to 185 minutes (FIGS. 48 and 49, different diode spacing) in order to remove as much of the PR as possible to reduce dielectric loss during operation while leaving small PR pillars to help mechanically support the plated Ni antenna.

Figure 50:
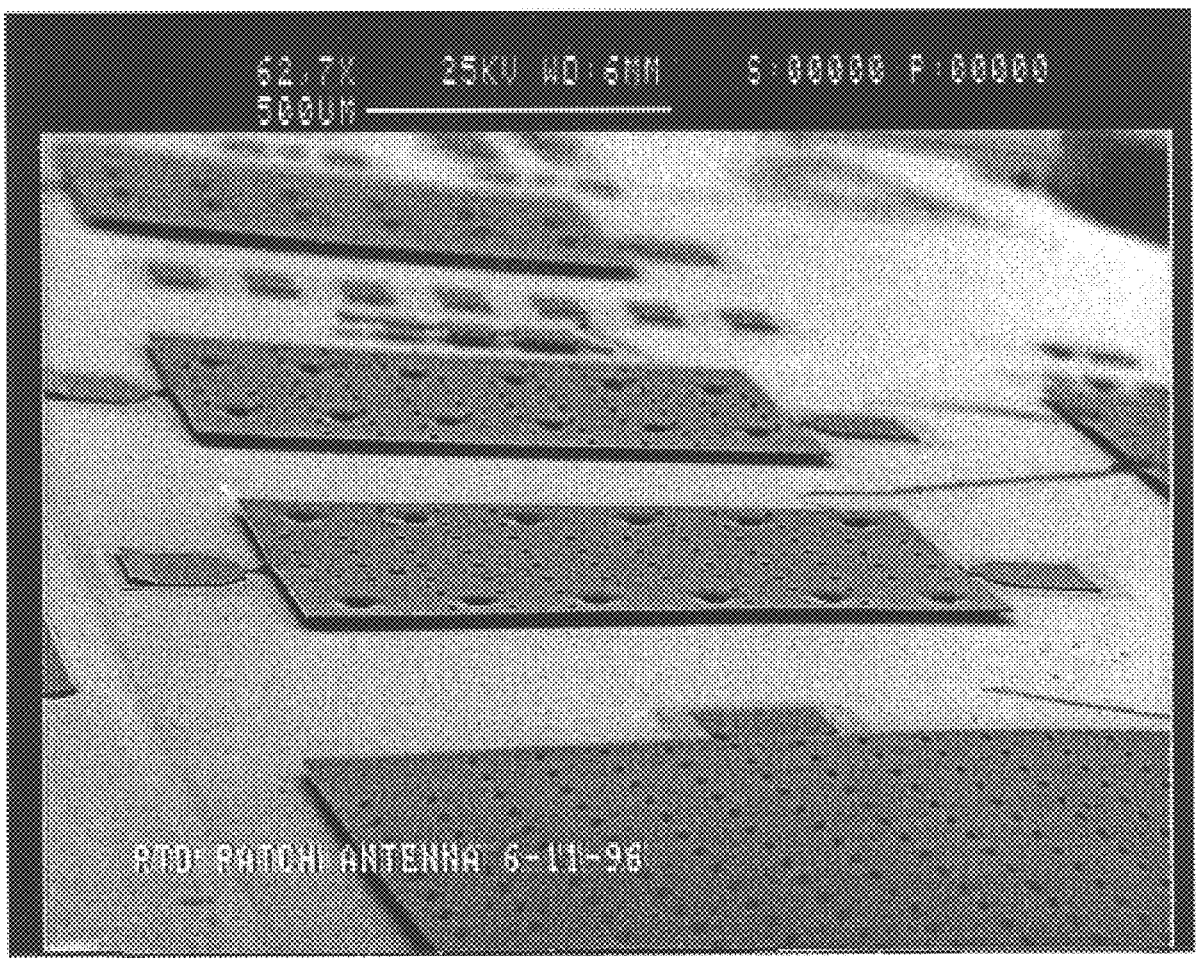
FIG. 50 is a perspective SEM view of completed RTD-MSAs of the invention on chip.
Figure 51:
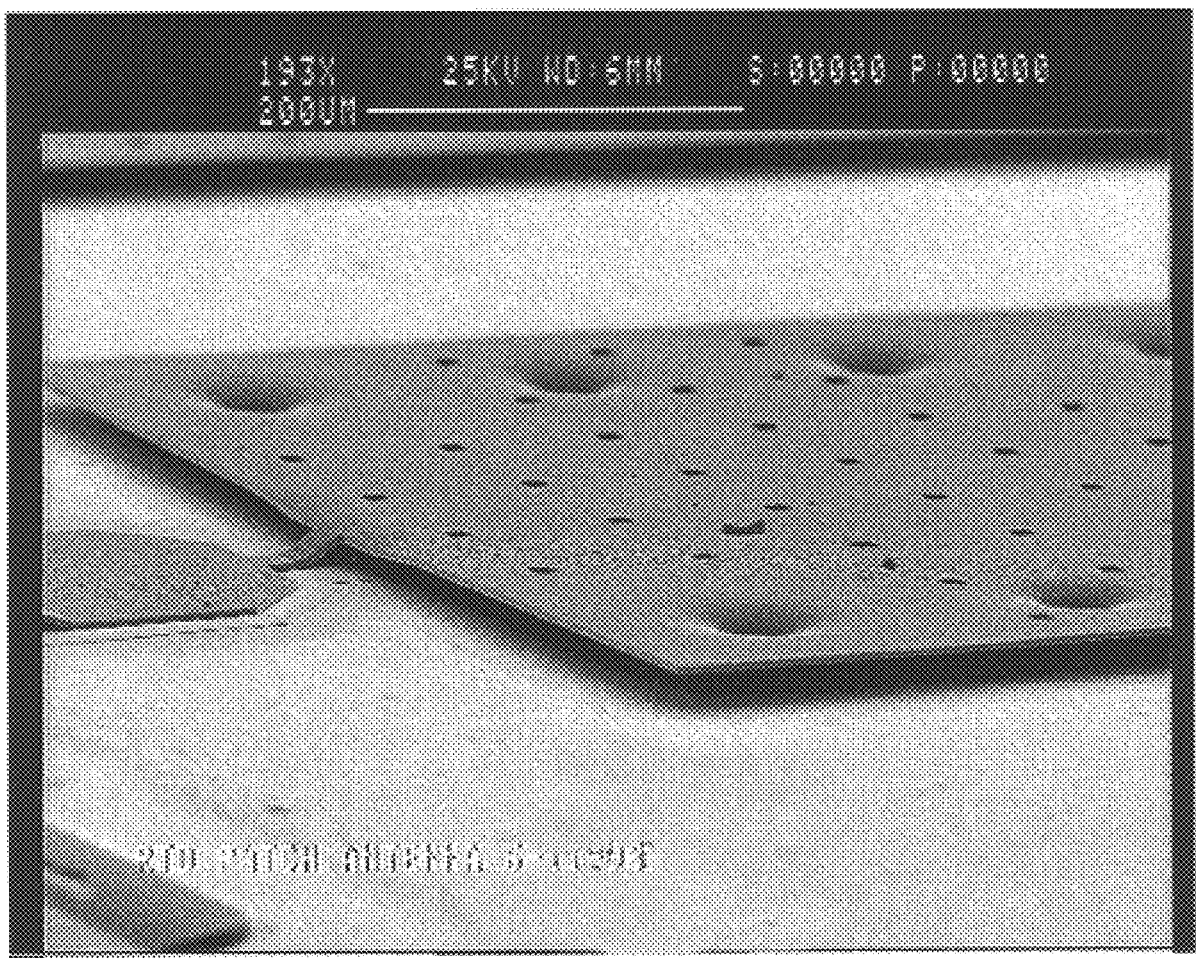
FIG. 51 is an SEM partial side view of a completed RTD-MSA.

FIG. 50 is a panorama of several completed RTD-MSAs on a chip. Clearly visible is the array of etchant access holes in the interior of the antenna patch, the anode dimples (black holes) to either side of the patch center line, and the anode probe contact pads off to each side and along the antenna centerline. Also visible are other structures primarily intended for process evaluation. FIG. 51 is a detail of an RTD-MSA showing more clearly the anode contact pad and contact bridge.

A 3:1 aspect ratio results from contacting a 6 μm RTD contact dot through 20 μm of photoresist. This hole must be clear and all sides must be amenable to metal coating. Normally profiles are created by cleaving through the intended pattern and observing the resulting cross section in the SEM. This method fails for this process for two related reasons. First, the diode is only 6 μm in diameter. This is a prohibitively small single feature to cleave through especially to hit the center. A center cleave is most accurate for profile characterization. Second, only a dozen or so diodes are used for each of the antennas (6 μm diameter dots on 200 μm centers). As a result it is extremely improbable that a cleave will produce the desired profile preventing effective process evaluation using this method.

The first attempt to solve this problem was to use a confocal microscope for characterization. Microscopes of this type can scan structures vertically and integrate the scans for viewing. Consequently, the microscope is very good at imaging 3 dimensional features such as an individual RTD. However, the images produced initially were confusing and inaccurate. Subsequent information showed that the early versions of the PR standoff platform profile are reentrant (see FIG. 35) and therefore are not compatible with confocal microscopy.

Figure 52:
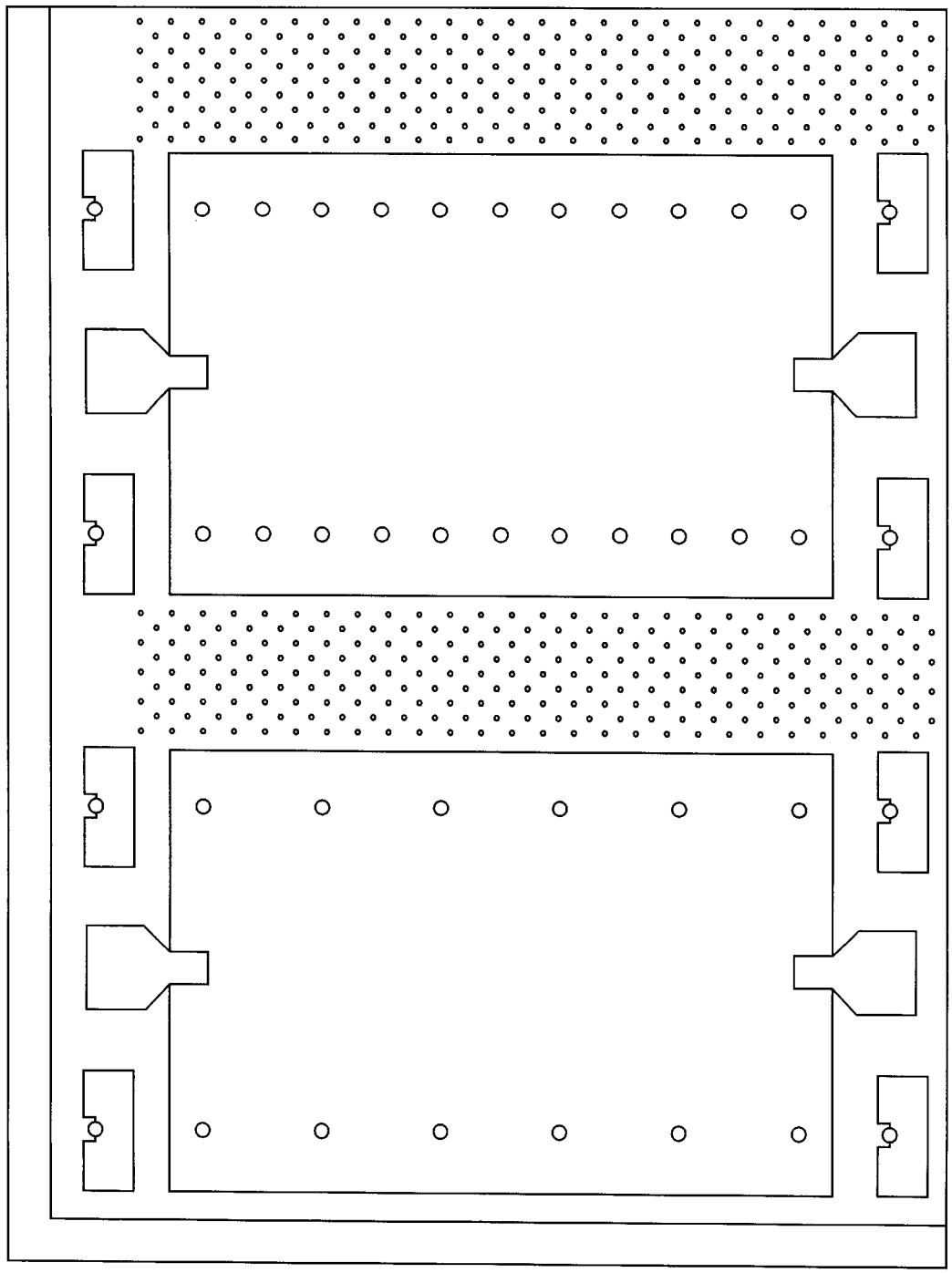
FIG. 52 is a detail from a cell of the mask set showing the dot arrays for process evaluation and a variation of the number of RTDs per antenna.
Figure 53:
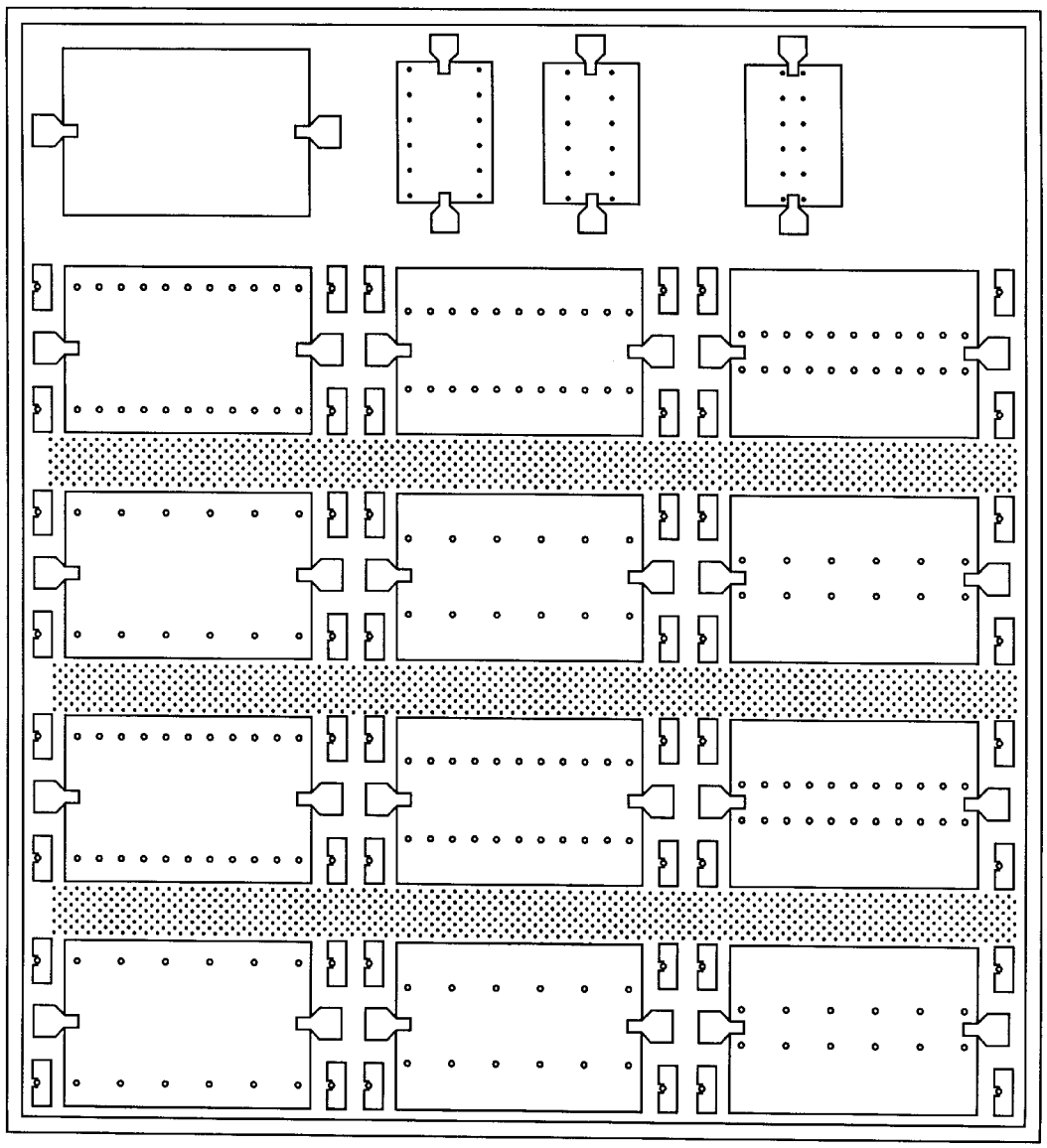
FIG. 53 illustrates a complete cell of the mask set with alignment marks deleted showing two antenna geometries and a variation of RTD number and placement for the antenna.

The second attempt to improve process evaluation involved changes to the mask set. The original layout of antennas had large street areas between antennas that were not used. The change used these streets to fabricate arrays of dots. These dots are placed far enough apart (isolated) so that neighboring dots do not interfere significantly during processing. The test pattern was also intentionally misaligned with the wafer cleave plane so that a cleave path angles through the array of dots. In this manner, several dots within a given array are cleaved yielding an accurate cross sectional view with high probability. This method was adopted to characterize all subsequent platform process steps. FIGS. 52 and 53 are, respectively, a detail from and a complete cell of the mask set with alignment marks omitted. The dot arrays and other test structures are clearly visible in these Figs. The antennas were matrixed to include variations in RTD number and placement and include two different antenna geometries.

Figure 54:
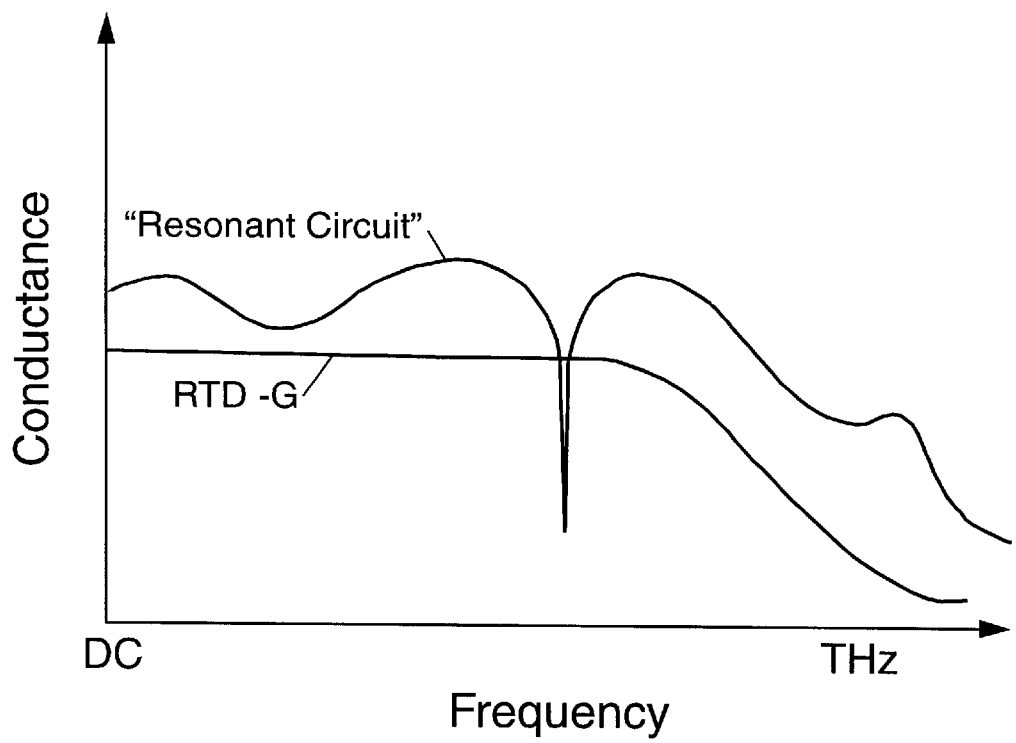
FIG. 54 graphically illustrates power biasing stability criterion.

Although RTDs demonstrate extremely high current densities at very high speeds and exhibit large peak-to-valley current ratios at corresponding finite voltages, stable operation is problematic. The effective negative conductance of the RTD device is relatively flat from DC to several 100 GHz. See FIG. 54 lower curve. The external resonant circuit (MSA and bias supply) must be designed to avoid oscillation at frequencies other than the desired one. The upper curve in FIG. 54 illustrates a desired hypothetical circuit response meeting this need. This condition requires that the differential conductance of the external circuit must be greater than the negative effective conductance of the RTD except at resonance. Achieving this condition proves to be difficult in most configurations (i.e. waveguides see Reference 7). As a result and in spite of our best efforts, the observed resonant RF power levels have been extremely low. We are still having difficulty stabilizing low frequency oscillations (~500 MHz).

One promising stabilization method involves an appropriate loading of the microstrip patch antenna and requires both a custom bias probe and power supply. Because the DC bias pads are at an RF null, a quite large capacitive bypass is allowed right at the device. This should provide for a low impedance at frequencies of several GHz up to the operating frequency. Custom RF probes are available with user selected high-quality lumped passive circuit elements mounted at their tips. With these, low impedances can be achieved over large frequency ranges (several MHz to say 50 GHz). The on-chip capacitive bypass along with a controlled impedance RF bias probe should stabilize the external circuit at frequencies from about 10 MHz up to the desired operating frequency ($\leq 100$ GHz). However, this combination of stabilization still allows for instabilities below 10 MHz. Most commercial power supplies are not intended to bias negative differential resistance loads as they are expected to source current rather than to sink it. As a result, this type of supply is persistently unstable to positive voltage perturbations. Fortunately, it should be rather straight forward to design and build a custom supply capable of sinking and sourcing current which is stable to frequencies below 10 MHz. Such a supply would use electrical feedback to keep its output impedance well below that necessary for stability. This one-two punch should provide the requisite stabilization allowing a more satisfactory demonstration of resonant RF power generation.

Any RF system requires an antenna for reception and transmission, a source of power for transmission and for a local oscillator (heterodyne), a mixer, and filters. We have emphasized in this report that the RTD-MSA is a power combiner and is suitable as an RF power source. The radiation power from the microstrip antenna can be coupled into a waveguide. This coupling can be accomplished using a horn antenna to receive the radiated power and couple to a wave guide. Once coupled in this way, the power can be used in conventional ways. Arrays of RTD-MSAs can be used to enhance power levels (phase lock) or affect radiation direction and gain.

What has not been emphasized and should be noted is the ability to use the RTD-MSA for signal detection. This can be done by several different ways using the inherent nonlinearity of the RTD. In particular, the antenna can be biased out of the NDR to make a mixer.

We have presented theoretical and experimental studies exploring the possibility of making an RF power combiner by monolithically integrating an array of RTDs with a microstrip antenna. The use of novel heterostructure materials in making the RTDs has been demonstrated and that these RTDs perform satisfactorily in this application. In particular, the high speed of operation of these RTDs allows for the operation frequency to be determined by the microstrip antenna to at least to a few hundred gigahertz with the possibility that even higher frequencies may be obtained.

In addition to the obvious complexity of integrating RTD arrays with suspended metal antenna structures, we have developed and demonstrated a process for fabricating the RTD-MSA with an antenna standoff distance of 20 $\mu$m. Although it is extremely difficult to obtain these standoffs, the remaining dielectric losses are minimized and the radiation efficiency is determined only by other limitations. Simulations imply that radiation efficiencies may easily exceed 5%.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An antenna comprising a plurality of negative resistance devices in the form of resonant tunneling diodes formed on an upper surface of a substrate; at least one microstrip patch overlying the negative resistance devices and electrically connected thereto; and a ground plane formed on the upper surface of the substrate proximate to the negative resistance devices.

2. The antenna of claim 1 comprising a microstrip patch antenna.

3. The antenna of claim 1 having a radiation efficiency of approximately five percent or greater.

4. The antenna of claim 1 wherein the microstrip patch is vertically spaced above the ground plane by approximately 20 $\mu$m or greater.

5. The antenna of claim 1 comprising a plurality of microstrip patch antennas each overlying a plurality of negative resistance devices further comprising resonant tunneling diodes.

6. An antenna comprising a plurality of resonant tunneling diodes formed on an upper surface of a substrate in an array with each of said resonant tunneling diodes being laterally spaced a distance away from a longitudinal center axis of said antenna, said distance being chosen to optimize performance of the antenna; at least one microstrip patch overlying the resonant tunneling diodes and electrically connected thereto; and a ground plane formed on the upper surface of the substrate proximate to the resonant tunneling diodes.

7. A method of manufacturing an antenna comprising the steps of:
   a) providing a substrate having a double barrier heterostructure epitaxially grown on an upper surface of the substrate;
   b) placing a resonant tunneling diode top contact over the upper surface of the substrate;
   c) etching the substrate using the top contact as an etch mask and forming a resonant tunneling diode post;
   d) adding a bottom contact layer for forming a ground plane on the upper surface of the substrate proximate to the resonant tunneling diode post;
   e) depositing an electrically insulating standoff layer over the ground plane with the standoff layer extending upward above the top contact and having an opening in the standoff layer leaving exposed a portion of the resonant tunneling diode top contact;
   f) depositing an antenna layer on the standoff layer, with the antenna layer extending into the opening in the standoff layer and forming an electrical connection to the top contact; and
   g) removing the standoff layer, at least in part.

8. The method of claim 7 wherein the etching step comprises isotropic etching.

9. The method of claim 7 additionally comprising the step of adding a passivation layer to cover sidewalls of the resonant tunneling diode post.

10. The method of claim 9 wherein the step of adding the passivation layer comprises adding a silicon nitride dielectric layer.

11. The method of claim 7 wherein the step of depositing the standoff layer comprises depositing one or more layers of photoresist.

12. The method of claim 7 wherein the step of depositing a standoff layer comprises depositing a standoff layer of approximately 20 $\mu$m or greater in thickness.

13. The method of claim 7 wherein the step of depositing the antenna layer comprises the steps of:
   a) depositing a layer of seed metal to form an electrical contact between a plurality of resonant tunneling diode top contacts;
   b) patterning a plurality of posts on the layer of seed metal;
   c) depositing support metal over the layer of seed metal;
   d) removing the posts to form a plurality of access holes down to the layer of seed metal; and
   e) milling through the seed metal at the locations of the access holes.

14. The method of claim 7 wherein the step of removing the standoff layer comprises oxygen plasma etching.

15. The method of claim 7 wherein the step of removing the standoff layer comprises forming access holes in the antenna layer.

16. The method of claim 7 wherein steps a) through g) are performed to form an electrically interconnected plurality of resonant tunneling diodes.

17. The method of claim 7 additionally comprising the step of forming a plurality of antennas and forming the antennas into an array of antennas.

18. An antenna comprising:
   a) a semiconductor substrate having an upper surface;
   b) a plurality of resonant tunnel diodes formed on the upper surface of the substrate;
   c) a ground plane formed on the upper surface of the substrate proximate to the plurality of resonant tunnel diodes and electrically connected thereto;
   d) a microstrip patch antenna formed above the resonant tunnel diodes and electrically connected thereto.

19. The antenna of claim 18 wherein the semiconductor substrate comprises gallium arsenide.

20. The antenna of claim 18 wherein the microstrip patch antenna is spaced from the ground plane by a distance in the range of 5–50 $\mu$m.

21. The antenna of claim 20 wherein the microstrip patch antenna is spaced from the ground plane by a distance of about 20 µm.

22. An antenna comprising:
 a) a semiconductor substrate having an upper surface;
 b) a plurality of resonant tunneling diodes formed on the upper surface of the substrate, and having a top ohmic contact;
 c) a ground plane formed on the upper surface of the substrate proximate to the plurality of resonant tunnel diodes and electrically connected thereto; and
 d) a microstrip patch antenna formed above the resonant tunnel diodes and electrically connected thereto.

23. An antenna comprising:
 a) a semiconductor substrate having an upper surface;
 b) a plurality of resonant tunneling diodes formed on the upper surface of the substrate, and having a top Schottky contact;
 c) a ground plane formed on the upper surface of the substrate proximate to the plurality of resonant tunnel diodes and electrically connected thereto; and
 d) a microstrip patch antenna formed above the resonant tunnel diodes and electrically connected thereto.

24. An antenna comprising:
 a) a semiconductor substrate having an upper surface;
 b) a plurality of resonant tunneling diodes formed on the upper surface of the substrate;
 c) a ground plane formed on the upper surface of the substrate proximate to the plurality of resonant tunnel diodes and electrically connected thereto; and
 d) a microstrip patch antenna formed above the resonant tunnel diodes and electrically connected thereto, with the microstrip patch antenna being supported by the plurality of resonant tunnel diodes, and further being supported by a plurality of dielectric support posts.

25. The antenna of claim 24 wherein the dielectric support posts comprise photoresist.

26. The antenna of claim 24 herein the dielectric support posts comprise polyimide.

27. An antenna comprising:
 a) a semiconductor substrate having an upper surface;
 b) a plurality of resonant tunneling diodes formed on the upper surface of the substrate, with the resonant tunneling diodes including a double heterostructure with a pair of tunneling barriers sandwiched about a quantum-well layer;
 c) a ground plane formed on the upper surface of the substrate proximate to the plurality of resonant tunnel diodes and electrically connected thereto; and
 d) a microstrip patch antenna formed above the resonant tunnel diodes and electrically connected thereto.

28. The antenna of claim 27 wherein the barriers comprise aluminum arsenide (AlAs) and the quantum-well layer comprises gallium arsenide (GaAs).

* * * * *

UNITED STATES PATENT AND TRADEMARK OFFICE
CERTIFICATE OF CORRECTION

PATENT NO.   : 6,049,308
DATED        : April 11, 2000
INVENTOR(S)  : Vincent M. Hietala et al.

It is certified that error appears in the above-identified patent and that said Letters Patent is hereby corrected as shown below:

In the title page, at the "Inventors:" portion, delete "Chris P. Tiggers" and substitute therefor -- Chris P. Tigges --.

Signed and Sealed this

Sixth Day of March, 2001

Attest:

NICHOLAS P. GODICI

Attesting Officer    Acting Director of the United States Patent and Trademark Office